United States Patent [19]
Jeong et al.

[11] Patent Number: 6,055,820
[45] Date of Patent: May 2, 2000

[54] REFRIGERATOR, TEMPERATURE CONTROLLING APPARATUS THEREFOR AND METHOD THEREOF ADOPTING GA-FUZZY INFERENCE TECHNIQUE

[75] Inventors: Seong-wook Jeong, Suwon; Jae-in Kim, Seoul; Yun-seog Kang, Suwon; Suk-hang Park, Suwon; Yong-myoung Kim, Suwon, all of Rep. of Korea

[73] Assignee: Samsung Electronics Co., Ltd.

[21] Appl. No.: 08/878,770

[22] Filed: Jun. 19, 1997

Related U.S. Application Data

[63] Continuation of application No. 08/559,380, Nov. 15, 1995, abandoned.

[30] Foreign Application Priority Data

| Nov. 15, 1994 | [KR] | Rep. of Korea | 94-29956 |
| Dec. 10, 1994 | [KR] | Rep. of Korea | 94-33558 |
| Oct. 24, 1995 | [KR] | Rep. of Korea | 95-36872 |

[51] Int. Cl.⁷ .............................. F25D 17/04; F24F 7/00
[52] U.S. Cl. .............................. 62/186; 62/408; 236/78 D; 454/317
[58] Field of Search ................. 62/186, 408; 454/317, 454/108, 153; 236/78 D

[56] References Cited

U.S. PATENT DOCUMENTS

| 2,907,186 | 10/1959 | Barroero | 62/408 |
| 4,662,186 | 5/1987 | Park | 62/265 |
| 5,921,099 | 7/1999 | Lee | 62/228.4 |

FOREIGN PATENT DOCUMENTS

| 50-48747 | 4/1950 | Japan. |
| 56-132528 | 5/1956 | Japan. |
| 3-122479 | 5/1991 | Japan. |
| 4-177074 | 6/1992 | Japan. |
| 5-52460 | 3/1993 | Japan. |
| 5-141843 | 8/1993 | Japan. |
| 5-149668 | 8/1993 | Japan. |

*Primary Examiner*—William Wayner
*Attorney, Agent, or Firm*—Burns Doane Swecker & Mathis L.L.P.

[57] ABSTRACT

In a refrigerator temperature controlling apparatus and method thereof adopting GA-fuzzy inference, the refrigerator includes a cool air passage formed at both sides of the rear surface of a housing for guiding downward the cool air passing through a guide passage, a cool air discharging adjustment blade rotatably installed in front of the housing for dispersing and concentrating the cool air produced from discharging apertures, a driving motor for driving the cool air discharging adjustment blade, and a controller with each temperature sensors in left right side walls, for comparing the temperature inferred by the GA-fuzzy inference with data learned by reference to control the cool air discharging direction. Therefore, the cooling speed becomes fast and the temperature distribution depending on the refrigerated foodstuffs is made uniform throughout the refrigeration compartment. Also, the incoming external temperature due to door openings can be compensated for.

48 Claims, 26 Drawing Sheets

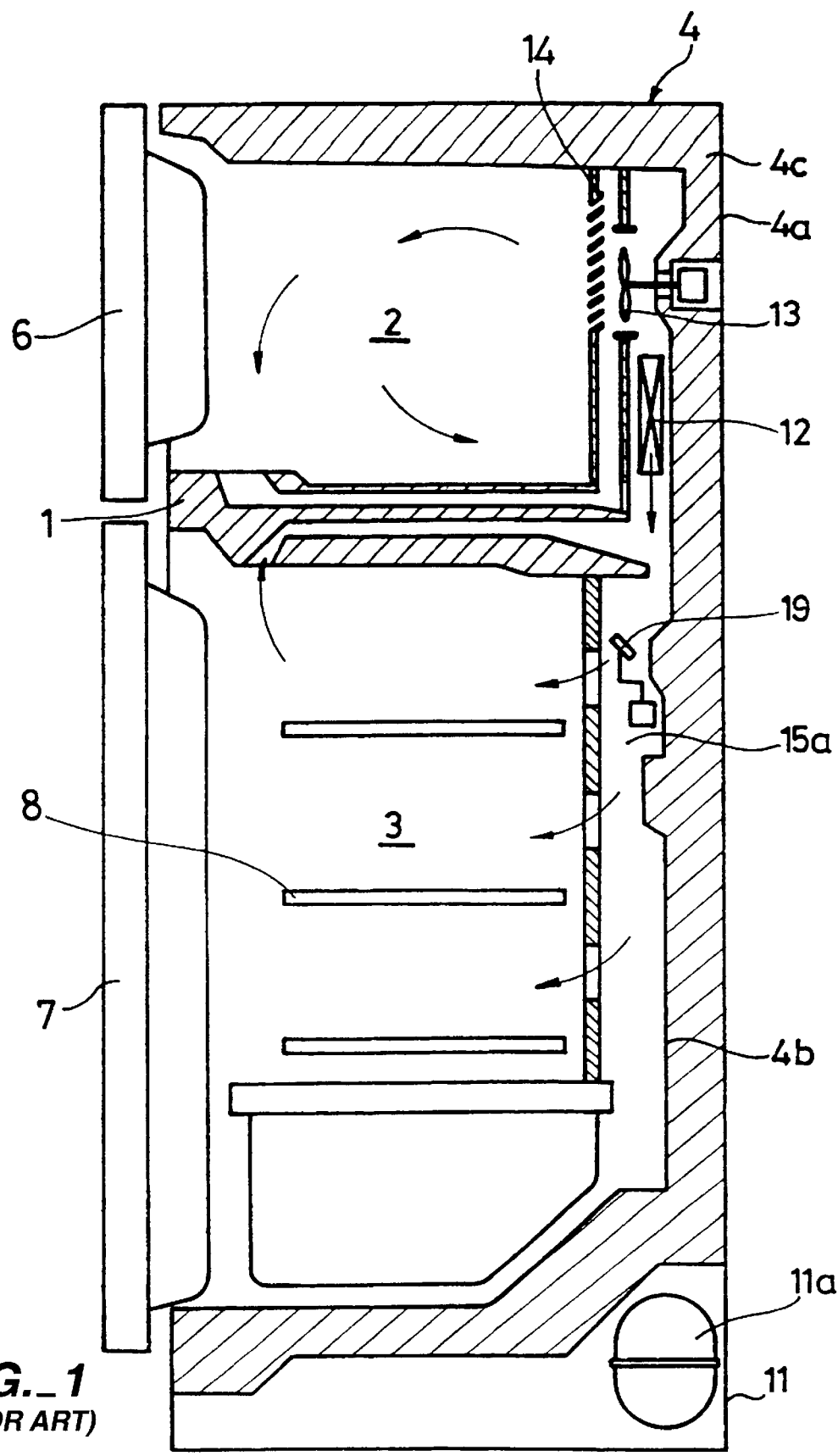
FIG._1
*(PRIOR ART)*

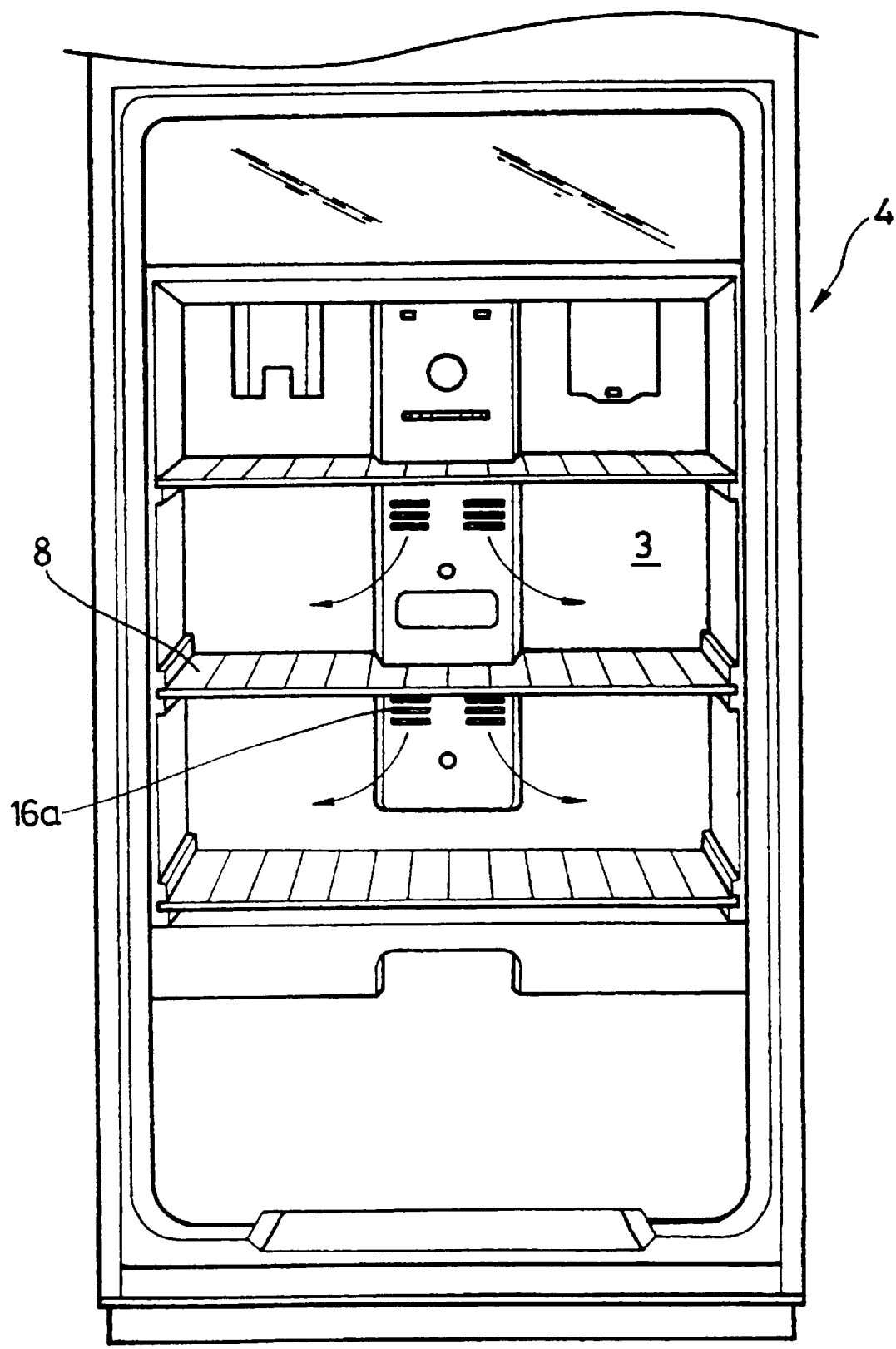
FIG._2
*(PRIOR ART)*

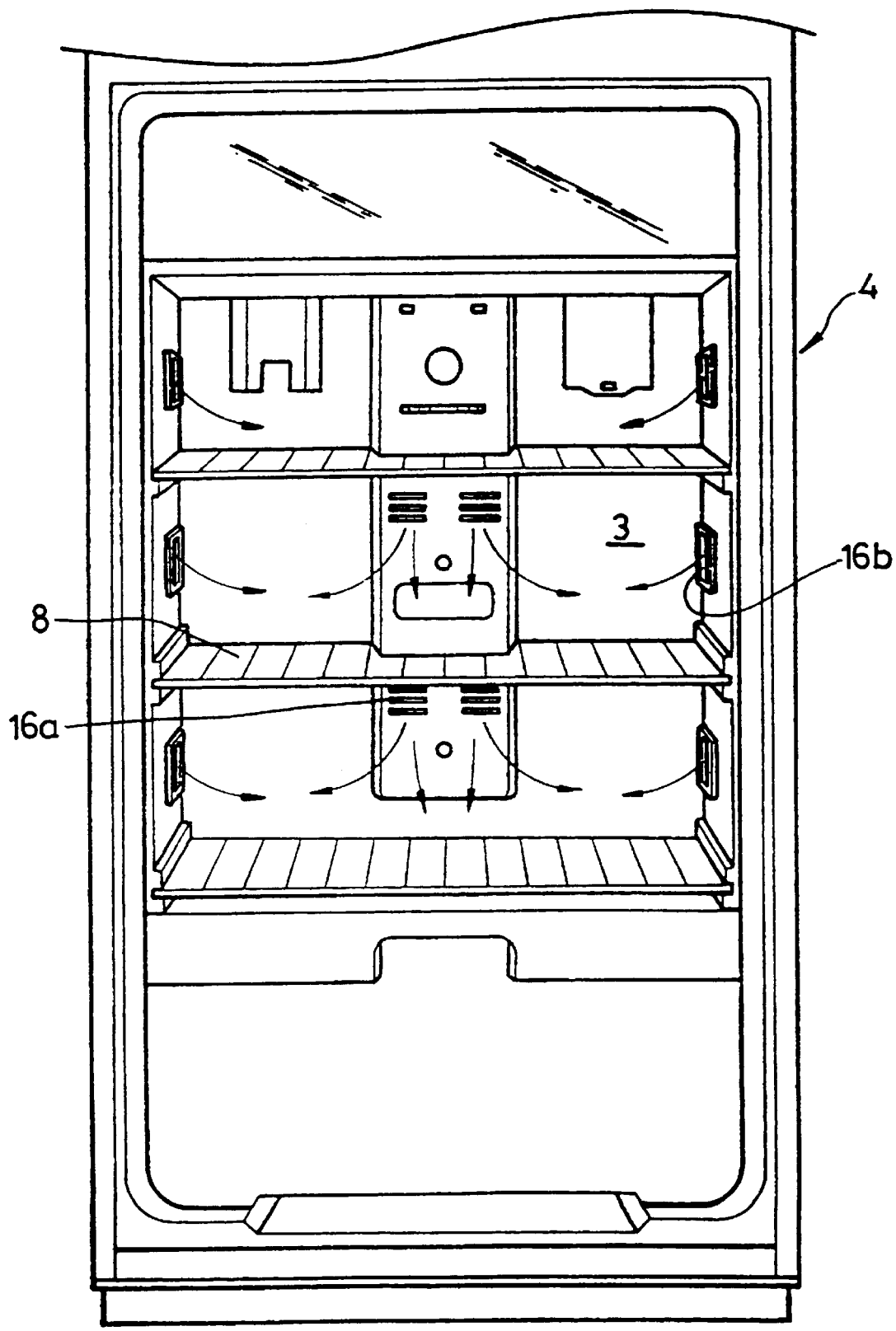
FIG._3
*(PRIOR ART)*

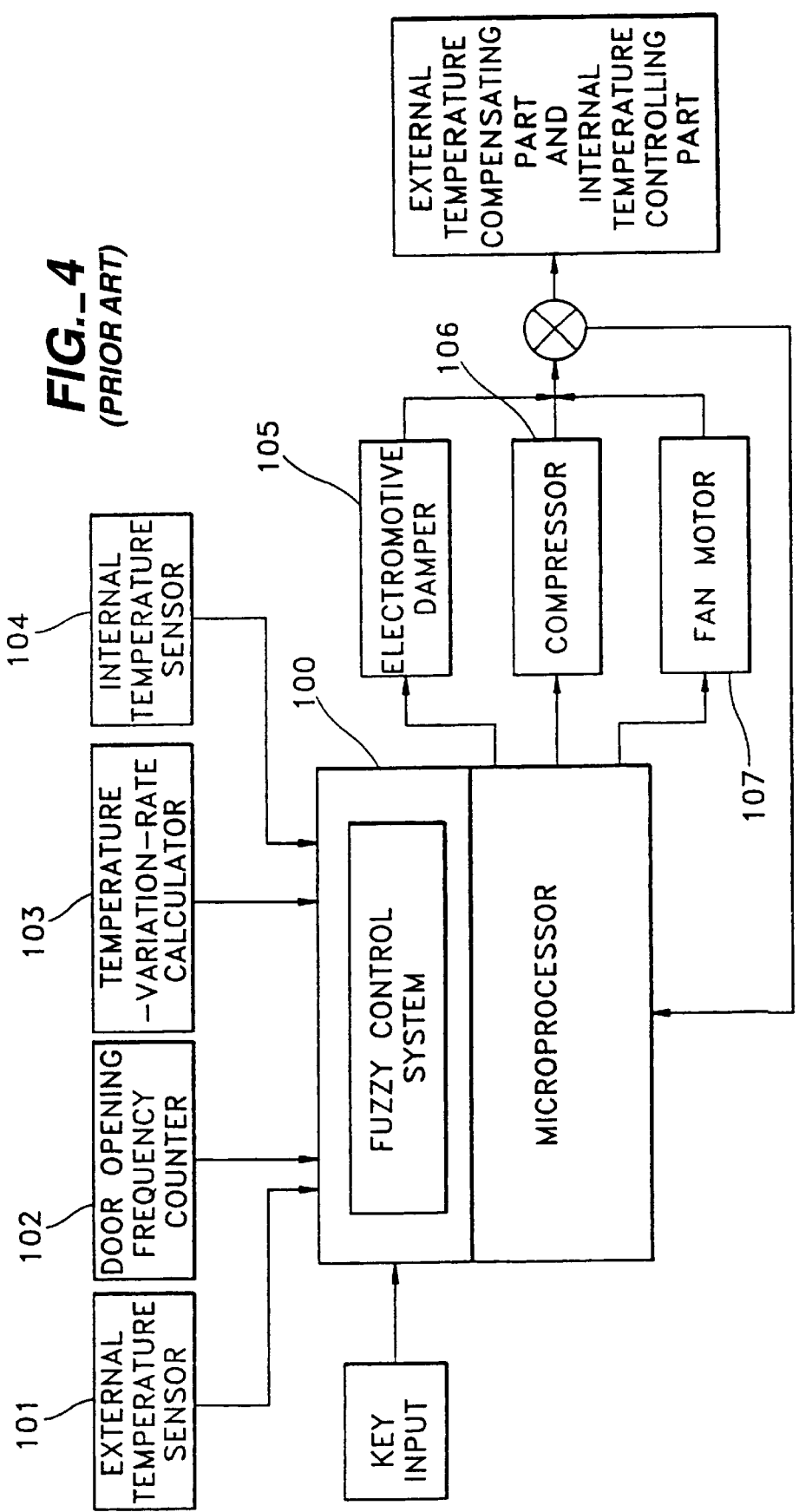
FIG._4 (PRIOR ART)

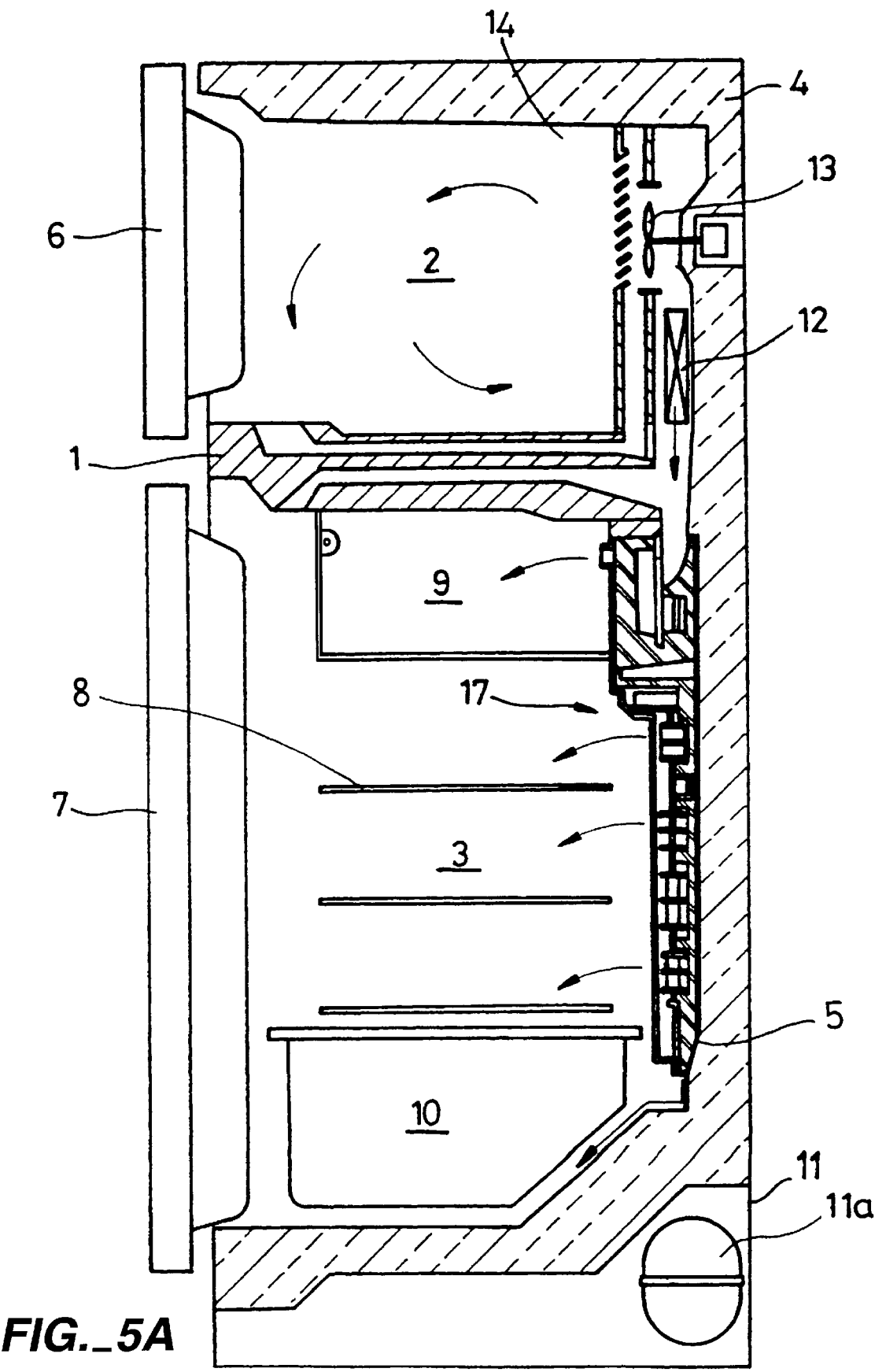
FIG._5A

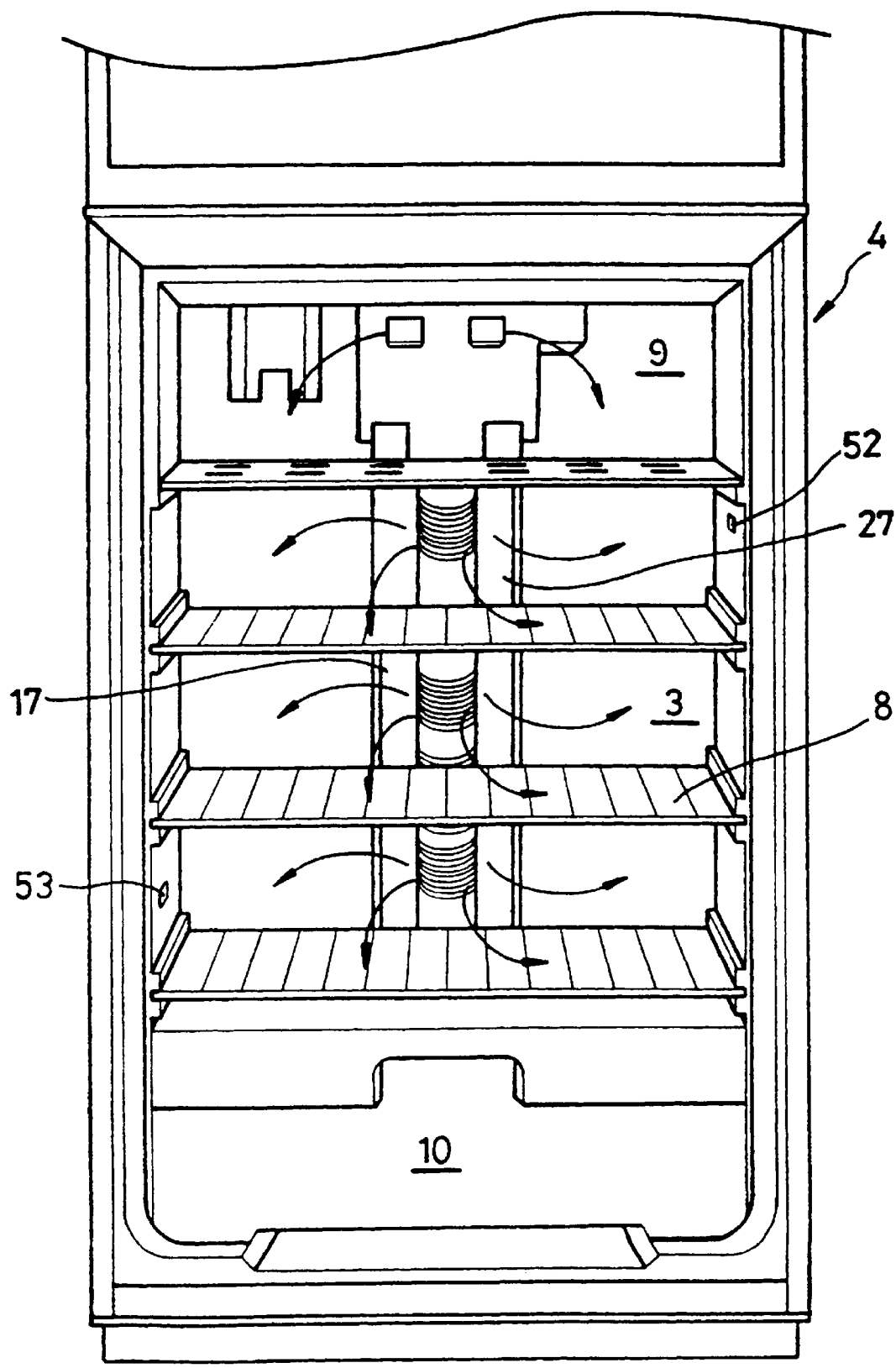
FIG._5B

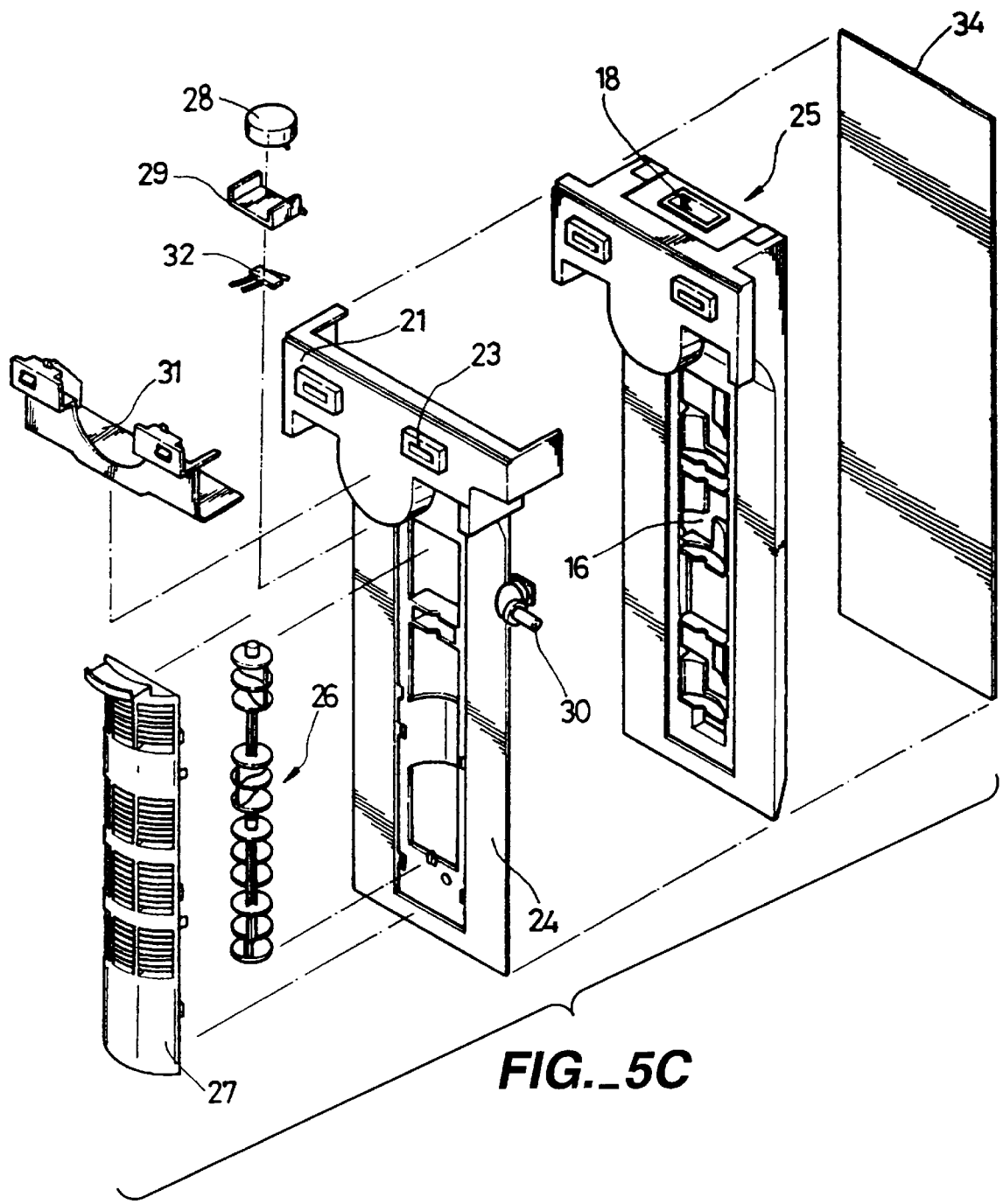
FIG._5C

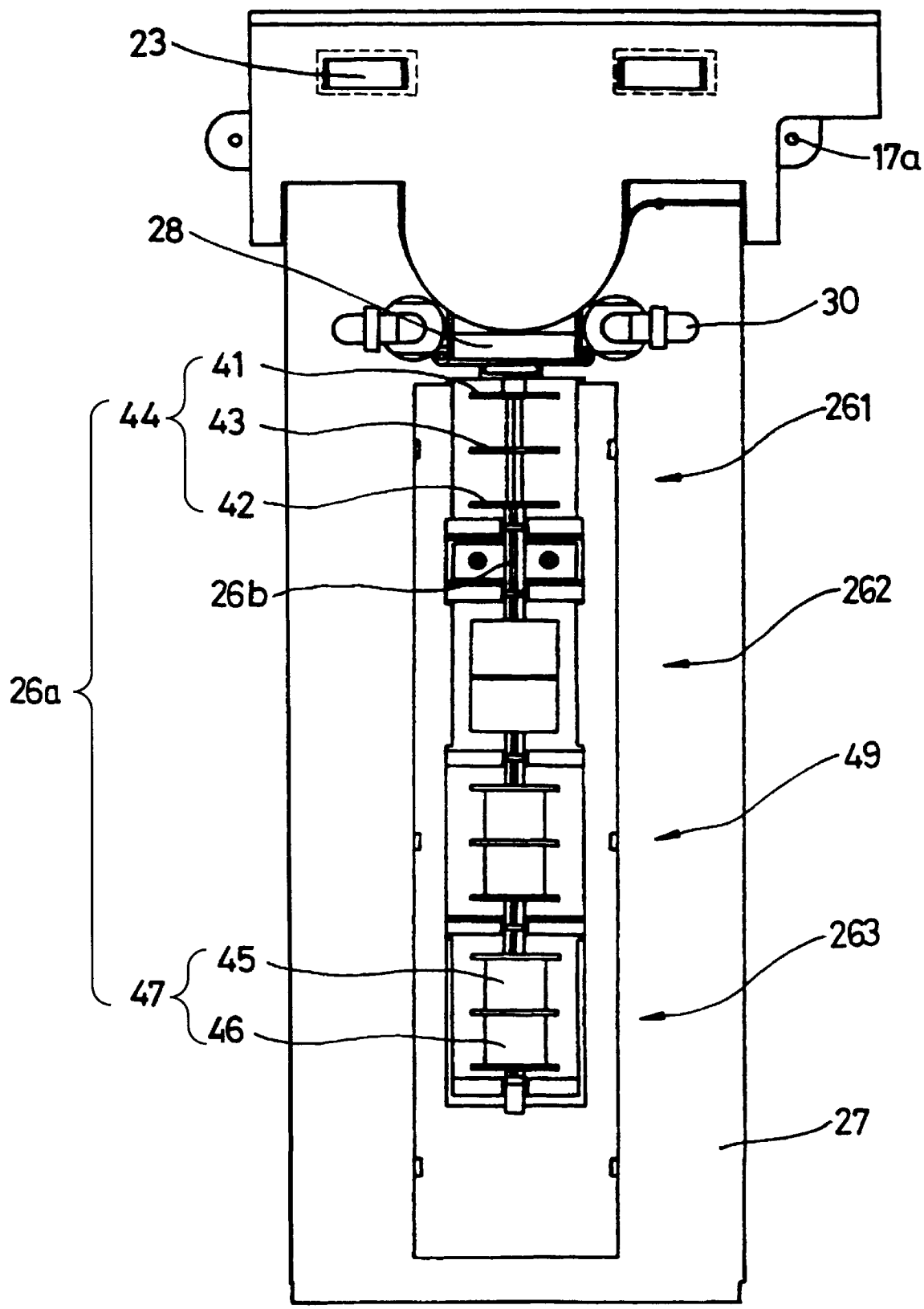
FIG._5D

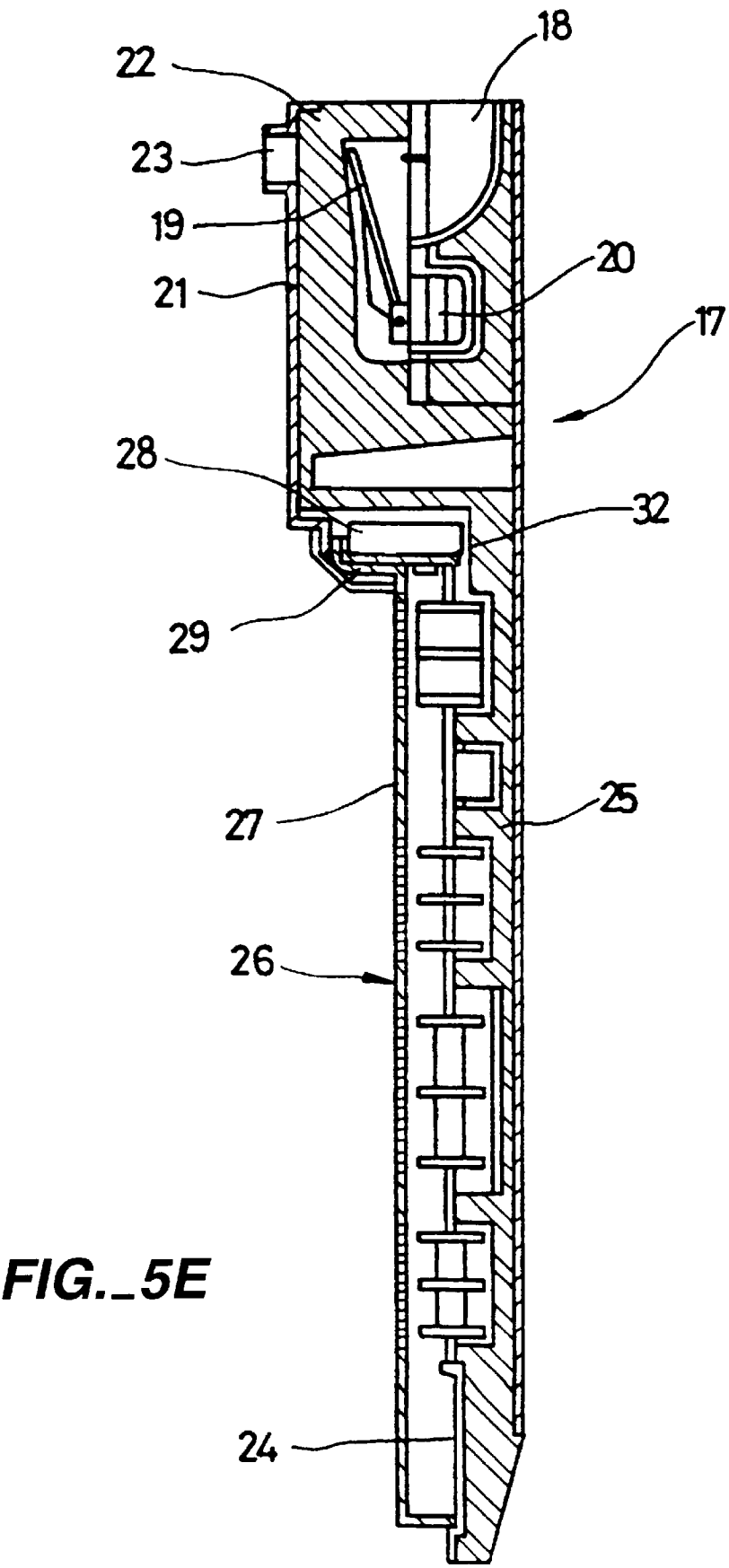
FIG._5E

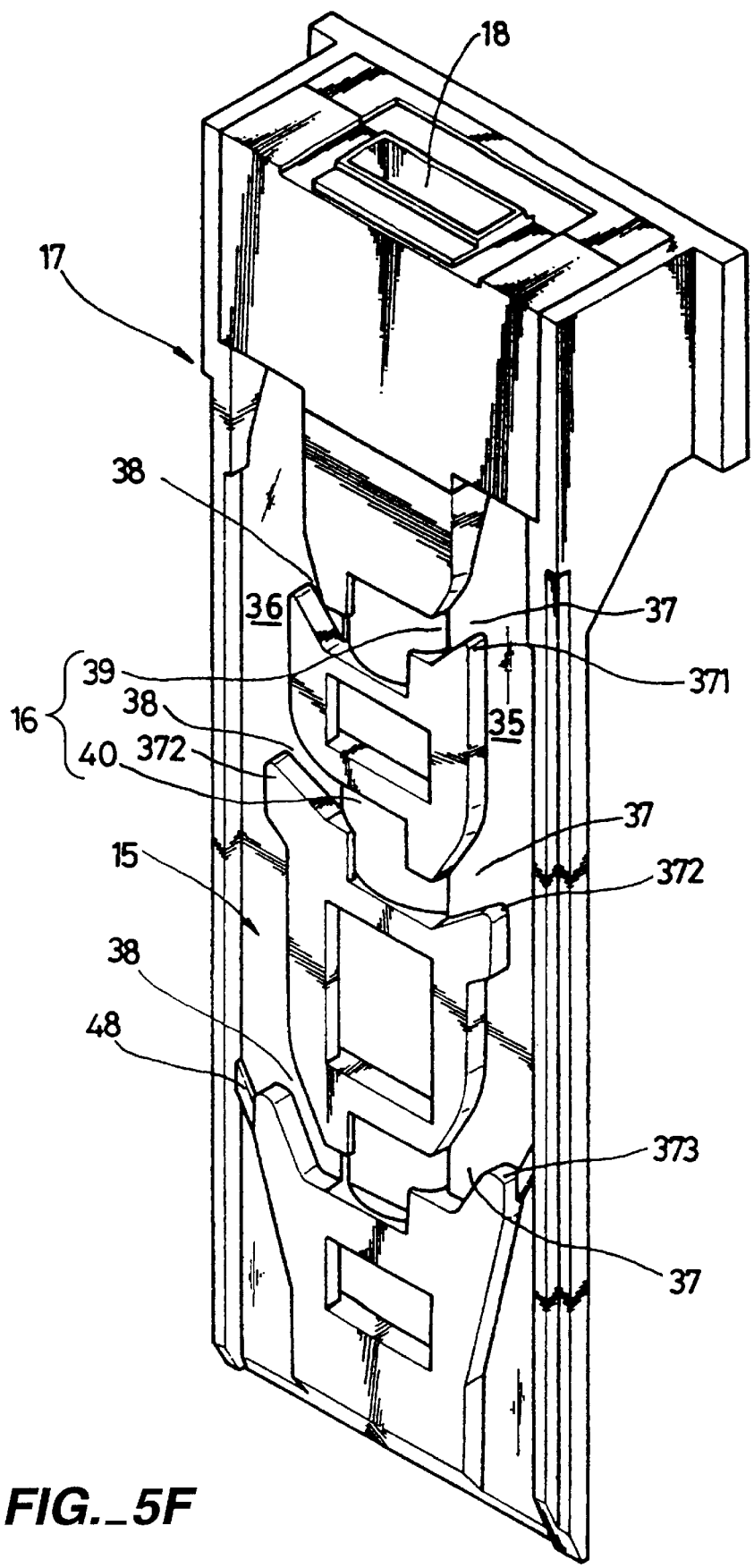
FIG._5F

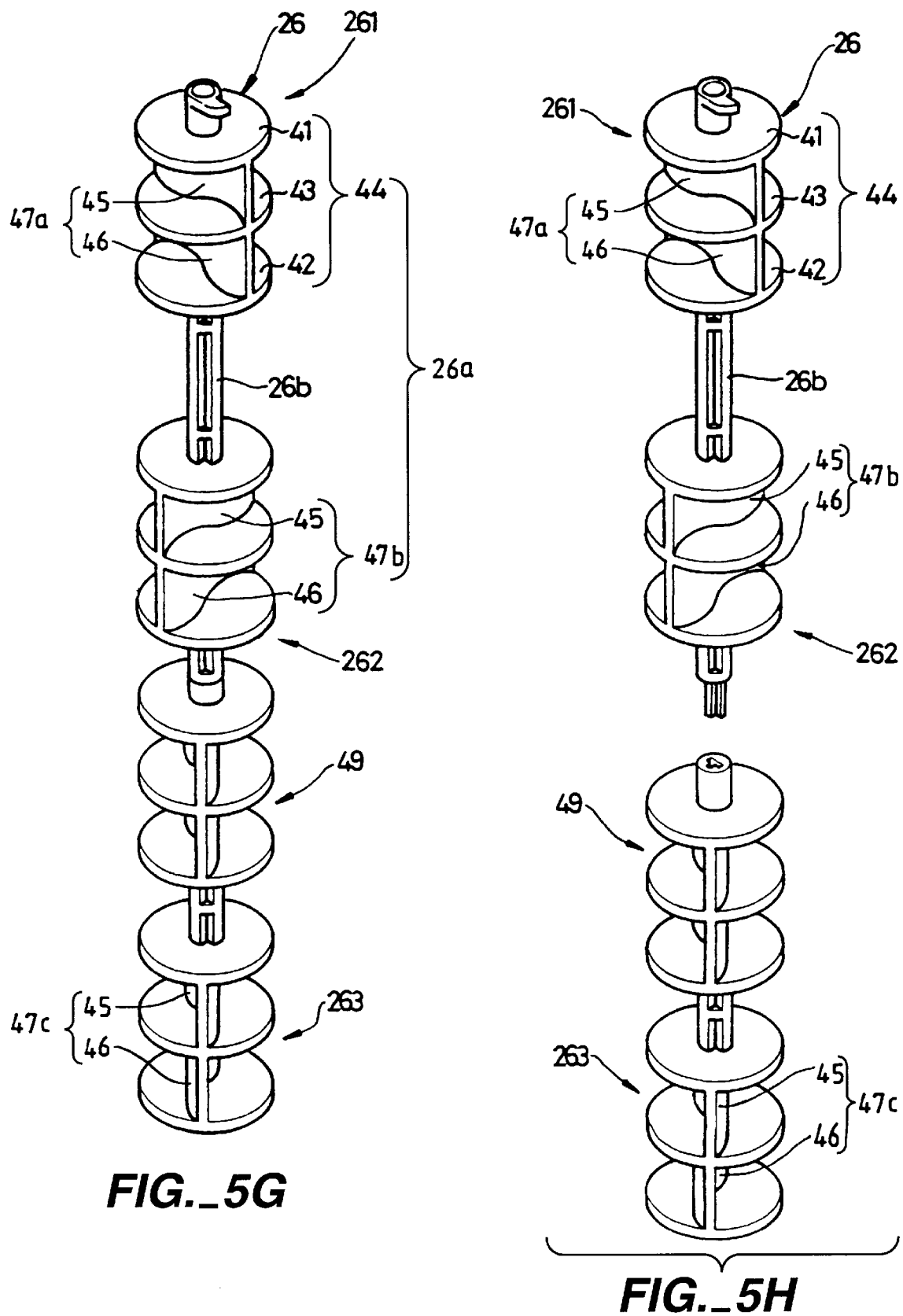
FIG._5G
FIG._5H

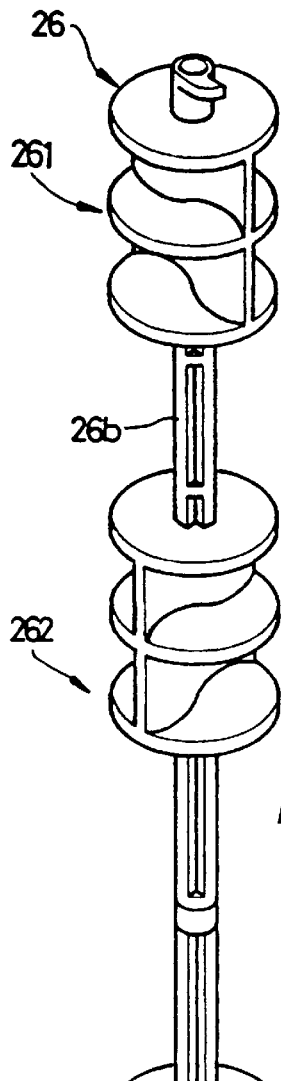
FIG._5I
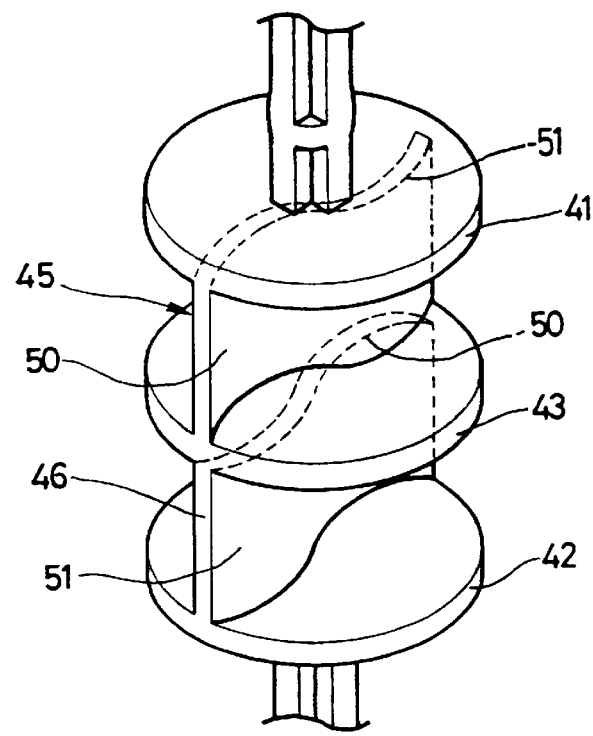
FIG._5K
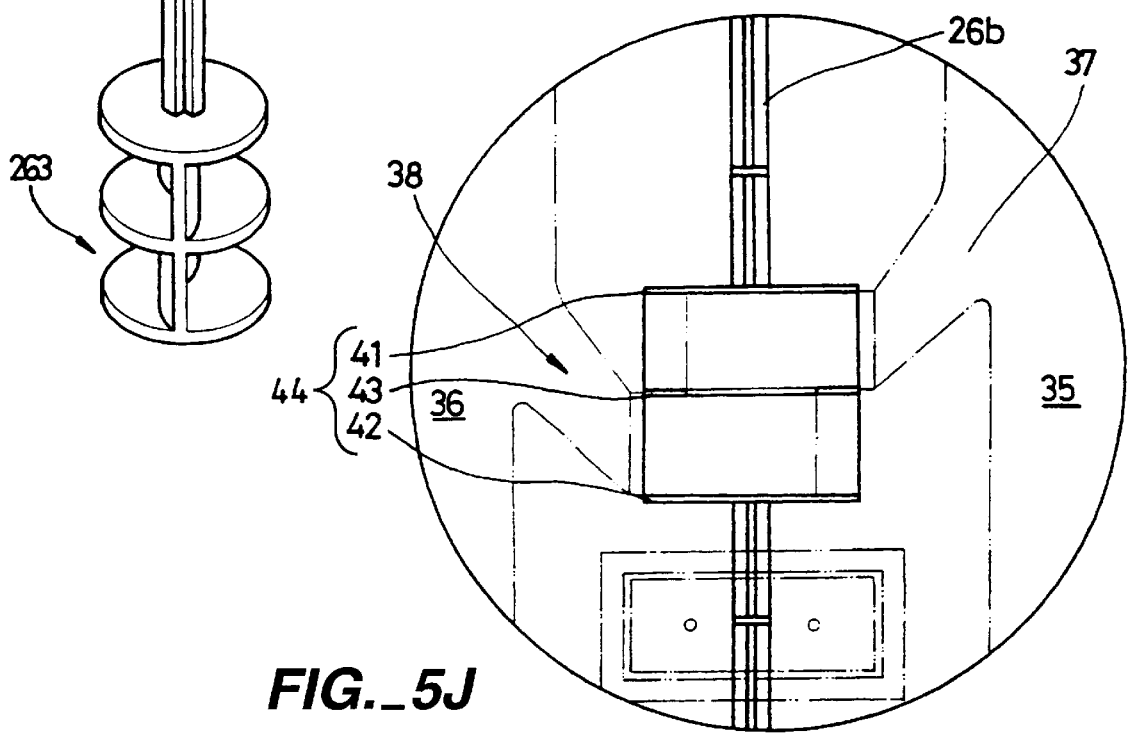
FIG._5J

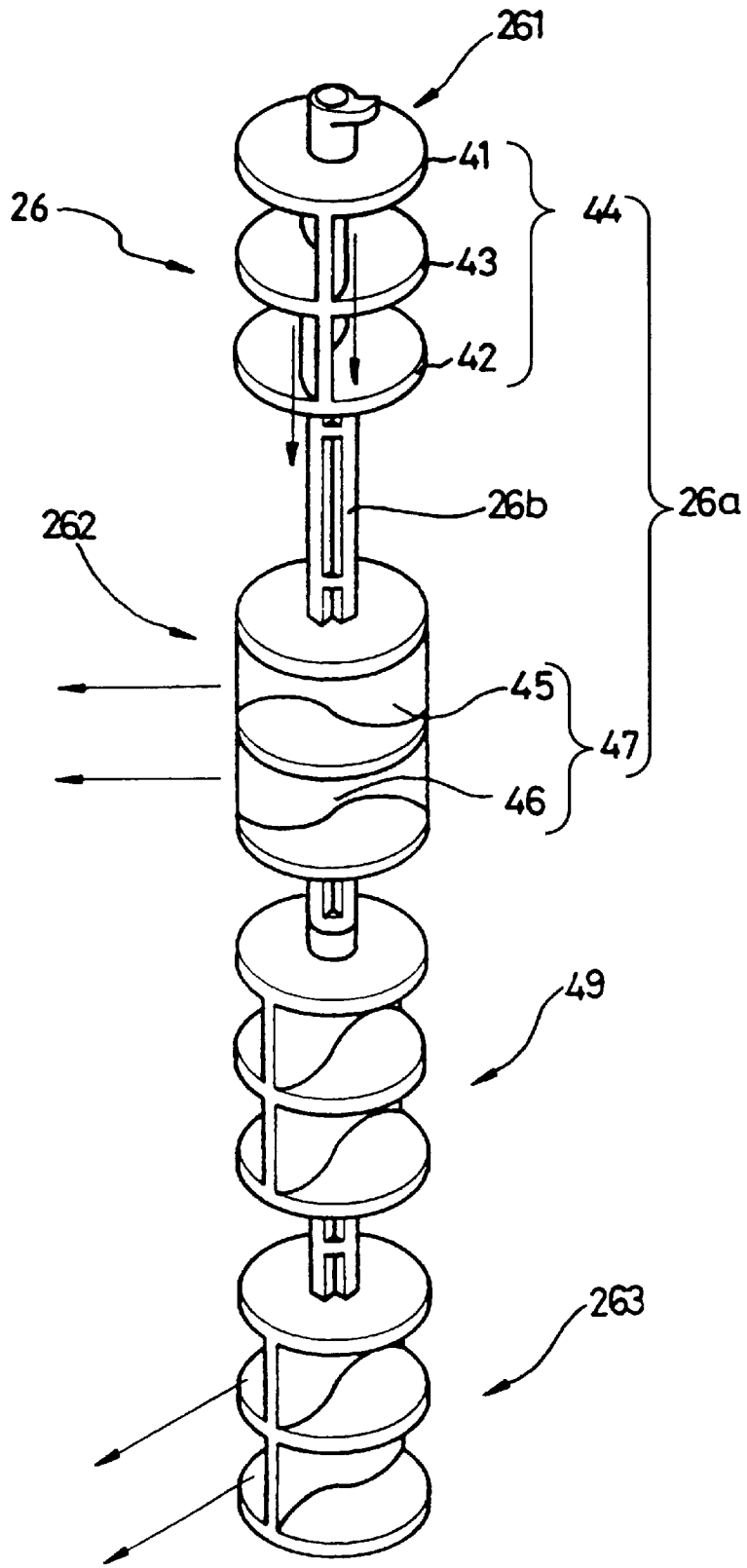
FIG._6A

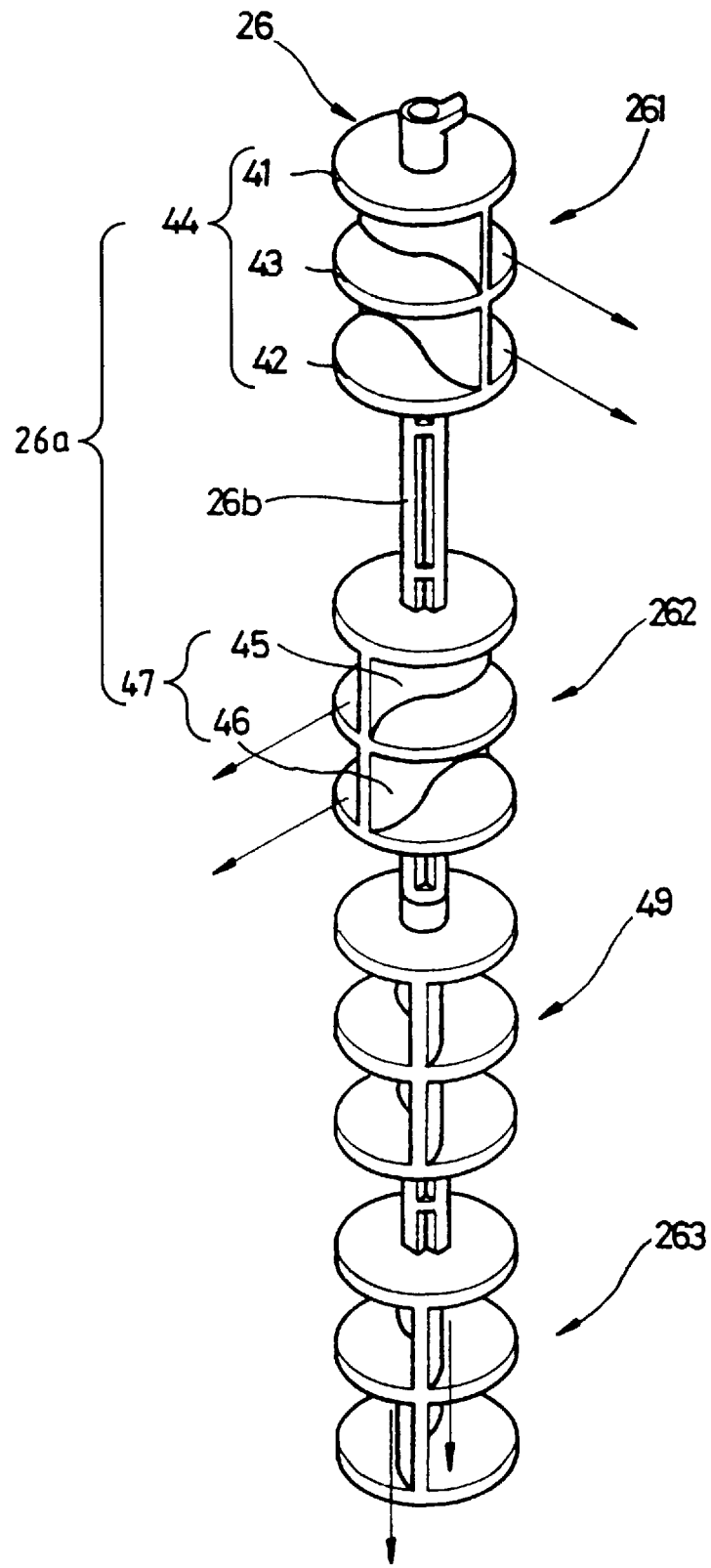
FIG._6B

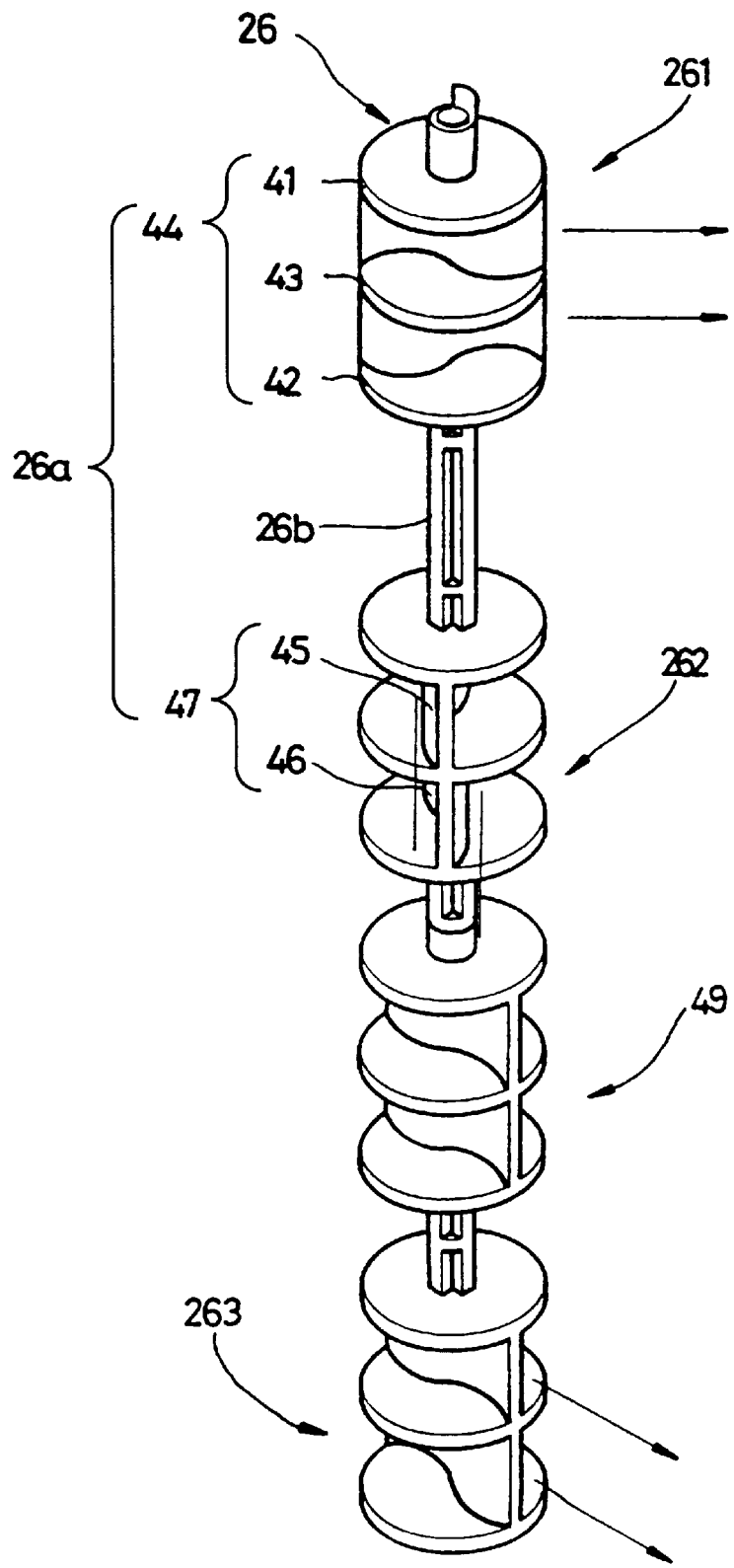
FIG._6C

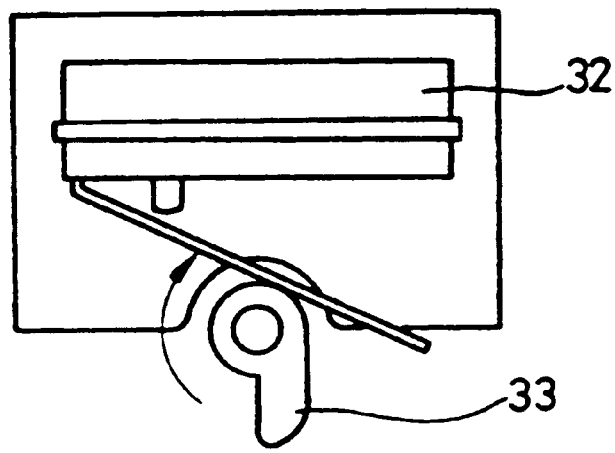
FIG._7A
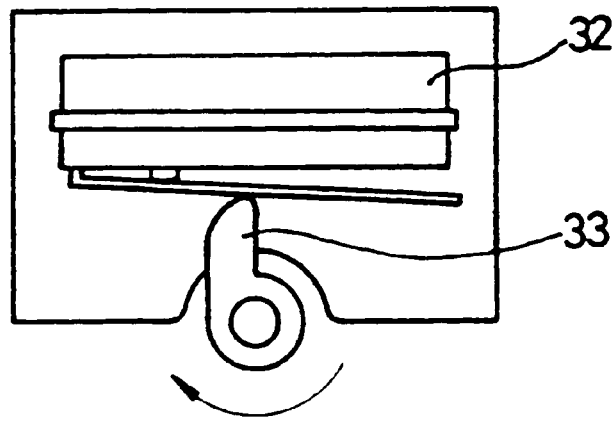
FIG._7B
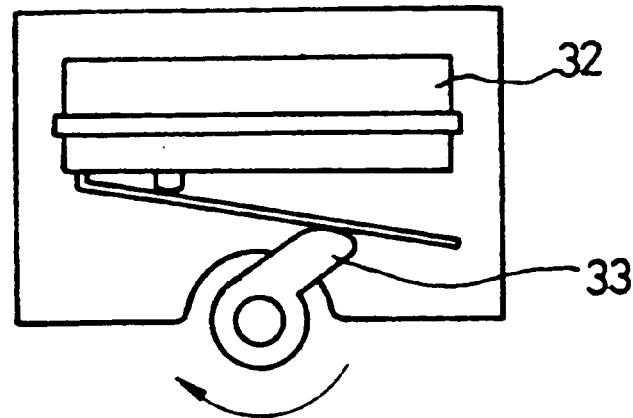
FIG._7C

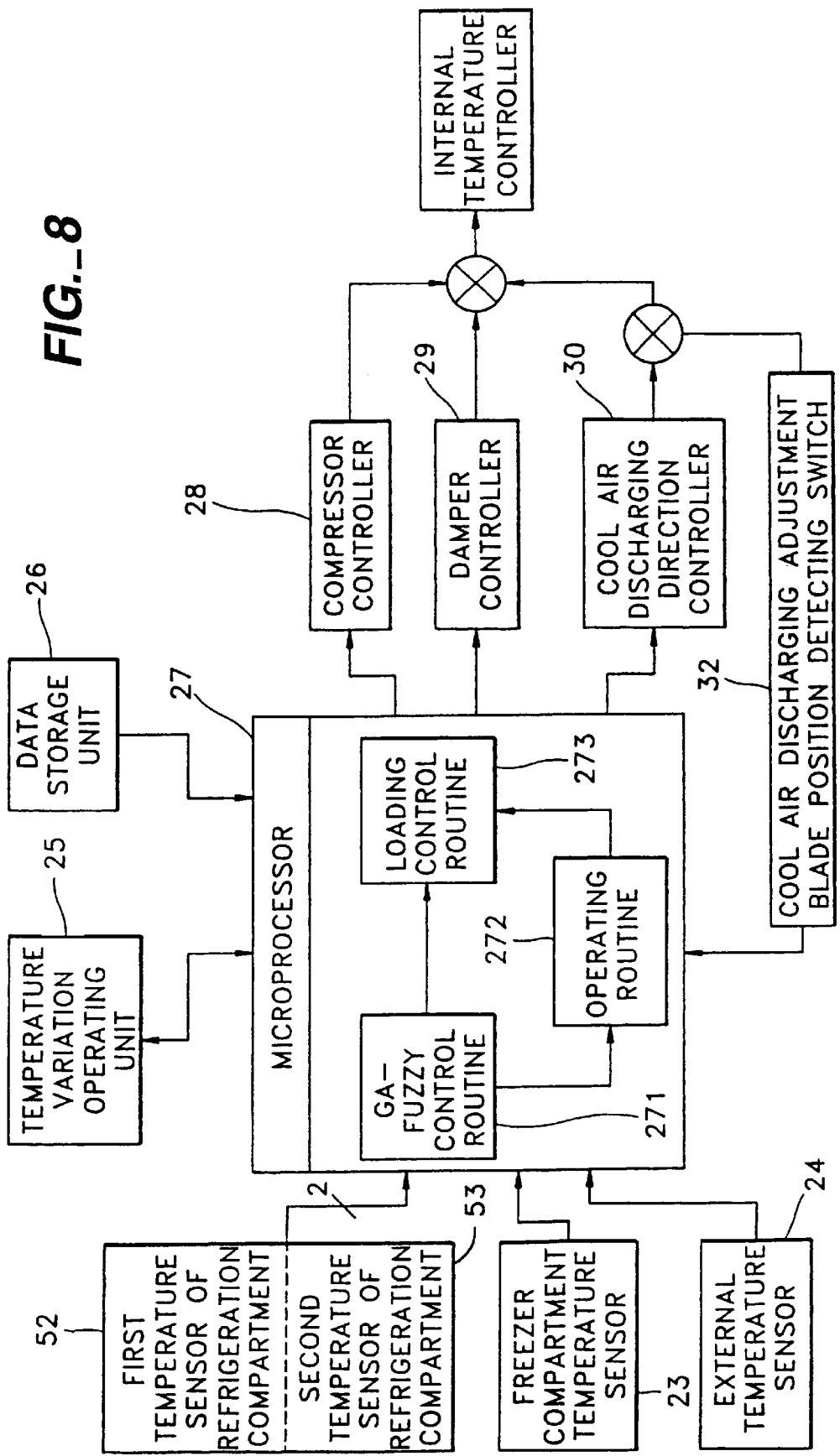

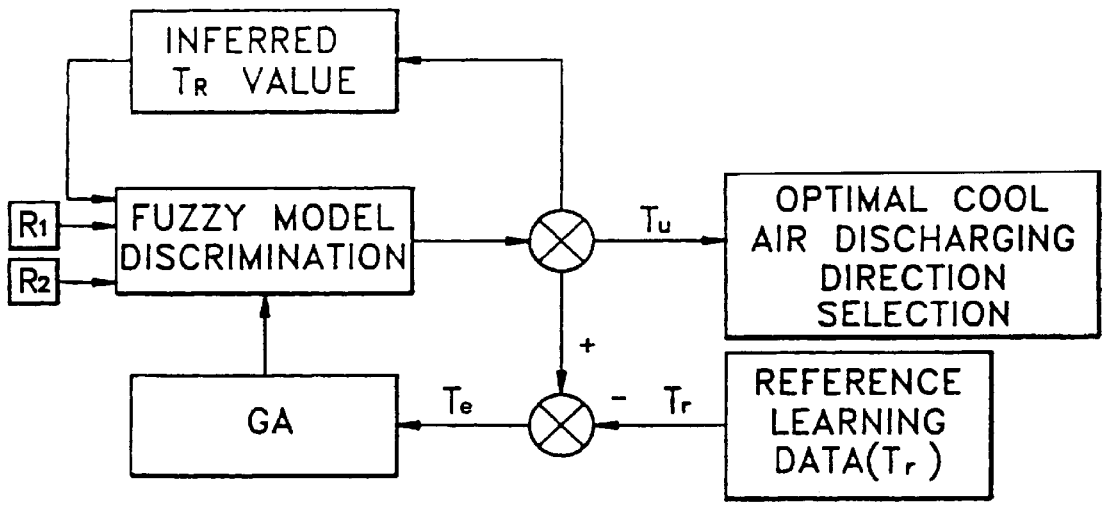
FIG._9
$$L_n^i = \text{If } x1 \text{ is } A1^i, x2 \text{ is } A2^i, ..., xm \text{ is } Am^i$$
$$\text{then } y_n^i = C0 + C1^i X + C2^i X + ... Cm^i Xm$$
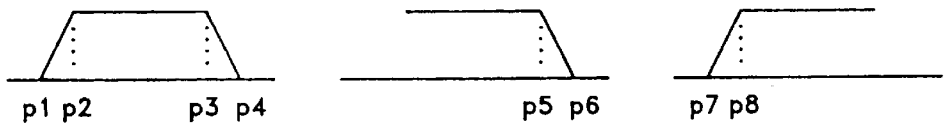
$$A_1(X) = (|x-p1| - |x-p2|)/(p2-p1) + (|x-p3| - |x-p4|)/(p3-p4)$$
$$A_2(X) = 0.5 + (|x-p5| - |x-p6|)/2(p5-p6)$$
$$A_3(X) = 0.5 + (|x-p7| - |x-p8|)/2(p8-p7)$$
FIG._11

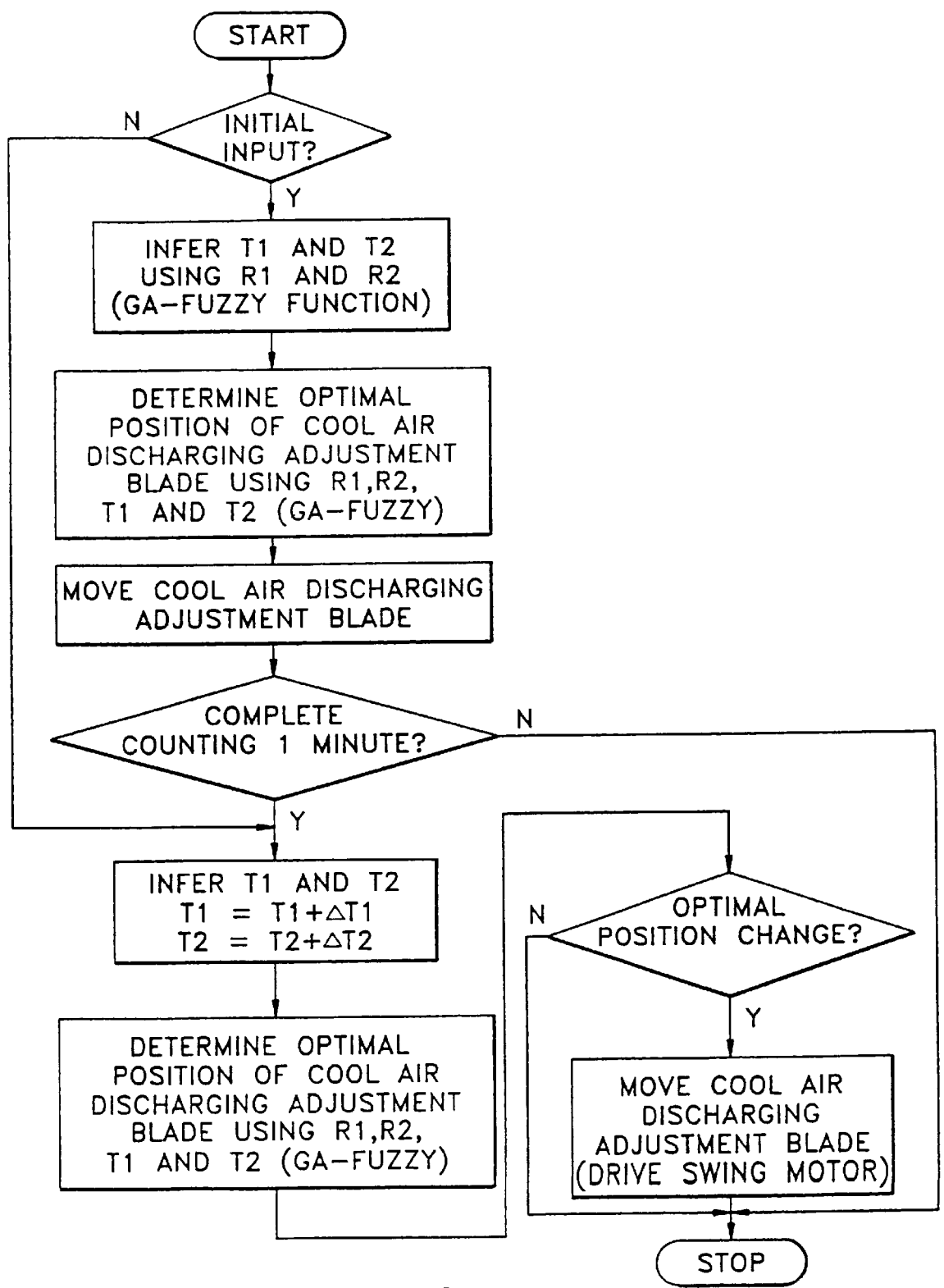
FIG._10

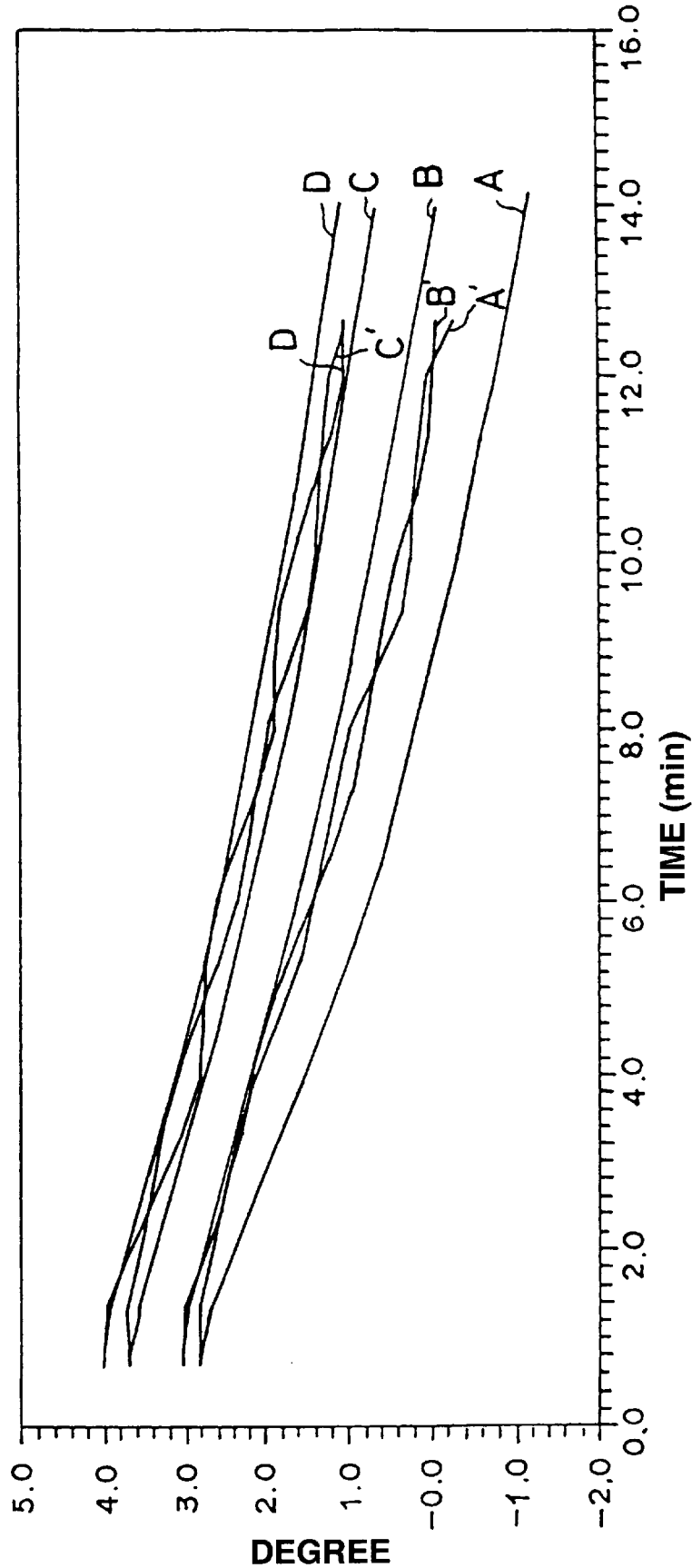
FIG._12

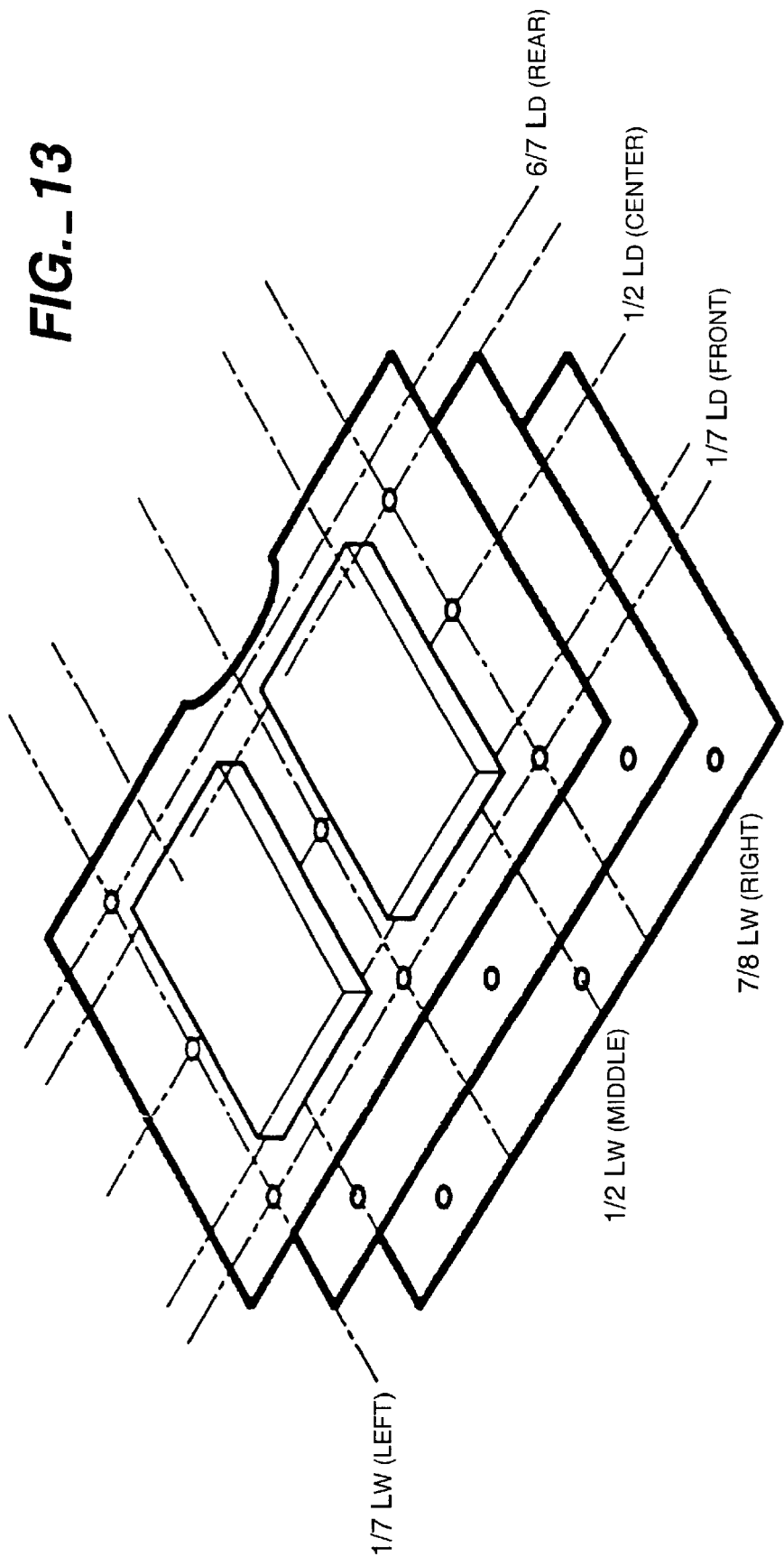
FIG._13

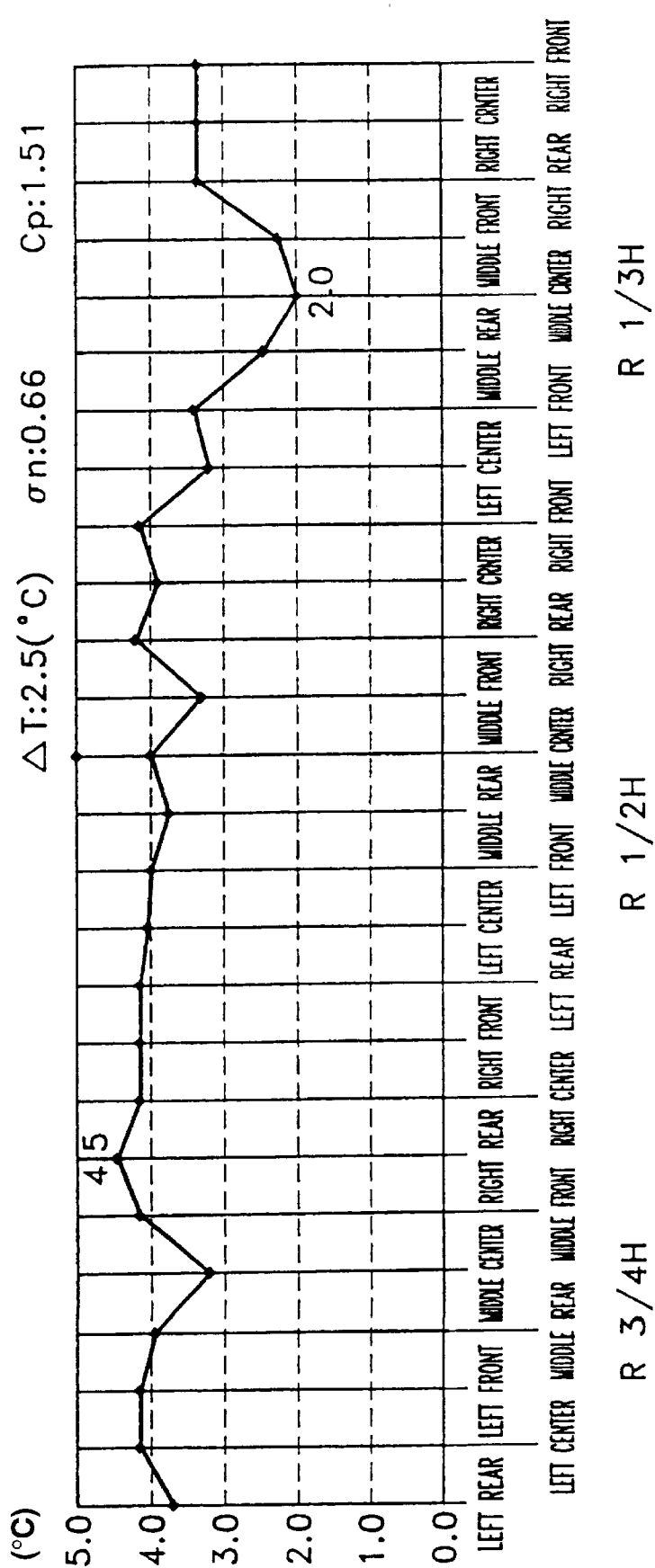
FIG._14 (PRIOR ART)

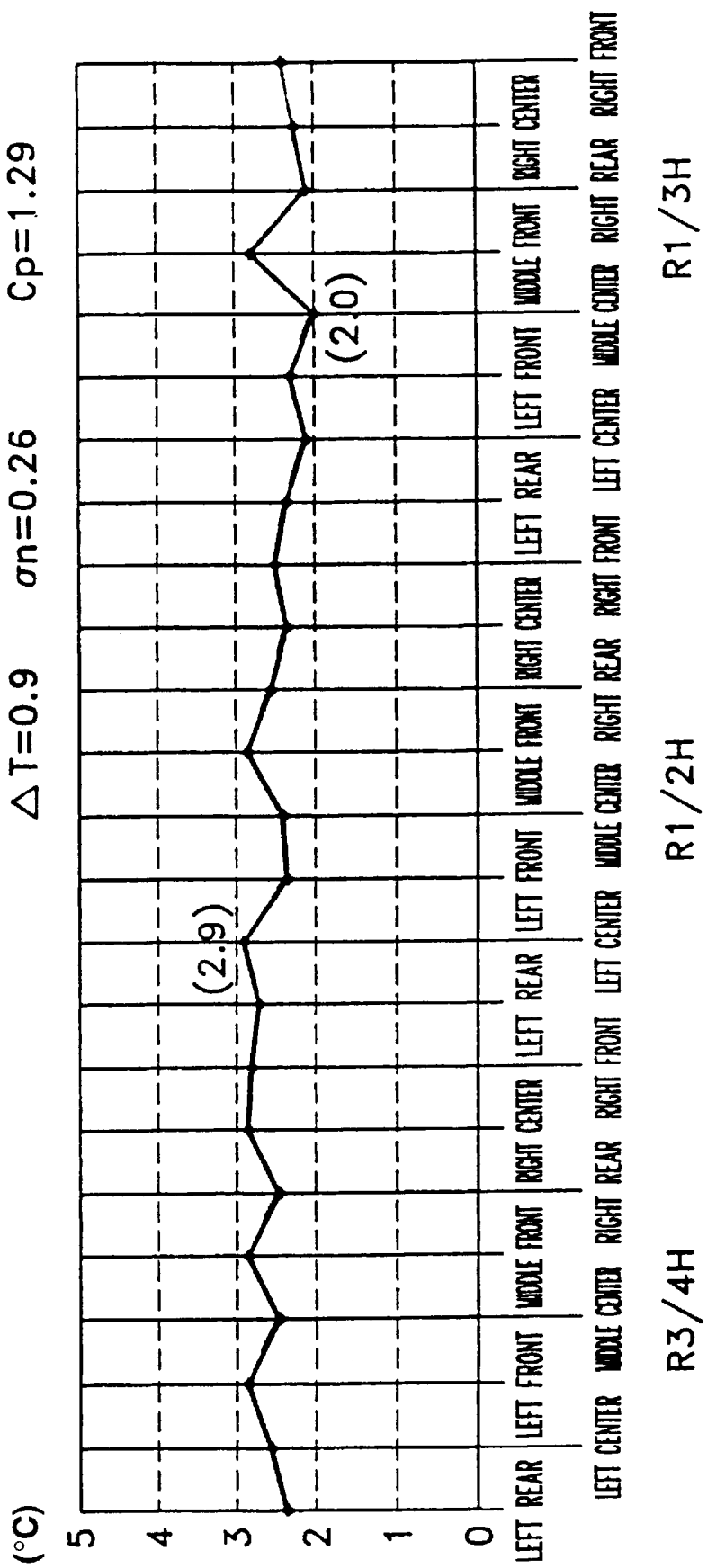
FIG._15

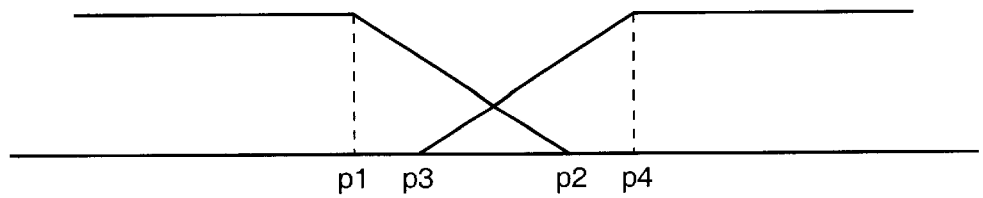
FIG._16
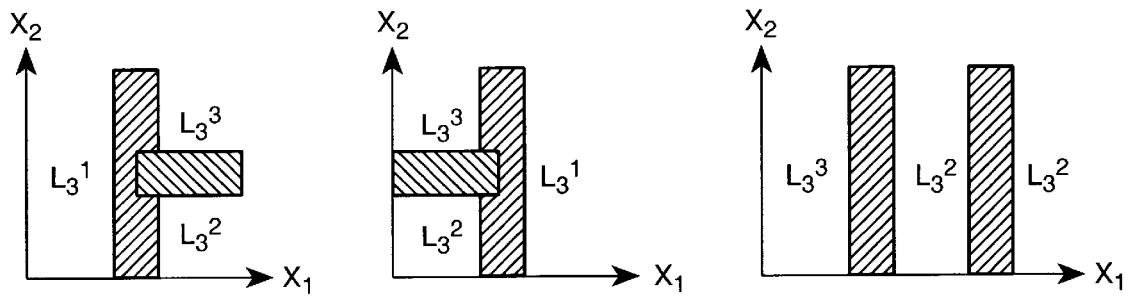
FIG._17A  FIG._17B  FIG._17C
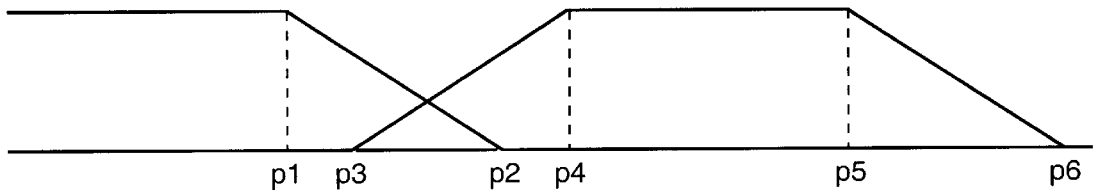
FIG._18
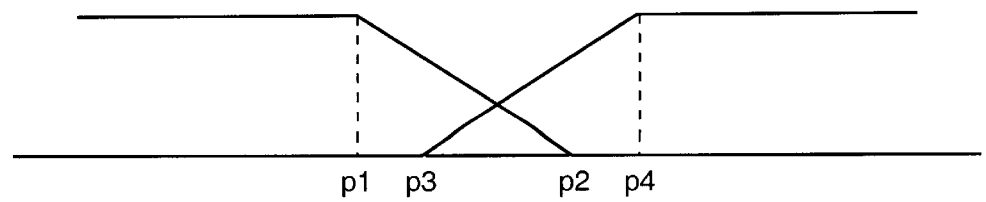
FIG._19

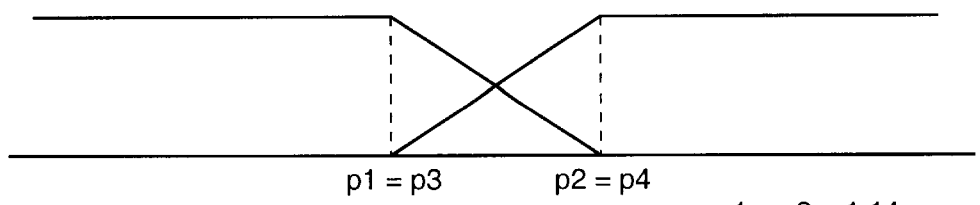
FIG._20
p1 = p3 = 1.14
p2 = p4 = 1.4
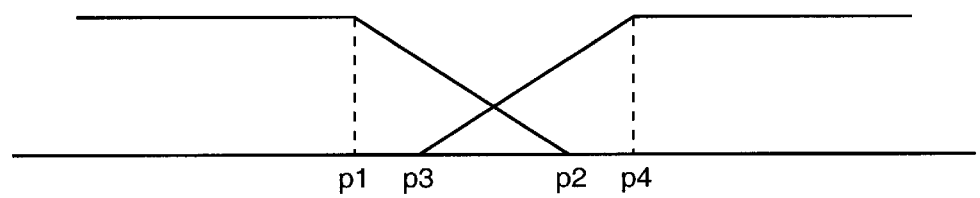
FIG._21
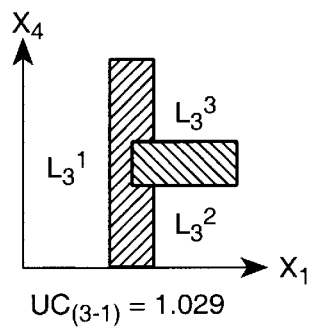
$UC_{(3-1)} = 1.029$
FIG._22A
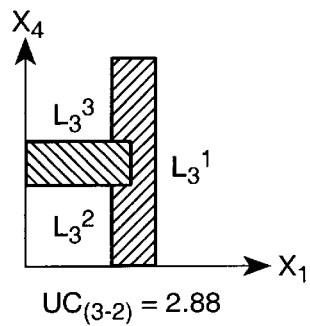
$UC_{(3-2)} = 2.88$
FIG._22B
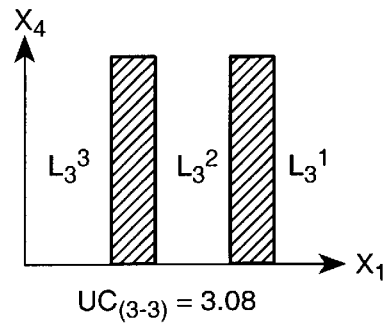
$UC_{(3-3)} = 3.08$
FIG._22C
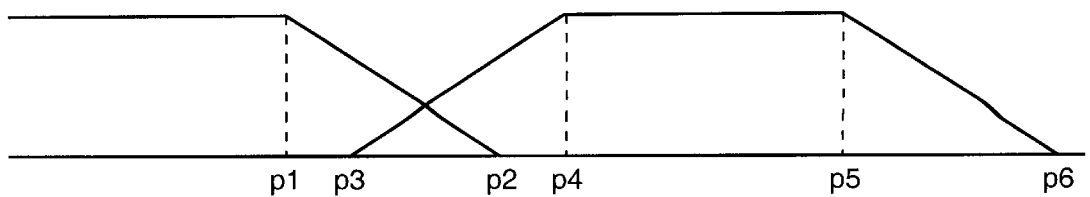
FIG._23

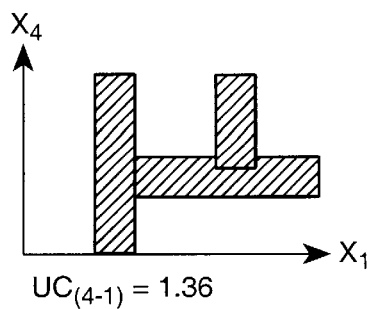
$UC_{(4-1)} = 1.36$
FIG._24A
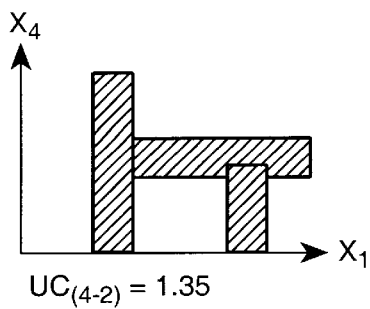
$UC_{(4-2)} = 1.35$
FIG._24B
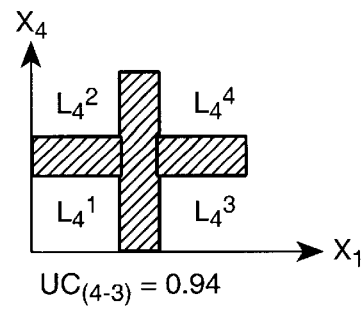
$UC_{(4-3)} = 0.94$
FIG._24C
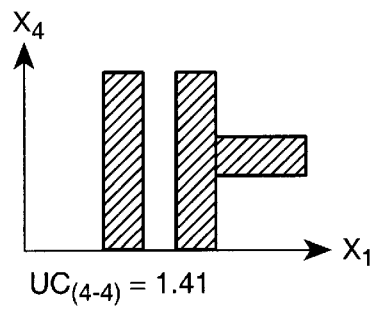
$UC_{(4-4)} = 1.41$
FIG._24D
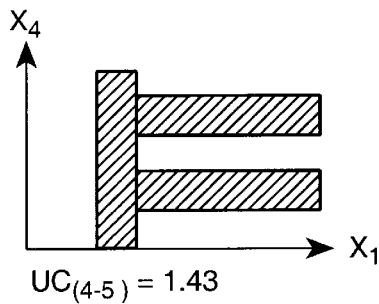
$UC_{(4-5)} = 1.43$
FIG._24E
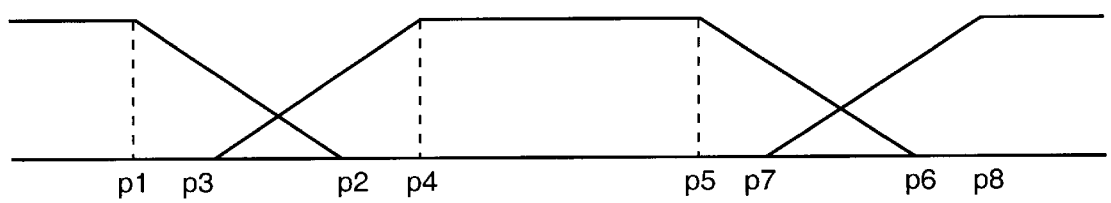
FIG._25
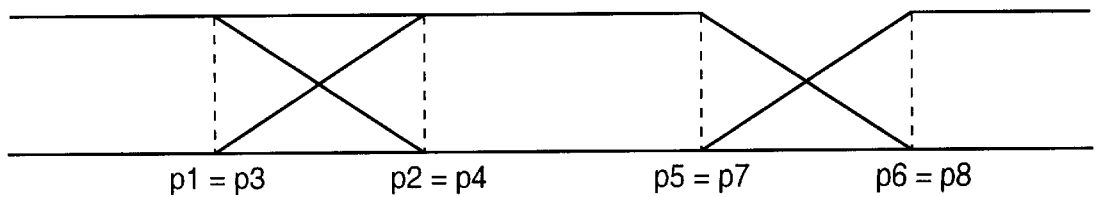
$p1 = p3 = 1.33$
$p5 = p7 = 1.9$
$p2 = p4 = 3.49$
$p6 = p8 = 4.39$
FIG._26

REFRIGERATOR, TEMPERATURE CONTROLLING APPARATUS THEREFOR AND METHOD THEREOF ADOPTING GA-FUZZY INFERENCE TECHNIQUE

This application is a continuation of application Ser. No. 08/559,380, filed Nov. 15, 1995.

BACKGROUND OF THE INVENTION

The present invention relates to a refrigerator, a temperature controlling apparatus therefor and a method thereof, and more particularly, to a temperature controlling apparatus and method for use in a refrigerator which adopts a genetic algorithm (GA) fuzzy inference technique for achieving rapid and uniform distribution of a set temperature in the refrigerator.

As shown in FIG. 1, a refrigerator generally has a main body 4 of a thermal insulating structure including a freezer compartment 2 and a refrigeration compartment 3, with the compartments being separated by a partition 1 and provided with respective doors 6 and 7. Here, main body 4 comprises a cabinet 4a as the refrigerator's frame, a liner 4b formed on the interior of cabinet 4a, and foam material 4c filling the space between the cabinet and liner.

A compressor 11a is installed in a machine compartment 11 below refrigeration compartment 3; a condensing unit and pressure reducer (not shown) are installed on main body 4 or in machine compartment 11; and an evaporator 12 is installed behind the rear wall of freezer compartment 2. By coupling these elements together via refrigerant pipes, an air-cooling circulation cycle is performed. Also, a cooling fan 13 for forcibly blasting cool air generated at evaporator 12 into freezer and refrigeration compartments 2 and 3 is installed above evaporator 12. A fan guide 14 for guiding the supply of the cool air is situated in front of cooling fan 13. A cool air duct 15a is provided behind the rear wall of refrigeration compartment 3. A cool air adjusting damper 19 controls the amount of cool air supplied to refrigeration compartment 3. Shelves 8 for holding foodstuffs are spaced evenly inside refrigeration compartment 3.

A discharging-per-partition type is generally adapted as a method of supplying cool air to a refrigeration compartment in a conventional refrigerator. As shown in FIG. 2, cool air discharging apertures 16a are vertically arrayed in cool air duct 15a at the rear wall of refrigeration compartment 3 and correspond to the position of each of shelves 8. Thus, cool air is discharged into every area partitioned by shelves 8.

However, in a refrigerator of such a discharging-per-partition type, since the cool air is simply discharged, straight in front of cool air discharging aperture 16a, uniform cooling cannot be achieved due to the severe temperature distribution within the compartment.

To overcome the above problem, a refrigerator of a three-dimensional cooling type has recently been proposed. As shown in FIG. 3, the three-dimensional cooling type is featured in that cool air is discharged not only from cool air discharging apertures 16a formed on the rear wall but also from apertures 16b formed on both side walls.

However, though the cool air is discharged from the three sides of the above-described refrigerator, the cool air is simply discharged toward the compartment's interior and not dispersed, so that there is a limit of uniformly maintaining the temperature distribution between those portions of the refrigerator's interior which directly juxtapose the cool air discharging apertures and those which do not. Also, since the direction and amount of the discharged cool air are not controlled, particular portions of the interior cannot be cooled as required. That is, when a portion of the interior is at a relatively high temperature due the placement of warm or uncooled foodstuff or when cool air circulation is impeded by such placement, the maintenance of uniform compartment temperature, for example, by an intensified cooling action, is rendered impossible.

These problems become more critical when large-capacity refrigerators are considered. To rapidly and uniformly control the temperature distribution in the interior of such a refrigerator, a temperature controlling apparatus of fuzzy inference is generally employed, as shown in FIG. 4. The temperature of a refrigeration compartment, detected by an internal temperature sensor 104, changes according to unspecified varying factors such as external temperature detected by an external temperature sensor 101, door opening frequency detected by a door opening frequency counter 102, and a temperature variation rate calculated by a temperature-variation-rate calculator 103 according to the external temperature and the door opening frequency. Here, the temperature is controlled by using electromotive damper 105, compressor 106, and a fan motor 107. In doing so, fuzzy inference is applied by a fuzzy controlling apparatus 100 so that the temperature distribution is made rapidly and uniformly by supplying cool air while considering the above temperature variation factors, according to the compensation for external temperature and the status of stored foodstuffs.

However, since-only the fuzzy rule for analyzing the inputs according to unspecified temperature variation factors is adopted for the temperature controlling apparatus and method in such a refrigerator, the external temperature cannot be compensated for and the internal temperature control is unsatisfactory. That is, the cool air cannot be concentrated toward warm foodstuff due to the simple cool air discharging type or be properly supplied for compensating for temperature differences between each partitioned area, due to the higher temperature of the stored foodstuff or frequent door opening.

SUMMARY OF THE INVENTION

To solve the above problems, it is a first object of the present invention to provide a refrigerator in which the temperature distribution of the entire space in the refrigerator is uniformly maintained by intensively discharging cool air to a particular portion of high temperature in the refrigerator requiring a concentrated cooling or by dispersing the cool air which is discharged into a compartment thereof.

It is a second object of the present invention to provide a refrigerator in which the malfunction of a motor for driving a cool air discharging adjustment blade can be prevented by preventing the introduction of moisture (icing) to the motor.

It is a third object of the present invention to provide a refrigerator in which the cool air is discharged into the refrigerator but has difficulty being guided downward via a cooling discharging aperture, though the cool air discharging adjustment blade is rotated at a low speed.

It is a fourth object of the present invention to provide a refrigerator temperature controlling apparatus and a method thereof adopting a GA-fuzzy inference technique by which the temperature distribution in the refrigerator, particularly in a refrigeration compartment, rapidly achieves set temperature distribution.

Accordingly, to achieve the above objects, there is provided a refrigerator comprising: a main body including a freezer compartment and a refrigeration compartment, each being partitioned; an evaporator for generating and supplying cool air to the freezer and refrigeration compartments; a housing formed at one side of the refrigeration compartment and having a guide passage for guiding the cool air generated from the evaporator to the refrigeration compartment and a cool air passage for guiding downward the cool air passing through the guide passage; and a plurality of discharging apertures formed vertically at the housing and for guiding the cool air flowing along the cool air passage so as to be discharged being dispersed throughout the refrigeration compartment.

It is preferred in the present invention that the discharging apertures are situated at the center portion of the housing, and the cool air passage comprises first and second passage portions arranged both sides of the discharging apertures.

It is preferred in the present invention that the plurality of discharging apertures are arranged vertically to correspond with each partitioned area of the refrigeration compartment, and the cool air passage comprises a first linking path for linking the first passage portion and the discharging apertures and a second linking path for linking the second passage portion and the discharging apertures.

It is preferred in the present invention that each discharging aperture comprises a first discharging portion directly connected to the first linking path and a second discharging portion directly connected to the second linking path, that the first and second discharging portions are interconnected and reciprocally stepped such that the first discharging portion is inclined toward the first linking path, and that the second discharging portion is inclined toward the second linking path.

It is preferred in the present invention that the upper side of inlets of the first and second linking paths are rounded, and that the lower side is formed by flanges to be extended more outwardly than the upper side thereof.

It is preferred in the present invention that the flange at the lower portion is extended beyond that at the upper portion.

To achieve the above objects, there is also provided a refrigerator comprising: a main body including a freezer compartment and a refrigeration compartment, each being partitioned; an evaporator for generating and supplying cool air to the freezer and refrigeration compartments; a housing formed at one side of the refrigeration compartment and having a guide passage for guiding the cool air generated from the evaporator to the refrigeration compartment and a cool air passage for guiding downward the cool air passing through the guide passage; a plurality of discharging apertures formed vertically at the housing and for guiding the cool air flowing along the cool air passage so as to be discharged throughout the refrigeration compartment; a cool air discharging adjustment blade rotatably installed at the housing for controlling the discharging direction of the cool air which is discharged through the discharging apertures; and a driving motor for rotating the cool air discharging adjustment blade.

In the present invention, it is preferred that the cool air discharging adjustment blade comprises: a distributing plate having an upper plate and a lower plate spaced apart from each other by a predetermined distance, and a middle plate; and a dispersion guiding blade portion having a first dispersion guiding blade vertically connecting the upper plate and the middle plate and a second dispersion guiding blade for vertically connecting the middle plate and the lower plate, wherein the first and second dispersion guiding blades have a concave portion and a convex portion each successively being rounded.

It is preferred that the concave portions of the first and second dispersion guiding blades or the convex portions thereof are opposite to each other, respectively.

It is preferred that the cool air discharging adjustment blade includes a cool air guiding portion having the distributing plate and dispersion guiding blade, the cool air guiding portion has an upper cool air guiding portion, a middle cool air guiding portion and a lower cool air guiding portion, respectively corresponding to the upper, middle and lower portions of the refrigeration compartment, and integrally connected by a supporting member, that the dispersion guiding blade of the upper cool air guiding portion and that of the middle cool air guiding portion are disposed to be almost perpendicular to each other, and that the dispersion guiding blade of the upper cool air guiding portion and that of the lower cool air guiding portion are disposed to form an angle of about 45°.

Assuming the height of the refrigeration compartment is H, it is preferred that the upper cool air guiding portion is positioned at a point 3H/4 of the height thereof, the middle cool air guiding portion is positioned at a point 1H/2 of the height thereof, and the lower cool air guiding portion is positioned at a point 1H/3 of the height thereof.

It is preferred that the cool air discharging adjustment blade includes an upper cool air discharging adjustment blade and a lower cool air discharging adjustment blade, which is coupled in pairs, the upper and middle cool air guiding portions being disposed in the upper cool air discharging adjustment blade, and the lower cool air guiding portion being disposed in the lower cool air discharging adjustment blade.

It is preferred that the refrigerator further comprises: a first temperature sensor installed in the upper end of one side wall of the refrigeration compartment; a second temperature sensor installed in the lower end of another side wall of the refrigeration compartment; a position detecting switch turned on/off in accordance with the rotation position of the cool air discharging adjustment blade; and a controller electrically connected with the first and second temperature sensors and the position detecting switch for determining the rotation position of the cool air discharging adjustment blade for intensive cooling, wherein the position detecting switch is installed in the housing of the upper portion of the cool air discharging adjustment blade, and there is provided an operating protrusion for switching on/off the position detecting switch by being rotated with the cool air discharging adjustment blade in the upper portion thereof.

It is preferred that the operating protrusion is formed such that the portion contacting with the position detecting switch is rounded.

It is preferred that the driving motor is installed in the housing of the upper portion of the cool air discharging adjustment blade, and preferably, is installed in a motor case.

It is preferred that an internal refrigerator lamp is installed in the housing, adjacent to the driving motor.

Also, to accomplish the above objects, there is provided a refrigerator comprising: a main body including a freezer compartment and a refrigeration compartment, each being partitioned; an evaporator for generating and supplying cool air to the freezer and refrigeration compartments; a housing formed at one side of the refrigeration compartment and having a guide passage for guiding the cool air passing through the evaporator to the refrigeration compartment; a cool air passage formed at both sides of the housing so as to be connected with the guide passage and having a first passage portion and a second passage portion each for guiding a flow of the cool air passing through the guide passage; a plurality of discharging apertures disposed vertically between the first and second passage portions for guiding the cool air flowing along the cool air passage to be discharged to the refrigeration compartment; a cool air discharging adjustment blade rotatably installed in front of the housing for dispersing and concentrating the cool air discharged through the discharging apertures; and a driving motor for rotating the cool air discharging adjustment blade.

In the present invention, it is preferred that the cool air passage further includes a first linking path for linking the first passage portion with the discharging apertures and a second linking path for linking the second passage portion with the discharging apertures, the respective discharging apertures have a first discharging portion directly linked with the first linking path and a second discharging portion directly linked with the second linking path, the first and second discharging portions are interconnected and are reciprocally stepped such that the first discharging portion is inclined toward the first linking path and the second discharging portion is inclined toward the second linking path.

It is preferred that the upper side of inlets of the first and second linking paths are rounded, and that the lower side thereof is formed by flanges so as to be extended more outwardly than the upper'side thereof.

It is preferred that the lower flanges extend beyond the upper ones.

It is preferred that the cool air discharging adjustment blade comprises: a distributing plate having a middle plate positioned in the boundary surface of the first and second discharging portions, an upper plate and a lower plate spaced apart up and down from each other by a distance corresponding to the heights of the first and second discharging portions; and a dispersion guiding blade portion having a first dispersion guiding blade vertically connecting the upper plate and the middle plate and a second dispersion guiding blade for vertically connecting the middle plate and the lower plate, wherein the first and second dispersion guiding blades have a concave portion and a convex portion each successively being rounded.

It is preferred that the concave portions of the first and dispersion guiding blades or the convex portions thereof are opposite to each other, respectively.

It is preferred that the distributing plate has an upper cool air guiding portion, a middle cool air guiding portion, and a lower cool air guiding portion, respectively corresponding to upper, middle and lower portions of the refrigeration compartment, and integrally connected by a supporting member.

It is preferred that the dispersion guiding blade of the upper cool air guiding portion and that of the middle cool air guiding portion are disposed to be almost perpendicular to each other, and the dispersion guiding blade of the upper cool air guiding portion and that of the lower cool air guiding portion are disposed to form an angle of about 45°.

Assuming that the height of the refrigeration compartment is H, it is preferred that the upper cool air guiding portion is positioned at a point 3H/4 of the height thereof, the middle cool air guiding portion is positioned at a point 1H/2 of the height thereof, and the lower cool air guiding portion is positioned at a point 1H/3 of the height thereof.

It is preferred that the refrigerator further comprises: a first temperature sensor installed in the upper end of one side wall of the refrigeration compartment; a second temperature sensor installed in the lower end of the other side wall of the refrigeration compartment; a position detecting switch turned on/off in accordance with the rotation position of the cool air discharging adjustment blade; and a controller electrically connected with the first and second temperature sensors and the position detecting switch for determining the rotation position of the cool air discharging adjustment blade for performing intensive cooling.

It is preferred that the position detecting switch is installed in the housing of the upper portion of the cool air discharging adjustment blade, and there is provided an operating protrusion for switching on/off the position detecting switch by being rotated with the cool air discharging adjustment blade in the upper portion thereof.

It is preferred that the operating protrusion is formed such that the portion contacting with the position detecting switch is rounded.

It is preferred that the driving motor is installed in the housing of the upper portion of the cool air discharging adjustment blade, preferably in a motor case, and an internal refrigerator lamp is installed adjacent to the driving motor.

It is preferred that a concave groove is formed in the rear surface of the refrigeration compartment so that the housing is installed and that the front surface of the housing is coplanar with the rear surface of the refrigeration compartment.

It is preferred that a seal plate is provided between the rear surface of the housing and the concave groove.

It is preferred that a grill of a matrix shape is provided in the front of the housing to cover the cool air discharging adjustment blade.

Also, to accomplish the above objects, there is provided a refrigerator comprising: a housing installed in the rear wall of a refrigeration compartment; a cool air passage installed at one side of the housing for guiding the cool air; a plurality of discharging apertures interconnected with the cool air passage; cool air discharging adjustment blades each installed at the cool air discharging apertures so as to be rotatable centering around a shaft; and a driving motor installed at the housing being in the upper portion of the cool air discharging adjustment blades for rotating the cool air discharging adjustment blades, the driving motor being integrally formed in a motor case.

In the present invention, it is preferred that there is provided a position-detecting switch interlocked with an operating protrusion positioned in the upper end of the cool air discharging adjustment blades in the lower portion of the driving motor.

It is preferred that an internal refrigerator lamp is installed adjacent to the driving motor.

Also, to accomplish the above objects, there is provided a refrigerator comprising: a housing installed in the rear wall of the refrigeration compartment; a cool air passage installed at one side of the housing for guiding the cool air; a plurality of discharging apertures interconnected with the cool air passage; at least one plate member each installed at the cool air discharging apertures so as to be rotatable centering around a shaft; and a dispersion guiding blade vertically constructed on the plate member for dispersing the cool air.

In the present invention, it is preferred that the cool air passage is installed within the housing and is divided to have a first passage portion and a second passage portion.

Also, to accomplish the above objects, there is provided a refrigerator having a cool air dispersing apparatus installed in the rear wall of the refrigeration compartment for unifying the temperature distribution of the refrigeration compartment, comprising: a housing; a guide passage installed at one edge of the housing for guiding the cool air; first and second passage portions installed within the housing, divided from the cool air passage and nearly being parallel with each other; a plurality of discharging apertures installed in a predetermined position between the first passage portion and the second passage portion and each interconnected with the first and second passage portions; cool air discharging adjustment blades each installed at the cool air discharging apertures so as to be rotatable centering around a shaft; and a grill opposed to the cool air discharging adjustment blades for protecting the cool air discharging adjustment blade so that the cool air discharged from the first and second passage portions is circulated throughout the refrigeration compartment during the rotation of the cool air discharging adjustment blade.

Also, to accomplish the above objects, there is provided a refrigerator temperature controlling apparatus adopting GA-fuzzy inference, comprising: compressor controlling means; damper opening controlling means; cool air discharging direction controlling means for controlling the rotation or swing of a cool air discharging adjustment blade of a circular plate member to determine the cool air discharging direction; cool air discharging adjustment blade position detecting means for setting the cool air discharging direction using the information applied from the cool air discharging direction controlling means; at least two refrigeration compartment temperature detecting means disposed in a predetermined distance; freezer compartment temperature detecting means; external temperature detecting means; temperature variation calculating means for respectively calculating the temperature variations of the respective refrigeration compartment temperature detecting means; temperature-varied data storing means detected by the respective refrigeration compartment temperature detecting means depending on the cool air direction; and controlling means for receiving predetermined information from the refrigeration-compartment temperature detecting means, external temperature detecting means, temperature variation calculating means, temperature-varied data storing means and cool air discharging adjustment blade position detecting means to control the internal temperature of the refrigerator by GA-fuzzy inference for inferring the controlled amount of the compressor controlling means, damper opening controlling means and cool air discharging direction controlling means.

In the present invention, it is preferred that the controlling means includes inferring means for inferring the temperature value of another predetermined portion of the refrigeration compartment from at least two temperature values detected by the refrigeration compartment temperature detecting means using GA-fuzzy inference, the inferring means including a micro-processor for receiving the temperature values inferred from the inferring means and predetermined information from the refrigeration compartment temperature detecting means, external temperature detecting means, temperature variation calculating means, and temperature-varied data storing means, and performing a GA-fuzzy controlling routine for inferring the controlled amount of the compressor controlling means and damper opening controlling means using GA-fuzzy inference, an operating routine for receiving and operating the information inferred from the GA-fuzzy controlling routine and the cool air discharging adjustment blade position information, and a load controlling routine for receiving the output information of the operating routine and the output information of the cool air discharging adjustment blade position detecting means to control the controlled amount of the compressor controlling means, damper opening controlling means and cool air discharging direction controlling means.

It is preferred that the GA-fuzzy controlling routine includes a fuzzy model discriminating means operated by a fuzzy membership function for receiving and determining data learned by reference, storing the ambiguous temperature state of the refrigerated foodstuff accommodated from the refrigeration compartment temperature detecting means and that of the refrigerated foodstuff inferred previously, and GA for inferring the internal refrigeration compartment temperature state which is changeable at times from the temperature of the refrigeration compartment in a predetermined time using an objective function having correlation between an experimental value and an inferred value to supply the inferred information to the fuzzy model discriminating means.

It is preferred that the GA-fuzzy inference infers the internal refrigeration compartment temperature which is changeable at times by the process of obtaining an answer set of conditional determination and execution rules by a genetic algorithm using the Takagi-Sugeno-Kang method, written in the following conditional statement ($L_n^i$);

If $x1=A1^i, x2=A2^i, \ldots xm=Am^i$, then $y_n^i = C_0^i + C_1^i x_1 + C_2^i x_2 \ldots C_m^i x_m$ where X1 through Xm are various conditional variables such as the detected temperatures (R1 and R2) of the refrigeration compartment, inferred temperatures (T1 and T2), the external temperature or the foodstuff temperature, A1 through Am are conditional coefficients of GA-fuzzy inference obtained by the genetic algorithm depending on the respective conditional variables, $y^i$ which is an objective function is the linear equation corresponding to the consequent, C0 through Cm are coefficients which are weighted values for the conditional satisfaction of the variables X1 through Xm to which such a value as R1, R2, T1 or T2 is assigned in the present invention, and i, m and n are positive integers.

It is preferred that in the operating routine, the output information of the GA-fuzzy controlling routine and the output information of the cool air discharging adjustment blade position detecting means are operated to obtained the controlled amount of the cool air discharging direction controlling means and supplying the same to the load controlling routine.

Also, there is provided a refrigerator temperature controlling method using GA-fuzzy inference comprising the steps of: determining whether there is an initial input; inferring the temperatures of respective predetermined positions of the refrigeration compartment from temperature information input from at least two refrigeration compartment temperature detecting means by a first GA-fuzzy function, if there is an initial input; determining the optimal position of a cool air discharging adjustment blade for determining the cool air discharging direction by a second GA-fuzzy function using the temperature inferred for the respective positions of the refrigeration compartment; moving the position of the cool air discharging adjustment blade for determining the cool air discharging direction in accordance with the determined optimal position; determining whether a predetermined time has lapsed after the initial inputting step; reinferring the temperature of the predetermined position by the first GA-fuzzy function using the inferred temperatures of the respective predetermined positions of the refrigeration compartment as the temperature pattern data for the cool air discharging direction learned by reference, if a predetermined time has lapsed; determining the position of the cool air discharging adjustment blade by the second GA-fuzzy function inferred using the reinferred temperatures of the respective predetermined positions and the currently input temperature of the refrigeration compartment temperature detecting means; determining whether the determined position of the cool air discharging adjustment blade is optimal; and moving the cool air discharging adjustment blade to the optimal position by driving a swing motor, if it is determined that the position is not optimal.

In the present invention, it is preferred that, assuming that the temperatures of the respective predetermined positions are R1 and R2, the inferred temperatures of the respective predetermined positions are T1 and T2, and the weight of the foodstuff accommodated in the refrigeration compartment is W, the first GA-fuzzy function is expressed as:

$W = \text{MIN}[1, \text{MAX}\{0, (1.4-R)/1.4\}]$ $T1 = W(-1.536+0.451R1+0.771R2)+(1-W)(0.141+1.055R1-0.041R2)$ $T2 = -0.648-0.045R1+1.106R2$ where MIN represents a function selecting a minimum factor among the factors within the parentheses, and MAX represents a function selecting a maximum factor among the factors within the parentheses.

It is preferred that assuming that the temperatures of the respective predetermined positions are R1 and R2, the inferred temperatures of the respective predetermined positions are T1 and T2, the weighed value of the n-th rule calculated in the storage is Wn (n being a positive integer), and the respective positions of the cool air discharging adjustment blade is Pn, the second GA-fuzzy function is expressed as:

$W1 = \text{MIN}[1, \text{MAX}\{0, (3.49-R1)/1.33\}]$ $W2 = \text{MIN}[1, \text{MAX}\{0, (4.49-R2)/1.9\}]$ Opt. pos.$=W1W2P1+W1(1-W2)P2+(1-W1)W2P3+(1-W1)(1-W2)P4$ $P1 = 5.4+0.452R1-0.27T1+0.45T2-0.52R2$ $P2 = 2.7-0.2R1+0.27T1+0.33T2+0.03R2$ $P3 = 7.7+0.29R1-0.32T1-0.29T2+0.22R2$ $P4 = 1.4+3.7R1-0.36T1+0.19T2-2.65R2$ where MIN represents a function selecting a minimum factor among the factors within the parentheses, and MAX represents a function selecting a maximum factor among the factors within the parentheses.

BRIEF DESCRIPTION OF THE DRAWINGS

The above objects and advantages of the present invention will become more apparent by describing in detail a preferred embodiment thereof with reference to the attached drawings in which:

FIG. 1 is a vertical cross-section illustrating a general refrigerator;

FIG. 2 is a perspective view illustrating the inside of a conventional refrigerator of a cool air discharging per partition type;

FIG. 3 is a perspective view illustrating the inside of a conventional refrigerator of a three-dimensional cooling type;

FIG. 4 is a block diagram showing a temperature controlling apparatus of a conventional refrigerator adopting fuzzy inference;

FIG. 5A is a vertical cross-section illustrating a refrigerator according to the present invention;

FIG. 5B is a perspective view illustrating the inside of a refrigeration compartment of the refrigerator of FIG. 5A, while the door of the refrigeration compartment is open;

FIG. 5C is a perspective view illustrating a housing and a cool air discharging adjustment blade for dispersedly discharging cool air in the refrigerator of FIG. 5A in the dissembled state;

FIGS. 5D and 5E are front and side views illustrating a cool air discharging portion shown in FIG. 5A, respectively;

FIG. 5F is a perspective rear view of the housing of the refrigerator of FIG. 5A, showing the arrangement of a cooling passage and a discharging aperture;

FIGS. 5G–5I are views showing the cool air discharging adjustment blade and variations thereof of the refrigerator of FIG. 5A;

FIG. 5J is a view showing the arrangement of the cool air discharging adjustment blade and the discharging apertures of the refrigerator of FIG. 5A;

FIG. 5K is a perspective view illustrating the cool air discharging adjustment blade shown in FIGS. 5G–5I;

FIGS. 6A–6C show the cool air discharging adjustment blade performing left-concentrated, central-concentrated, and right-concentrated cooling, respectively;

FIGS. 7A–7C are views illustrating the operations of a position detecting switch of the refrigerator of FIG. 5A;

FIG. 8 is a block diagram illustrating the temperature controlling apparatus of the refrigerator adopting GA-fuzzy inference according to the present invention;

FIG. 9 shows an overall flow of GA-fuzzy control;

FIG. 10 is a flowchart for explaining in detail the GA-fuzzy control routine of FIG. 8;

FIG. 11 is a view for explaining the Takagi-Sugeno-Kang method;

FIG. 12 shows temperature descending curves according to cooling time in the controlling of the cool air discharging adjustment blade, by a conventional simple rotation method and a method of the present invention, respectively;

FIG. 13 is a perspective schematic illustrating the points on each shelf for measuring temperature distribution in the refrigerator;

FIG. 14 is a graph indicating temperature distribution at each of the measured points shown in FIG. 13, in the conventional refrigerator adopting the fuzzy inference; and FIG. 15 is a graph indicating temperature distribution at each of the measured points shown in FIG. 13, in the refrigerator being provided with the temperature controlling apparatus adopting the GA-fuzzy inference of FIG. 8.

FIG. 16 shows the parameter dividing variables in precondition part at the stage 2 of the step 1;

FIGS. 17A, 17B, 17C show the fuzzy three-dividing structure of variables $x_1$ and $x_2$ at the stage 3 of the step 1;

FIG. 18 shows the parameter dividing variables in structure (1) of precondition part at the stage 3 of the step 1;

FIG. 19 shows the selected parameter dividing variables in precondition part at the step 1;

FIG. 20 shows the parameter of FIG. 19 applied for the system of present invention;

FIG. 21 shows the parameter dividing variables in precondition part at the stage 2 of the step 2;

FIGS. 22A, 22B, 22C show the fuzzy three-dividing structure of variables $x_1$ and $x_4$ at the stage 3 of the step 2;

FIG. 23 shows the parameter dividing variables in structure (1) of precondition part at the stage 3 of the step 2;

FIGS. 24A, 24B, 24C, 24D, 24E show the fuzzy four-dividing structure of variables $x_1$ and $x_4$ at the stage 4 of the step 2;

FIG. 25 shows the selected parameter dividing variables in precondition part at the step 2; and FIG. 26 shows the parameter of FIG. 25 applied for the system of present invention.

DETAILED DESCRIPTION OF THE INVENTION

As shown in FIG. 5A, a main body 4 of the refrigerator as a thermal insulating structure forms a freezer compartment 2 and a refrigeration compartment 3 which are separated by a partition 1. Each room is provided with a door, i.e., a freezer compartment door 6 and a refrigeration compartment door 7. A plurality of shelves 8 for placing foodstuff are installed in refrigeration compartment 3. In the upper portion of refrigeration compartment 3, a third room 9 for containing particular foodstuff at a predetermined temperatures is formed, and a crisper 10 is formed being separated with refrigeration compartment 3 in the lower portion thereof. A compressor 11a is installed in a machine room 11 below refrigeration compartment 3, and a condensing unit and a pressure reducer (not shown) are installed at main body 4 or the machine room. An evaporator 12 is installed at a rear wall of freezer compartment 2. By coupling those above elements using refrigerant pipes, freezing circulation cycle is performed.

A cooling fan 13 for forcibly ventilating the cool air generated at evaporator 12 toward freezer compartment 2 and refrigeration compartment 3 is installed above evaporator 12. To guide this supply of the cool air a fan guide 14 is arranged in front of cooling fan 13. A housing 17 having a cool air passage 15 (see FIG. 5F) and a discharging aperture 16 (see FIG. 5F) is installed at a rear wall of refrigeration compartment 3. Accordingly, the cool air passing through evaporator 12 is separately supplied to freezer compartment 2 and refrigeration compartment 3. A concavity 5 for installing housing 17 is formed at the rear wall of the refrigeration compartment.

As shown in FIG. 5B, housing 17 is installed at the rear center of refrigeration compartment 3. The upper portion of the housing is situated at the rear side of third room 9 and the other portion thereof is situated at the rear side of refrigeration compartment 3 between third room 9 and crisper 10. That is, housing 17 is extended such that the upper and lower ends thereof contact partition 1 and crisper 10, respectively. Thus, the height of housing 17 is nearly the same as that of refrigeration compartment 3. A grill 27 is formed in front of housing 17. Two temperature sensors 52 and 53 are respectively installed at the center of the right upper wall and the left lower wall of refrigeration compartment 3.

As shown in FIG. 5C, housing 17 is largely divided into a front panel 24, a thermal insulator 25 coupled with front panel 24, and a seal panel 34 attached to a rear side of thermal insulator 25.

A cool air discharging adjustment blade 26 is installed to be detachable at front panel 24. A driving motor 28 for driving cool air discharging adjustment blade 26 is installed being held by a motor case 29 at the upper portion of cool air discharging adjustment blade 26. Internal lamps 30 are installed at the both sides of driving motor 28 and an internal lamp cover 31 is for protecting internal lamp 30. In the present embodiment, permeation of moisture into driving motor 28 is prevented by arranging driving motor 28 at the upper portion of cool air discharging adjustment blade 26, since the moisture or condensed water in the room runs downward due to gravity. Further, since driving motor 28 is held in motor case 29, there is less probability of permeation of moisture therein. Accordingly, the lowering of driving speed caused by over-cooling due to contacting the cool air does not exist. Even if the moisture permeation occurs, the moisture evaporates immediately since internal lamp 30 is installed at the both sides of driving motor 28. Thus, the problems of the driving motor caused by moisture permeation and the cool air discharging adjustment blade caused by the malfunction of the driving motor do not occur. That is, an electrical short and insulation breakdown which are caused from the water permeation, and the lowering of the driving motor speed, caused by over-cooling, does not occur. According to a preferred embodiment of the present invention, a guide motor having a fixed rotation speed is used as the driving motor. However, a stepping motor which can rotate in forward and backward directions and properly control the rotation amount of cool air discharging adjustment blade 26 may be adopted.

Also, a position detecting switch 32 for controlling a rotation position of cool air discharging adjustment blade 26 is operated by an operating protrusion of position detecting switch 32 placed in the upper portion of cool air discharging adjustment blade 26. This operating protrusion will be described in detail in FIGS. 7A to 7C. Also, a grill 27 in a latticed shaped for protecting cool air adjustment blade 26 is installed to be detachable to front panel 24. Grill 27 is for preventing for cool air adjustment blade 26 from being disturbed in the operation thereof by the foodstuff stored in the refrigerator.

As shown in FIGS. 5D and 5E, a guide passage 18 for guiding the cooled air from an evaporator 12 to a refrigeration compartment 3 is formed on the upper end of thermal insulator 25 of housing 17. A damper 19 for controlling the amount of cooled air supplied the refrigeration compartment by opening or closing guide passage 18 and a damper motor 20 for driving damper 19 are installed in housing 17. Here, the temperature controlling process in refrigeration compartment 3 using the above elements is the same as the conventional method. According to the preferred embodiment of the present invention, a damper cover 21 is united with front panel 24 in a body and a spacer 22 is composed of thermal insulator. Spacer 22 is formed with a thick thickness to prevent a water congelation on damper cover 21, caused from the massive cool air passing through guide passage 18. Thus, the upper portion of housing 17 is thick where damper 19 and damper motor 20 are installed. Here, the thickness and width of the upper portion of housing 17 are roughly 12 cm and 34 cm, respectively, in the case of the refrigerator of 400–5001 grade, but may differ according to the overall size of the refrigerator. Cool air discharging apertures 23 formed in damper cover 21 are for discharging the cool air passed through guide passage 18 into a third room 9, so that third room 9 is maintained at a lower temperature compared with the refrigeration compartment 3. According to the preferred embodiment, cool air discharging apertures 23 are placed to the both sides of damper cover 21.

The other portion of housing 17 has a 3 cm thickness and a 25 cm width. This portion of housing 17 may be wholly made of a plastic injection-molded substance. However, in the preferred embodiment, this portion is constructed of a substance which is formed by incorporating a thermal insulator such as 2 mm of Styroresin into front panel 24. A cool air discharging adjustment blade 26 is installed at these portions of housing 17, while being constructed of a cool air guiding portion 26a and a supporting member 26b. According to the preferred embodiment, four cool air guiding portions 26a are connected to support portion 26b in a body. Each position of these cool air guiding portions corresponds to each space partitioned by each shelve 8. According to the preferred embodiment, supposing that the height of the refrigerator is H, the cool air guiding portions of an uppermost portion, a middle portion and a lowermost portion are arranged at the portions corresponding to (¾)H, (½)H and (⅓)H, respectively. A cool air guiding portion located between the cool air guiding portions of the middle and the lowermost portions is placed after due consideration of an appearance and a metal molding process, regardless of the position of shelve 8. The shape of cool air discharging adjustment blade 26 will be described in detail later.

Housing 17 is installed at the rear wall of refrigeration compartment 3 as an assemble body. Here, it is preferable that front panel 24 of housing 17 is formed at the same surface as the rear wall of refrigeration compartment 3. That is, in the state where the united body of front panel 24 and thermal insulator 25 is attached on a seal panel 34, cool air discharging adjustment blade 26 and grill 27 are assembled to front panel 24, and a driving motor 28 and internal lamps 30 which are assembled each other are installed at the rear wall of refrigeration compartment 3. Thus, the assembling process is very simple compared with the case in which each part is separately installed to the refrigeration compartment. A screw coupling portion 17a is for installing this kind of housing 17. That is, housing 17 as an assembled body is conveniently installed to the rear wall of refrigeration compartment 3 by the coupling of the skew.

As shown in FIG. 5F, a cool air passage 15 for guiding the cool air generated from evaporator 12 to refrigeration compartment 3 and a discharging aperture 16 are formed in housing 17. Cool air passage 15 is formed at the rear wall of housing 17 along the longitudinal direction of housing 17 and discharging aperture 16 is formed while passing through housing 17 to communicate cool air passage 15 with refrigeration compartment 3. A plurality of discharging apertures 16 are vertically arranged at the center of housing 17 and cool air passage 15 includes a first passage portion 35 and a second passage portion 36 which are formed at the both sides of discharging apertures 16 Here, like cool air guiding portion 26a of cool air discharging adjustment blade 26, plural discharging apertures 16 are vertically arranged corresponding to each space partitioned by shelve 8 of refrigeration compartment 3. According to the preferred embodiment, housing is constructed by arranging cool air guiding portion 26a of cooling air discharging adjustment blade 26 into discharging apertures 16. That is, there are three discharging apertures. As described above, first and second passage portions 35 and 36 of cool air passage 15 are arranged at the both side centering discharging aperture 16. Simultaneously, cool air discharging adjustment blade 26 is placed to discharging apertures 16. As a result, the overall thickness of housing 17 decreases, thereby reducing the height of housing 17 protruded into the inside of the refrigerator. Also, the protrusion of housing 17 increases an effective space within the refrigerator.

Also, the upper portions of first and second passage portions 35 and 36 are extended in the upper direction to be placed at the both sides of guide passage 18 and the lower to portions thereof are extended to crisper 10 to be connected each other. Thus, the cool air passed through guide passage 18 by the opening of damper 19 is diffused into the left and right direction and discharged into refrigeration compartment 3 and crisper 10 along first and second passage portions. Also, part of cool air is discharged into third room 9 via a cool air discharging aperture 23 (see FIG. 5E). Cool air passage 15 for guiding the cool air supplied to the lower direction into refrigeration compartment 3 comprises a first linking path 37 for connecting first passage portion 35 and discharging aperture 16 and a second linking path 38 for connecting second passage portion 36 and discharging aperture 16. Thus, the cool air flowing along first and second passage portions 35 and 36 is partially guided to first and second linking paths 37 and 38 and then discharged into refrigeration compartment 3 via discharging aperture 16.

Here, first and second linking paths 37 and 38 have wide inlets connected to each first and second passage portions 35 and 36 and narrow outlets each connected to discharging aperture 16. Particularly, the upper sides of the inlets of first and second linking paths 37 and 38 have a round shape and the lower sides thereof are extended to the outer direction compared with the upper sides due to flanges 371, 372 and 373, so that the cool air flowing into the lower direction is smoothly introduced into the linking paths along the round portion while the cool air is partially blocked by flanges 371, 372 and 373.

Also, it is preferable that the upper sides of each discharging aperture 16, forming the inlets of first and second linking paths 37 and 38, are much curved at the lower portions of the first and second linking paths 37 and 38 than the upper portions thereof, and flanges 371, 372 and 373 formed at the lower sides of each discharging aperture 16 are more extended toward both sides at the lower portions of the first and second linking paths 37 and 38 than the upper portions thereof. That is, flange 373 is more extended toward the sides than flanges 372 and 371, and flange 372 is more extended toward the sides than flange 371. This construction is for discharging much cooled air into refrigeration compartment 3 via first and second linking paths 37 and 38 at the lower portion. Thus, even if the temperature of the cool air which is first discharged and flown into the lower direction is generally high, so that a temperature deviation according to the height of the refrigeration compartment is removed, to thereby evenly cool the temperature within the refrigeration compartment.

Also, a cool air limiting projection 48 having a predetermined length is placed below an inlet of the lowermost portion of first and second linking paths 37 and 38, so that the amount of cool air supplied to crisper 10 shown in FIGS. 5A and 5B decreases and the amount of cool air discharged into the refrigeration compartment via discharging aperture 16 increases. Thus, the refrigeration compartment is controlled at a lower temperature than the crisper.

In order to disperse the cool air discharged into refrigeration compartment 3 to the left and right, discharging aperture 16 comprises a first discharging portion 39 directly connected to first linking path 37 and a second discharging portion 40 directly connected to second linking path 38. Here, it is preferable that first discharging portion 39 and first linking path 37, and second discharging portion 40 and second linking path 38 communicate with each other, and first and second discharging portions 39 and 40 have a step difference in the vertical direction. That is, first and second discharging portions 39 and 40 are formed with a step difference in the vertical direction to discharging the cool air into first and second linking paths 37 and 38, respectively. As a result, the cool air introduced into each discharging portion is discharged into the opposite directions each other, so that the cool air naturally circulates within the refrigeration compartment. Also, it is preferable that the positions of first and second discharging portions 39 and 40 are opposite to those of the adjacent discharging apertures 16. That is, when first discharging portion 39 is placed at the higher position than second discharging portion 40 in the upper discharging aperture, first discharging portion 39 is placed at the lower position than second discharging portion 40 in the middle discharging aperture. Thus, because the temperature of cool air which is discharged first and flows into the lower direction is generally higher than that of the cool air which is discharged later, when the temperature of the cool air introduced from the right is lower than that from the left in the upper discharging aperture, the cool air of lower temperature is introduced into the left side of the middle discharging aperture, so that the temperature deviation between the right and left of the refrigerator is removed, thereby evenly cooling the air within the refrigeration compartment.

Cool air discharging adjustment blade 26 adopted in the present invention and examples modified therefrom will be described with reference to FIGS. 5G, 5H and 5I. As shown in FIGS. 5G, 5H and 5I, cool air discharging adjustment blade 26 is composed of a plurality of cool air guiding portions 26a and supporting member 26b. Cool air guiding portions 26a comprises a distributing plate 44 having an upper plate 41, a lower plate 42 and a middle plate 43 which are spaced apart from each other by a predetermined distance in a disk shape, and a dispersion guiding blade 47 having a first dispersion guiding blade vertically connecting upper plate 41 and middle plate 43 and a second dispersion guiding blade for vertically connecting middle plate 43 and lower plate 42. Cool air discharging adjustment blade 26 is constructed by integrally connecting three cool air guiding portions 26a (remaining one portion as a false cool air guiding portion will be described later) formed by assembling distributing plate 44 and dispersion guiding blade 47 with supporting member 26b. The upper portion of cool air discharging adjustment blade 26 is connected to an output shaft of driving motor 28 shown in FIGS. 5C to 5E, so that cool air discharging adjustment blade 26 rotates by a rotating force of driving motor 28. Here, it is preferable that supporting member 26b has a cross-shaped section so as to prevent the deflection thereof.

False cool air guiding portion 49 of FIGS. 5G and 5H are irrelevant to the discharge of the cool air since the discharging apertures is not formed at the position of false cool air guiding portion 49. However, false cool air guiding portion 49 disperses the cool air which remains by leaking via a chink between the discharging aperture and the cool air discharging adjustment blade 26. Also, the cool air guiding portions are arranged in balance by false cool air guiding portion 49, thereby improving the appearance of the refrigerator.

As shown in FIG. 5H, cool air discharging adjustment blade 26 is formed to be detachable, thereby solving a problem related with a metal molding process. The upper and middle cool air guiding portions 261 and 262 are placed in the upper cool air discharging adjustment blade 26 and false and lower cool air guiding portions 49 and 263 are placed in the lower cool air discharging adjustment blade. That is, as the following description, when dispersion guiding blades 47 of each cool air guiding portion are arranged in an angle different from each other, the cool air guiding portions cannot be molded at the same time. Thus, first, cool air discharging adjustment blade 26 is equally divided into two pieces. Then, two cool air guiding portions whose dispersion guiding blades are perpendicular with respect to each other are placed in the upper cool air discharging adjustment blade 261 and the cool air guiding portions whose dispersion guiding blades form the same angle are placed in the lower cool air discharging adjustment plate 263. As a result, the arrangement of the whole dispersion guiding blades can be controlled by only controlling a connection angle between the upper and lower cool air discharging adjustment plates. According to the preferred embodiment, there is adopted a structure where the dispersion guiding blades 47c of the lower cool air discharging adjustment blade 263 are arranged at the center of the angle formed by both dispersion guiding blades 47a and 47b of the upper cool air discharging adjustment blades 261 and 262. FIG. 5I shows cool air discharging adjustment blade 26 without false cool air guiding portion 49 as a modified example.

On the other hand, as described above, each distributing plate is place at each discharging aperture 16 and the positions of distributing plate 44 and discharging aperture 16 correspond to the positions of shelve 8 of refrigeration compartment 3. As shown in FIG. 5J, middle plate 43 of distributing plate 44 is located at the boundary between first and second discharging portions 39 and 40 of discharging aperture 16, and upper and lower plates 41 and 42 are spaced from middle plate 43 in the upper and lower directions, respectively. Here, the distance between upper and lower plates 41 and 42 corresponds to the height difference between first and second discharging portions 39 and 40. Also, it is preferable that upper, middle and lower plates 41, 43 and 42 have the same diameter which approximately corresponds to the width of discharging aperture 16, thereby preventing the leakage of the cool air. As a result, middle and upper plates 43 and 41 or middle and lower plates 43 and 42 form an extra round passage extended from the linking paths together with dispersion guiding blade 47, so that the cool air is guided to be discharged into the refrigerator and the discharged cool air is evenly distributed into the refrigerator. That is, upper, lower and middle plates 41, 42 and 43 composing distributing plate 44 guide the cool air which is passed through the linking paths from the cool air passage to be discharged into the refrigerator while being preventing the cool air from descending to the lower direction. Thus, even if cool air discharging adjustment blade 26 rotates at a lower speed, distributing plate 44 collects the cool air from the linking paths and then discharges the cool air into the refrigerator.

As shown in FIG. 5K, first and second dispersion guiding blades 45 and 46 have a symmetrical structure with respect to each other. In detail, first and second dispersion guiding blades 45 and 46 has a concave portion 50 and a convex portion 51 which are formed in a continuous round shape. That is, the rounded concave and convex portions 50 and 51 are smoothly connected in an "S" shape. Thus, the cool air flowing along dispersion guiding blade 47 via discharging aperture 16 can smoothly circulate without any resistance. Also, first and second dispersion guiding blades 45 and 46 have a symmetrical structure, centering on middle plate 43. That is, concave portions 50 of first and second dispersion guiding blades 45 and 46 or convex portions 51 of first and second dispersion guiding blades 45 and 47 are arranged in mirrored positions with respect to each other. Dispersion guiding blade 47 having the above structure is for decreasing a flowing resistance together with first and second discharging portion 39 and 40 which composing discharging aperture 16 and has a step difference in the vertical direction. That is, the cool air introduced into dispersion guiding blade 47 is run against convex portion 51 and then flows along convex portion 51, thereby sharply decreasing the flowing resistance. When first discharging portion 39 of discharging aperture 16 is partially disposed to the left, convex portion 51 of first dispersion guiding blade 45 is located at the right. Also, in this case, second discharging portion 40 is partially disposed to the right and convex portion 51 of second dispersion guiding blade 46 is located at the left. For example, the cool air introduced into first discharging portion 39 partially disposed to the left flows along convex portion 51 of first dispersion guiding blade 45 and the cool air introduced into second discharging portion 40 partially disposed to the right flows along convex portion 51 of second dispersion guiding blade 46, thereby forming a main flowing pathway.

Also, as described above with reference to FIGS. 5G, 5H and 5I, on the basis of a dispersion guiding blade 47a of the upper cool air guiding portion, a dispersion guiding blade 47b of the middle cool air guiding portion and a dispersion guiding blade 47c of the lower cool air guiding portion are at 90° and 45° C. with dispersion guiding blade 47a, respectively. As described above, since the dispersion guiding blades of the upper, middle and lower cool air guiding portions 47a, 47b and 47c are arranged at the different angle, the position against which the cool air is run and the flowing direction of the cool air are different in each dispersion direction plate, so that there is provided an effect of distributing the load. For example, if all dispersion guiding blades are placed at the same angle, the cool air is run against all dispersion guiding blades with an acute angle according to the rotation portion of cool air discharging adjustment blade 26. Thus, a load is considerably applied to cool air discharging adjustment blade 26. However, according to the preferred embodiment of the present invention, since the dispersion guiding blades of the upper, middle and lower cool air guiding portions are arranged at a different angle, the overload is not applied to cool air discharging adjustment blade 26, as described above.

As described above, the side portions (concave portion 50 25 or convex portion 51) of all dispersion guiding blades 47a, 47b and 47c are placed within approximately 90° regardless of the rotation position of cool air discharging adjusting blade 26. Thus, a left-side concentrative cooling, a central concentrative cooling and a right concentrative cooling can be performed by controlling the rotation angle of cool air discharging adjusting blade 26. FIGS. 6A, 6B and 6C show the left-side, the central and the right-side concentrative cooling processes, respectively. These concentrative cooling processes can be performed in an arbitrary direction other than the above three directions by a controller (see FIG. 8).

In order to determine the direction of the concentrative cooling, as shown in FIG. 5B, a first temperature sensor 52 is installed at the center of the right upper wall of refrigeration compartment 3 and a second temperature sensor 53 is installed at the center of the left lower wall of refrigeration compartment 3. The temperature sensors and the above described position detecting switch 32 are connected to a controller 27 of FIG. 8 and driving motor 28 for driving cool air discharging adjusting blade 26 is also connected to the microprocessor. The temperature sensors and the above described position detecting switch 32 for effectively performing the concentrative cooling by detecting the temperature deviation within the refrigeration compartment will be described later.

The structure and the operating state of position detecting switch 32 for determining a reference position of cool air discharging adjusting blade 26 for the concentrative cooling and an operating protrusion 33 for operating position detecting switch 32 are shown in FIGS. 7A, 7B and 7C. As shown in FIGS. 7A, 7B and 7C, operating protrusion 33 rotates in an arrow direction together with cool air discharging adjusting board 26. FIG. 7C shows a moment when contact between position detecting switch 32 and operating protrusion 33 is lost. According to the preferred embodiment, the position of cool air discharging adjusting blade 26 on the above contact lost moment is set as a reference position thereof. Also, a portion of operating protrusion 33, contacting with position detecting switch 32, has a streamlined shape, so that a sudden separation of position detecting switch 32 from operating protrusion 33 is prevented. As a result, no noise is generated during the contact separation.

The operating and controlling methods of the refrigerator having the above structure according to the present invention will be described as follows.

First, as shown in FIG. 5A, when starting compressor 11a and evaporator 12, evaporator 12 generates the cool air through a thermal exchange with the air of the circumstance. The generated cool air is supplied to freezer compartment 2 and refrigeration compartment 3 by the operation of cooling fan 13 as directed by the arrows of FIGS. 5A and 5B. The opening and closing operations of damper 19 are controlled according to the temperature of refrigeration compartment 3. When damper 19 is opened, the cool air is supplied to refrigeration compartment 3 via guide passage 18. The cool air passed through guide passage 18 is dispersed into the left and right and then discharged into third room 9 via first and second passage portions 35 and 36.

The discharging process of the cool air into refrigeration compartment 3 will be described in detail. The cool air flowing along first and second passage portions 35 and 36 is partially introduced into first and second linking paths 37 and 38 in sequence from the upper portion and then discharged via discharging aperture 16. Here, the cool air is discharged while being dispersed into the left and right directions by the rotation of cool air discharging adjusting blade 26. Even if there is no cool air discharging adjusting blade 26, first and second discharging portions 39 and 40 which compose discharging aperture 16 and have the step difference in the vertical direction to be partially disposed to the cool air inflow direction can disperse the discharged cool air to the left and right. However, the dispersion of the cool air can be accelerated by the rotation of cool air discharging adjusting blade 26. Thus, the interior of the refrigerator is evenly cooled. According to the preferred embodiment, cool air discharging adjusting blade 26 forwardly rotates at a predetermined speed, say, 6–10 rpm, by a swing motor as a driving motor therefor. Of course, a geared motor can be used as the driving motor. This driving motor may be replaced by a stepping motor which can vary the rotation speed.

In detail, as described above, discharging aperture 16 comprise first and second discharging portions 39 and 40 which communicate with each other and are formed with a step difference in the vertical direction. The cool air introduced into each discharging portion is discharged into the opposite direction each other, so that the cool air is smoothly dispersed within the refrigeration compartment. Also, the positions of first and second discharging portions 39 and 40 are opposite those of the adjacent discharging aperture. Generally, the temperature of the cool air which is first discharged and flows downward is high. However, in the case where the temperature of the cool air introduced from the right is lower than-that from the left in the upper discharging aperture, cooler air is introduced into the left side of the middle discharging aperture and the right side of the lower discharging aperture, so that the temperature differential between the right and left of the refrigerator is removed, thereby evenly cooling the air within the refrigeration compartment.

Also, since flange 372 of the middle portion is extended more toward the outside than flange 371 of the upper portion and flange 373 of the lower portion is extended more toward the outside than flange 372, much cooled air is discharged into refrigeration compartment 3 via first and second linking paths 37 and 38 and discharging aperture 16 at the lower portion. Thus, even if the temperature of the cool air which is first discharged and flown into the lower direction is generally high, the temperature deviation according to the height of the refrigeration compartment is removed, to thereby evenly cool the temperature within the refrigeration compartment.

As described above, the refrigeration compartment can be evenly cooled by dispersedly discharging the cool air and controlling the amount of the discharged cool air even if there is no cool air discharging adjusting blade 26. However, the dispersion of the cool air can be accelerated by the rotation of cool air discharging adjusting blade 26. Thus, the inside of the refrigerator is evenly cooled.

Even if the refrigeration compartment is evenly cooled, when much foodstuff is stored in a predetermined portion or warm foodstuff is put on a predetermined portion, the evenly cooled condition of the refrigeration compartment is no longer maintained. Also, it is difficult to achieve the evenly cooled condition even if cool air discharging blade 26 rotates. In order to solve this problem, a concentrative cooling process with respect to a predetermined portion is required. The concentrative cooling process according to the present invention will be described with reference to FIGS. 6A, 6B and 6C. First, when the left side of the refrigeration compartment should be concentrically cooled, as shown in FIG. 6A, cool air discharging adjusting blade 26 is fixed while being rotated for the cool air to be mainly discharged into the left side. Here, the dispersion guiding blades of the upper, middle and lower cool air guiding portions are arranged within approximately 90° range toward the left side, so that the cool air is mainly discharged into the left side. Also, when the center of the refrigeration compartment should be concentrically cooled, as shown in FIG. 6B, cool air discharging adjusting blade 26 is fixed while being rotated for the cool air to be mainly discharged into the center of the refrigeration compartment. Here, the dispersion guiding blades of three cool air guiding portions are arranged within approximately 90° range toward the center, so that the cool air is mainly discharged into the center. In addition, when the right side of the refrigeration compartment should be concentrically cooled, as shown in FIG. 6C, cool air discharging adjusting blade 26 is fixed while being rotated for the cool air to be mainly discharged into the right of the refrigeration compartment. Here, the dispersion discharging plates of three cool air guiding portions are arranged within approximately 90° range toward the right, so that the cool air is mainly discharged into the right side.

The control of the rotation angle of cool air discharging adjustment blade 26 is performed by position detecting switch 32 turned on/off by a protrusion 33 of cool air discharging adjustment blade 26 and a controller 33. In this embodiment, from a point of time when operating protrusion 33 and position detecting switch 32 are separated, controller 54 checks the rotation time of cool air discharging adjustment blade 26 to obtain the rotation angle thereof. For example, if the rotation velocity of cool air discharging adjustment blade 26 is 6 rpm, a 10-second rotation from the reference point of time makes cool air discharging adjustment blade 26 rotate one cycle.

As described in detail above, according to the refrigerator of the present invention, uniform cooling can be executed by the cool air passage such that the discharged cool air is dispersed depending on the arrangement and shape of discharging apertures. Also, the uniform cooling of excellent state can be realized in any event, by dispersing the discharged cool air through the cool air discharging adjustment blade. Also, the housing can be slimmed by forming the cool air passage at both sides of a discharging aperture and disposing the cool air discharging adjustment blade at the discharging aperture, thereby preventing the reduction of the effective internal space of the refrigerator. Also, an assembly body is easily formed by fabricating the cool air discharging adjustment blade on the housing having a motor and an internal lamp installed therein. The cool air discharging adjustment blade having a duplex structure is easily manufactured by a mold. Moisture permeation can be prevented by disposing a motor on the cool air discharging adjustment blade and installing an internal lamp adjacent to the motor, thereby preventing the malfunction of the motor. By disposing a plate-shaped blade on discharging aperture, the cool air is internally discharged toward the refrigerator without being dropped, even if the cool air discharging adjustment blade is rotated at a low speed.

As described above, the refrigerator temperature controlling apparatus and method adopting GA-fuzzy inference according to the present invention, are proposed in order to efficiently perform uniform cooling and intensive cooling using the cool air passage and cool air discharging adjustment blade for dispersing the cool air discharged to the refrigeration compartment and adjusting the discharging direction at the same time, which will be now described with reference to FIGS. 8 through 15.

First, a fuzzy control system will be compared with a widely used proportionally integrated differential (PID) control system and the difference therebetween will be described briefly.

The PID control is widely used owing to a simple device therefor and easy adjustment of the control parameters. However, the PID control has many control variables and unpredictable factors, as in any dynamic system. Particularly, in the case of a system having non-differentiable characteristics, it is difficult to obtain satisfactory control results.

On the contrary, there has been proposed a learning engineering technology (an expert system) constructing control rules by interpreting a control operation method obtained by a skillful operator's experience, not depending on the mathematical model for control objectives.

A fuzzy control contains human's objective ambiguity in the control rules of the knowledge engineering technology. Accordingly, the fuzzy control can be applied to the following systems: 1) a system having complex control objectives, 2) a system whose internal model is not specified strictly, and 3) a system whose dynamic fluctuation is frequent.

In the PID control, a control result is evaluated using a predetermined evaluation reference and a parameter is tuned. In the fuzzy control, the control rule characteristics are improved by changing the rules according to the control result. However, in the case of the fuzzy control, tuning is performed by trial and error.

Now, the refrigerator temperature controlling apparatus adopting GA-fuzzy inference according to the present invention will be described with reference to FIG. 8. FIG. 8 is a block diagram illustrating the temperature controlling apparatus of the refrigerator adopting GA-fuzzy inference according to the present invention. In FIG. 8, the refrigerator temperature controlling apparatus adopting GA-fuzzy inference includes various temperature sensors such as an external temperature sensor 24, a freezing temperature sensor 23, right and left refrigeration compartment temperature sensors 52 and 53, a temperature variation operating unit 25 for receiving temperature variation information from temperature sensors operating the temperature variation, a data storage unit 26 for storing temperature change data of right and left refrigeration compartment temperature sensors 52 and 53 depending on the cool air discharging direction, a compressor controller 28, a damper controller 29, a cool air discharging direction controller 30, a cool air discharging adjustment blade position detecting switch 32 for setting the cool air discharging direction, a controller 27 for collectively controlling compressor controller 28 and damper controller 29 to supply the cool air in consideration of the internal temperature change factors of refrigerator depending on the external temperature compensation and accommodated foodstuff state and to distribute the temperature uniform rapidly throughout refrigerator by adopting a fuzzy inference technique.

Here, supposing that the height of the refrigeration compartment is H, temperature sensor 52 is installed at the center of the left wall at a point 3H/4 from the bottom and temperature sensor 53 is installed at the left wall at a point 1H/3 from the bottom. Controller 27 is a microprocessor (e.g., a TMP87C840AN) which performs a GA-fuzzy control routine 271, an operating routing 272 and a loading control routine 273, which will be described with reference to FIG. 9.

FIG. 9 shows a-overall flow of GA-fuzzy control according to the present invention, performed during the GA-fuzzy control routine 271 of controller 27 shown in FIG. 8, and FIG. 10 is a flowchart of GA-fuzzy control routine shown in FIG. 8.

First, a temperature value $T_e$ (T1 or T2) at any point in the refrigeration compartment is inferred by a first GA-fuzzy function, and then an optimal cool air discharging direction is selected using a second GA-fuzzy function such that the position of cool air discharging adjustment blade is adjusted by a swing motor which is able to rotate clockwise or counter-clockwise to make the cool air discharging direction optimal, after the above two steps of inferring the temperature and selecting an optimal cool air discharging direction are performed every minute, as shown in FIG. 10.

Here, supposing that the height of the refrigeration compartment is H, T1 is a temperature of left wall portion at a point 3H/4 from the bottom, and T2 is a temperature of left wall portion at a point 1H/3 from the bottom, T1 and T2 being inferred by GA-fuzzy function. A value $T_r$ is reference learning data as temperature pattern data learned by experience or a lot of experiments for the respective discharging directions, stored in data storage unit 26. Particularly, these values are obtained by various experiments with respect to external temperature change, temperature distribution of refrigerated foodstuffs accommodated in refrigeration compartment and temperature variation.

Also, fuzzy model discrimination (51) is performed by a fuzzy membership function for determining the ambiguous temperature state of the load input to refrigeration compartment (refrigerated foodstuff), e.g., hot, warm, moderate or cold. At this time, the second inferred temperature $T_R$ of refrigeration compartment is obtained using an output value $T_u$ operated by the temperature values R1, R2, first inferred temperature $T_R$ and $T_e$. In other words, assuming that MIN represents a function selecting a minimum factor among the factors within the parentheses, and MAX represents a function selecting a maximum factor among the factors within the parentheses, the first GA-fuzzy function is expressed as:

$$W=\text{MIN}\ [1,\ \text{MAX}\ \{0,\ (1.4-R1)/1.4\}]$$

$$W=\text{MIN}\ [1,\ \text{MAX}\ \{1,\ (1.14-R1)/1.4\}]$$

$$T1=W(-1.536+0.451R1+0.771R2)+(1-W)(0.141+1.055R1-0.041R2)$$

$$T2=-0.648-0.045R1+1.106R2$$

and the second GA-fuzzy function is expressed as:

$$W1=\text{MIN}\ [1,\ \text{MAX}\ \{0,\ (3.49-R1)/1.33\}]$$

$$W2=\text{MIN}\ [1,\ \text{MAX}\ \{0,\ (4.49-R2)/1.9\}]$$

$$\text{Opt. pos.}=W1W2P1+W1(1-W2)P2+(1-W1)W2P3+(1-W1)(1-W2)P4$$

$$P1=5.4+0.452R1-0.27T1+0.45T2-0.52R2$$

$$P2=2.7-0.2R1+0.27T1+0.33T2+0.03R2$$

$$P3=7.7+0.29R1-0.32T1-0.29T2+0.22R2$$

$$P4=1.4+3.7R1-0.36T1+0.19T2-2.65R2$$

where R1 and R2 are the temperatures of the respective predetermined positions, T1 and T2 are the inferred temperatures of the respective predetermined positions, W1, and W2 are the weighed value of the n-th rule calculated in the stage, P1, P2, P3 and P4 are the respective predetermined positions of cool air discharging adjustment blade for controlling the cool air discharging direction, obtained by genetic algorithm to be described later in detail. The first GA-fuzzy function is applicable to the operating process (A) shown in FIG. 10 and the second GA-fuzzy function is applicable to the operating process (B) shown in FIG. 10.

In the overall flow of GA-fuzzy control as shown FIG. 9, two steps of GA-fuzzy inference are operated as shown in FIG. 10. The first step is to infer the temperature distribution of the refrigeration compartment using a predetermined number of sensors. That is, the first step is to infer the temperature T1 at a point 3H/4 of the right wall portion and the temperature T2 at a point 1H/3 of the left wall portion using the input temperature R1 at a point 3H/4 of the left wall portion and the input temperature R2 at a point 1H/3 of the right wall portion. The second step is to infer the position P of cool air discharging blade 26 for determining the cool air discharging direction using the input R1, T1, $T_2$ and R2. Before describing these two inference steps, first of all, the TSK-fuzzy model.

1. TSK-fuzzy model

TSK (Takagi-Sugeno-Kang) fuzzy inference method is composed of the fuzzy rules as below.

$L_n^i$: IF $x_1$ is $A_1^i$, $x_2$ is $A_2^i$, ..., $x_m$ is $A_m^i$,

THEN $y_n^i = C_0^i + C_1^i X_1 + C_2^i X_2 + C_3^i X_3 + C_4^i X_4$ \hfill (1-1)

Here, $L_n^i$ is i-th rule in n fuzzy rules, $x_j$ are input variables, $A_j^i$ are fuzzy sets, $y_n^i$ is output of i-th fuzzy rules, $C_j^i$ is the parameters of conclusion parts.

The consequent total Y(i.e. TY) inferred from a fuzzy model for an input variable is obtained as follow.

$$TY = \frac{\sum_{i=1}^{n} w^i Y^i}{\sum_{i=1}^{n} w^i} \quad (1\text{-}2)$$

Here, n is the number of fuzzy rules, $w^i$ is the weighed value of the premise parts in i-th fuzzy rule. When the membership value in the $x_j^i$ the fuzzy sets $A_j^i(x)$ is expressed to $A_j^i$, the $w^i$ is expressed as follows.

$$w^j = \prod_{i=1}^{m} A_j^i(x_j^i) \quad (1\text{-}3)$$

The fuzzy model composed of such a fuzzy rule as the equation (1-2) is to divide an input domain into fuzzy partial domains and represent each fuzzy partial domain as an linear equation, and display its good ability in expressing a complex nonlinear system.

The more complex the membership function of the precondition part in the above fuzzy model is, the longer its calculation time becomes. If there are taken such three divisional linear functions as shown in FIG. 11 to be the membership function of the precondition part in the fuzzy set, however, a fuzzy model is represented as a comparatively simple equation which spares memory space and calculation time.

That is, in case the membership value of the fuzzy sets $A_1$, $A_2$, $A_3$ of FIG. 11 for an input variable x are expressed to be $A_1(x)$, $A_2(x)$ and $A_3(x)$, the equation (1-2) which express all models is represented to be simple as follows.

$A_1(x)=(|x-p1|-|x-p2|)/(p2-p1)+(|x-p3|-|p4|)/(p3-p4)$ $A_2(x)=0.5+(|x-p5|-|x-p6|)/2(p5-p6)$ $A_3(x)=0.5+(|x-p7|-|x-p8|)/2(p8-p7)$

Thus, the memory space to store the fuzzy model can be small and the time to calculate the same becomes short.

1) Criterion for testing the structure of a model

In a fuzzy model, since it is important to recognize the structure, a criterion for testing the structure is required. That is, there is required a criterion for testing whether the rules recognized from a predetermined quantity of recognition data are general rules which are suitable to a real system as well as to the predetermined numbers of the recognition data. As the criterion, an unbiasedness criterion (UC) of the following formula (1-4) is used.

$$UC = \left[ \sum_{i=1}^{n_A} (y_i^{AB} - y_i^{AA})^2 + \sum_{i=1}^{n_B} (y_i^{BA} - y_i^{BB})^2 \right]^{\frac{1}{2}} \quad (1\text{-}4)$$

$n_A$: number of data in group A
$n_B$: number of data in group B
$y_i^{AA}$: output of group A by MODEL A
$y_i^{AB}$: output of group A by MODEL B
$y_i^{BB}$: output of group B by MODEL B
$y_i^{BA}$: output of group B by MODEL A In the UC of the above formula (1-4), it is assumed that fuzzy models obtained from input and output data are as MODEL A and MODEL B, wherein the input and output data are divided into two groups of A and B and the fuzzy models are then made through a rule recognition process from the groups A and B.

2) Recognition of Conclusion Part

In the recognition of a conclusion part, since an output y is expressed as a linear formula having parameters $(c_0^1, c_1^1, \ldots, c_m^n)$ of the conclusion part, a general method applied to a linear system can be used. That is, the recognition of the structure of the conclusion part is to search parameters related with the conclusion part using a variable decreasing method, and the recognition of the conclusion part is to obtain coefficients (i.e., parameters) of the linear formula of the conclusion part using a minimum square method.

The inference formula (1-2) of the conclusion part (the output) of the fuzzy model can be expressed as the following formula (1-5).

$$TY = \left( \sum_{i=1}^{n} w^i Y^i \right) / \sum_{i=1}^{n} w^i \quad (1\text{-}5)$$

$$= \sum_{i=1}^{n} w^i (c_1^i + c_1^i x_1 + c_2^i x_2 + \cdots + c_m^i x_m) / \sum_{i=1}^{n} w^i$$

$$= c_0^1 g_0^1 + c_1^1 g_1^1 + c_2^1 g_2^1 + \cdots + c_m^1 g_m^1 +$$

$$c_0^2 g_0^2 + c_1^2 g_1^2 + c_2^2 g_2^2 + \cdots + c_m^2 g_m^2 +$$

$$\vdots$$

$$c_0^n g_0^n + c_1^n g_1^n + c_2^n g_2^n + \cdots + c_m^n g_m^n +$$

$$g_j^i = w^j x_j / \sum_{i=1}^{n} w^i$$

As shown in the formula (1-5), the inference formula y of the output is a linear formula having the parameters $(c_0^1, c_1^1, \ldots, c_m^n)$ of the conclusion part.

3) Recognition of Precondition Part

In the recognition of a precondition part, the recognition of the structure of the precondition part is to search a fuzzy division structure in the parameter's domain, and the recognition of the parameters of the precondition part is to search parameters characterizing a membership function of a fuzzy set, which are obtained using a non-linear design method by taking an objective function for minimizing sum of square of output errors or maximizing an maximum correlation. The structure of the precondition part is recognized by the following sequence.

STAGE 1: The UC value as a testing criterion is founded and recognized by recognizing a linear model.

STAGE 2: Domain of a variable of the precondition part (hereinafter referred as to only "precondition variable") is divided into two to make two fuzzy models each having rules. Then, as many fuzzy models as there are variables which can be adopted as precondition variables are obtained. The UC values with respect to each fuzzy model are calculated. Here, the precondition variables of a fuzzy model having the UC value which is less than that of the linear model are excluded from the precondional part in the following stages.

STAGE 3: Three fuzzy models each having rules are made using the structure of the precondition part of the fuzzy model having the least UC value which is founded and calculated in the above STAGE 2 and the UC values with respect to each fuzzy model are then calculated. If the least UC value calculated in this STAGE 3 is greater than the least UC value calculated in STAGE 2, the fuzzy model structure of the STAGE 2 is determined as the optimum structure. Otherwise, the following stage is performed in the same manner as the above.

2. The detailed Description of GA-FUZZY by Steps

1) STEP 1: TSK fuzzy model 1

| | | | |
|---|---|---|---|
| (1) | $L_2^1$: | IF $x_1$ = SMALL | THEN $y_2^1(T_{1\text{-}1})$ = −0.536 + 0.451$x_1$ + 0.771$x_2$ |
| | $L_2^2$: | IF $x_1$ = BIG | THEN $y_2^2(T_{1\text{-}1})$ = 0.141 + 1.055$x_1$ − 0.041$x_2$ |
| (2) | $L_2^1$: | IF $x_2$ = SMALL | THEN $y_2^1(T_{1\text{-}2})$ = −1.656 + 0.429$x_1$ + 0.848$x_2$ |
| | $L_2^2$: | IF $x_2$ = BIG | THEN $y_2^2(T_{1\text{-}2})$ = 0.006 +0 1.336$x_1$ − 0.189$x_2$ |
| (3) | $L_2^1$: | IF $x_1$ = SMALL | THEN $y_2^1(T_{2\text{-}1})$ = −0.671 − 0.090$x_1$ + 1.113$x_2$ |
| | $L_2^2$: | IF $x_1$ = BIG | THEN $y_2^2$(Thd 2-1) = 1.93 + 0.313$x_1$ + 0.255$x_2$ |
| (4) | $L_2^1$: | IF $x_2$ = SMALL | THEN $y_2^1(T_{2\text{-}2})$ = −6.184 − 4.826$x_1$ + 2.945$x_2$ |
| | $L_2^2$: | IF $x_2$ = BIG | THEN $y_2^2(T_{2\text{-}2})$ = −0.018 + 0.073$x_1$ + 0.886$x_2$ |

In this step 1, the temperature distribution of the refrigeration compartment is inferred by GA-fuzzy using a predetermined number of sensors.

INPUT DATA;

$x_1$: temperature at a point 3H/4 of the left wall portion i.e. R1

$x_2$: temperature at a point 1H/3 of the right wall portion i.e. R2

OUTPUT DATA;

$y_1$: temperature at a point 3H/4 of the right wall portion i.e. T1

$y_2$: temperature at a point 1H/3 of the left wall portion i.e. T2

STAGE 1:

First, the following linear formula (2-1) corresponding to the conclusion part of the TSK-FUZZY inference is obtained from the appended whole data including $x_1$, $x_2$, $y_1$ and $y_2$ using the minimum square method (Here, number of variables is minimized using the variable decreasing method by an error rate).

$$L_1^1: y_1^1(T_1) = -13.8 + 0.51x_1 + 0.68x_2$$

$$L_1^1: y_1^1(T_2) = -0648 - 0.045x_1 + 1.107x_2 \quad (2\text{-}1)$$

Also, the whole data are divided into two groups A and B and the UC value of STAGE 1 is calculated using the following formula (2-2).

$$UC = \left[\sum_{i=1}^{n_A}(y_i^{AB} - y_i^{AA})^2 + \sum_{i=1}^{n_B}(y_i^{BA} - y_i^{BB})^2\right]^{\frac{1}{2}} \quad (2\text{-}2)$$

$n_A$: number of data in group A
$n_B$: number of data in group B
$y_i^{AA}$: output of group A by MODEL A
$y_i^{AB}$: output of group A by MODEL B
$y_i^{BB}$: output of group B by MODEL B
$y_i^{BA}$: output of group B by MODEL A Then, the UC values are expressed as $UC_{11}$(0.0956) and $UC_{12}$(0.0372). Here, the first and second subscript after UC means respectively number of STAGE and number of the inference temperature "T" (that is, $UC_{12}$ means the value of UC for the STAGE 1 and $T_2$).

STAGE 2:

In this stage, fuzzy models in accordance with two plant rules are set. Here, since the setting of the precondition structure should be considered, variable selection and fuzzy division are simultaneously considered for the setting of the precondition structure.

First, a structure having one of $x_1$ and $x_2$ as the precondition variable is considered and the domain is divided into two parts. Thus, four following cases may be considered as the precondition structure.

Each UC value with respect to the above four structures (1), (2), (3) and (4) is calculated. The third subscript after "T" means number of structure. As an example, $T_{2\text{-}2}$ represent the second structure with respect to $T_2$.

Here, fuzzy division area (precondition parameters) with respect to each structure should be searched to calculate the UC values. Thus, a genetic algorithm, instead of a complex method which is a general method for setting the precondition parameters, is applied in the present system as a method therefor.

For example, the precondition parameters of the structure (1) are shown in FIG. 16.

The temperature control range of −10~20° C. in the refrigeration compartment is fractionized by 0.1° C. to provide 300 strings and a plurality of STRING DATA corresponding to the strings are then randomly made. Here, four of the string data are with "1" corresponding to p1, p3, p2 and p4 of the strings, and the remaining string data are filled with "0". Also, each maximum correlation coefficient with respect to the DATA is calculated. As a result, upper 10% data having higher correlation is reproduced and lower 10% data having lower correlation is selected. Also, middle data are crossbred with the upper 10% data to produce new data. Then, maximum correlation coefficients with respect to the newly produced data are obtained and the above processes are then repeated.

The maximum correlation coefficients of the repeatedly produced data are continuously compared until data having larger correlation coefficient than the previous coefficient is not obtained. Then, the string data having the largest correlation coefficient is to be the precondition parameters as the final p1, p3, p2 and p4. When the precondition parameters are set, the UC values are calculated according to the set parameters, wherein the obtained UC values are for the structure (1). By the above process, the UC values of the structures (1), (2), (3) and (4), that is, $UC_{(21\text{-}1)}$, $UC_{(21\text{-}2)}$, $UC_{(22\text{-}1)}$ and $UC_{(22\text{-}2)}$ (where the first subscript represent the number of stage, the second subscript the number of temperature, and the fourth subscript the number of structure. I.e. $UC_{(21\text{-}2)}$ represent UC value of the 2nd structure with respect to $T_1$ in the stage 2) are obtained. Among the UC values, the UC values of the structures (1) and (2) are compared to select a structure having less UC value, thereby taking the selected structure as the structure of STAGE 2 for inferring $y_1$. Also, one of structures (3) and (4), having less UC value, is taken as the structure of STAGE 2 for inferring $y_2$. Then, fuzzy division for providing three rules is performed based on the structure of STAGE 2.

The magnitude of the UC values in the present system is as follows.

$$UC_{(21-1)}(0.0374) < UC_{11}(0.0956) < UC_{(21-2)}(0.1038) \quad (2\text{-}3); \text{ with respect to } T_1$$

$$UC_{12}(0.0372) < UC_{(22-1)}(0.0393) < UC_{(22-2)}(0.0977) \quad (2\text{-}3^*); \text{ with respect to } T_2$$

Here, comparing the magnitude of the UC values, $UC_{(21-1)}$ is the least in the fuzzy model inferring $y_1$, so that a new structure for 3-division of STAGE 3 is made using the structure (1). However, since the UC value of STAGE 1 is the least in the fuzzy model inferring $Y_2$, the division is not performed any more and $y_2$ is inferred using a linear formula having $UC_{12}$.

STAGE 3:

In the present system, fuzzy division of STAGE 3 in which the domain of $x_1$ and $x_2$ is divided into three parts is performed. Here, the structure is as shown in FIG. 17) and the fuzzy division area is shown in FIG. 18.

structure having less UC value. Then, the fuzzy division for providing four rules is performed based on the selected structure. Here, when all values of $UC_{(31-1)}$, $UC_{(31-2)}$ and $UC_{(31-3)}$ are better (less) than the value of $UC_{(21-1)}$, the four-division is performed. However, all values of $UC_{(31-1)}$, $UC_{(31-2)}$ and $UC_{(31-3)}$ are worse (greater) than the value of $UC_{(21-1)}$, the four-division is interrupted and a fuzzy rule having $UC_{(21-1)}$ is taken as a final rule.

In the present system, the magnitude of UC value is as follows.

$$UC_{(21-1)}(0.0374) < UC_{(31-1)}(0.0412) < UC_{(31-2)}(0.0415) < UC_{(31-3)}(0.0459) \quad (2\text{-}4)$$

As shown in the above comparison, since all UC values of STAGE 3 is greater those of STAGE 2, the structure (1)

| | | | |
|---|---|---|---|
| (1) | $L_3^1$: | IF $x_1$ = SMALL | THEN $y_3^1(T_{1-1}) = 3.36 + 1.08x_1 - 0.72x_2$ |
| | $L_3^2$: | IF $x_1$ = BIG<br>$x_2$ = SMALL | THEN $y_3^2(T_{1-1}) = -6.09 + 3.37x_1 + 1.15x_2$ |
| | $L_3^3$: | IF $x_1$ = BIG<br>$x_2$ = BIG | THEN $y_3^3(T_{1-1}) = -0.087 + 1.01x_1 + 0.047x_2$ |
| (2) | $L_3^1$: | IF $x_1$ = BIG | THEN $y_3^1(T_{1-2}) = -5.78 + 1.22x_1 + 0.77x_2$ |
| | $L_3^2$: | IF $x_1$ = SMALL<br>$x_2$ = SMALL | THEN $y_3^2(T_{1-2}) = 0.41 + 0.57x_1 + 0.01x_2$ |
| | $L_3^3$: | IF $x_1$ = SMALL<br>$x_2$ = BIG | THEN $y_3^3(T_{1-2}) = 1.937 + 0.76x_1 - 0.09x_2$ |
| (3) | $L_3^1$: | IF $x_1$ = BIG | THEN $y_3^1(T_{1-3}) = 15.34 - 6.10x_1 + 8.39x_2$ |
| | $L_3^2$: | IF $x_1$ = MEDIUM | THEN $Y_3^2(T_{1-3}) = -1.56 + 0.29x_1 + 0.76x_2$ |
| | $L_3^3$: | IF $x_1$ = SMALL | THEN $y_3^3(T_{1-3}) = 0.23 + 1.03x_1 - 0.047x_2$ |

For obtaining the precondition parameters of the structure (1), the genetic algorithm is applied as in STAGE 2. First, the temperature control range of −10~20° C. in the refrigeration compartment is fractionized by 0.1° C. to provide 300 strings and a plurality of string data corresponding to the strings are then randomly made. Here, six of the string data are with "1" corresponding to p1, p3, p2, p4, p5 and p6 of the strings, and the remaining string data are filled with "0". Also, each maximum correlation coefficient with respect to the data is calculated. As a result, upper 10% data having higher correlation is reproduced and lower 10% data having lower correlation is selected. Also, middle data are crossbred with the upper 10% data to produce new data. Then, maximum correlation coefficients with respect to the newly produced data are obtained and the above processes are then repeated.

The maximum correlation coefficients of the repeatedly produced data are continuously compared until data having larger correlation coefficient than the previous coefficient is not obtained. Then, the string data having the largest correlation coefficient is to be the precondition parameters as the final p1, p3, p2, p4, p5 and p6. When the precondition parameters are set, the UC values are calculated according to the set parameters, wherein the obtained UC values are for the structure (1). By the above process, the UC values of the structures (1), (2) and (3), that is, $UC_{(31-1)}$, $UC_{(31-2)}$ and $UC_{(31-3)}$, are obtained. Among the UC values, the UC values of the structures (1) and (2) are compared to select a of STAGE 2 (i.e. $UC_{(21-1)}$) is taken as a final fuzzy rule without four-division.

Lastly, the setting of the precondition structure and parameters, and of the conclusion structure and parameters, according to the finally adopted GA-FUZZY, can be summarized as follows (The inferred part of $y_1$ becomes the structure (1) of STAGE 2 and the inferred part of $y_2$ becomes the linear formula of STAGE 1).

First, a linear formula for inferring $y_1^1(T_2)$ is obtained using the minimum square method as follows.

$$y_1^1(T_2) = -0.648 - 0.045x_1 + 1.107x_2$$

The structure of fuzzy model for inferring $y_2^1(T_{1-1})$ and $y_2^2(T_{1-1})$ is as follows.

| | | |
|---|---|---|
| $L_2^1$: | IF $x_1$ = SMALL | THEN $y_2^1(\text{Thd 1-1}) = -0.536 + 0.451x_1 + 0.771x_2$ |
| $L_2^2$: | IF $x_1$ = BIG | THEN $y_2^2(T_{1-1}) = 0.141 + 1.055x_1 - 0.041x_2$ |

First, the precondition parameters should be calculated for obtaining $W_1$.

The precondition parameters are calculated by a method shown in FIG. 19 using the genetic algorithm of STAGES 2 and 3. However, a case where p1=p3 and p2=p4 is adopted in the present system to provide the following p1, p2, p3 and p4 as shown in FIG. 20.

Using the above values, W. is calculated by the following formula (2-5).

$$W_1 = \min(1, \max(0, (1.4 - x_1)/1.14)) \quad (2\text{-}5)$$

A final inference temperature $y_2(T_1)$ is calculated using $W_1$, $y_2^1(T_{1-1})$ and $y_2^2(T_{1-1})$ according to the following formula.

$$T_1 = W_1 T_{1-1} + (1-W_1)T_{1-1} \text{ (i.e. } y_2 = W_1 y_2^1 + (1-W_1) y_2^2)$$

2) STEP 2: TSK fuzzy model 2

In this step 2, a cool air discharging direction is set by GA-fuzzy using to the temperature distribution of the refrigeration compartment.

INPUT DATA;

$x_1$: temperature at a point 3H/4 of the left wall portion (R1)

$x_2$: temperature at a point 3H/4 of the right wall portion ($T_1$)

$x_3$: temperature at a point 1H/3 of the left wall portion ($T_2$)

$x_4$: temperature at a point 1H/3 of the right wall portion (R2)

OUTPUT DATA;

y: cool air discharging direction (P; the position of cool air discharging blade 26 for determining the cool air discharging direction)

STAGE 1:

First, the following linear formula (2-6) corresponding to the conclusion part of the TSK-FUZZY inference is obtained from the appended whole data including $x_1$, $x_2$, $x_3$ and $x_4$ using the minimum square method (Here, number of variables is minimized using the variable decreasing method by an error rate).

$$L_1^1: y_1^1 = 5.65 + 0.60x_1 - 0.21x_2 + 0.23x_3 - 0.53x_4 \quad (2-6)$$

Also, the whole data are divided into two groups A and B and the UC value of STAGE 1 is calculated using the following formula (2-7).

$$UC = \left[ \sum_{i=1}^{n_A} (Y_i^{AB} - Y_i^{AA})^2 + \sum_{i=1}^{n_B} (Y_i^{BA} - Y_i^{BB})^2 \right]^{\frac{1}{2}} \quad (2-7)$$

$n_A$: number of data in group A
$n_B$: number of data in group B
$y_i^{AA}$: output of group A by MODEL A
$y_i^{AB}$: output of group B by MODEL B
$y_i^{BB}$: output of group B by MODEL B
$y_i^{BA}$: output of group B by MODEL A Here, the UC values are expressed as $UC_1(=1.25)$.

STAGE 2:

In this stage, fuzzy models in accordance with two plant rules-are set. Here, since the setting of the precondition structure should be considered, variable selection and fuzzy division are simultaneously considered for the setting of the precondition structure.

First, a structure having one of $x_1$, $x_2$, $x_3$ and $x_4$ as the precondition variable is considered and the domain is divided into two parts. Thus, four following cases may be considered as the precondition structure.

Each UC value with respect to the above four structures is calculated.

Here, fuzzy division area (precondition parameters) with respect to each structure should be searched to calculate the UC values. Thus, a genetic algorithm, instead of a complex method which is a general method for setting the precondition parameters, is applied in the present system as a method therefor. For example, the precondition parameters of the structure (1) are as shown in FIG. 21.

The temperature control range of $-10 \sim 20°$ C. in the refrigeration compartment is fractionized by $0.1°$ C. to provide 300 strings and a plurality of STRING DATA corresponding to the strings are then randomly made. Here, four of the string data are with "1" corresponding to p1, p3, p2 and p4 of the strings, and the remaining string data are filled with "0". Also, each maximum correlation coefficient with respect to the DATA is calculated. As a result, upper 10% data having higher correlation is reproduced and lower 10% data having lower correlation is selected. Also, middle data are crossbred with the upper 10% data to produce new data. Then, maximum correlation coefficients with respect to the newly produced data are obtained and the above processes are then repeated.

The maximum correlation coefficients of the repeatedly produced data are continuously compared until data having larger correlation coefficient than the previous coefficient is not obtained. Then, the string data having the largest correlation coefficient is to be the precondition parameters as the final p1, p3, p2 and p4. When the precondition parameters are set, the UC values are calculated according to the set parameters, wherein the obtained UC values are for the structure (1). By the above process, the UC values of the structures (1), (2), (3) and (4), that is, $UC_{(2-1)}$, $UC_{(2-2)}$, $UC_{(2-3)}$ and $UC_{(2-4)}$, are obtained. Among the UC values, a structure having less UC value is selected, then, fuzzy division for providing three rules is performed based on the selected structure.

The magnitude of the UC values in the present system is as follows.

$$U.C_{(2-1)}(1.14) < U.C_{(2-4)}(1.17) < UC_{(1)}(1.25) < U.C_{(2-3)}(1.27) < U.C_{(2-2)}(1.32) \quad (2-8)$$

Thus, new 3-division structure is made based on a structure in which domain of variable $x_1$ is divided into two.

STAGE 3:

For making the 3-division structure, a domain of $(x_1-x_i)$ should be made by adding a new variable. Here, since $x_i = x_2$, $x_3$, $x_4$, many structures are generated. In order to remove unnecessary structures from many structures, the variables of STAGE 2 having the UC value which is greater than $UC_{(1)}$ are omitted, thereby simplifying structure.

Thus, fuzzy division of STAGE 3 for dividing the domains of $x_1$ and $x_4$ into three parts is performed in the present system. Here, 3-division structure is as shown in FIG. 22 and the fuzzy division area is shown in FIG. 23.

| (1) | $L_2^1$: | IF $x_1$ = SMALL | THEN $y_2^1 = 5.60 + 0.28x_1 - 0.28x_2 + 0.40x_3 - 0.61x_4$ |
|---|---|---|---|
|   | $L_2^2$: | IF $x_1$ = BIG | THEN $y_2^2 = 750 + 0.70X_1 - 0.43X_2 + 0.47X_3 - 0.18X_4$ |
| (2) | $L_2^1$: | IF $x_2$ = SMALL | THEN $y_2^1 = 550 + 0.70x_1 - 0.18x_2 + 0.22x_3 - 0.56x_4$ |
|   | $L_2^2$: | IF $x_2$ = BIG | THEN $y_2^2 = 135 + 1.34x_1 - 1.67x_2 + 0.35x_3 + 0.23x_4$ |
| (3) | $L_2^1$: | IF $x_3$ = SMALL | THEN $y_2^1 = 7.55 + 1.02x_1 - 0.16x_2 + 1.80x_3 - 0.69x_4$ |
|   | $L_2^2$: | IF $x_3$ = BIG | THEN $y_2^2 = -235 + 0.25x_1 - 0.27x_2 + 2.03x_3 - 0.39x_4$ |
| (4) | $L_2^1$: | IF $x_4$ = SMALL | THEN $y_2^1 = 5.43 + 0.68x_1 - 0.27x_2 + 0.23x_3 - 0.27x_4$ |
|   | $L_2^2$: | IF $x_4$ = BIG | THEN $y_2^2 = 1.99 + 0.03x_1 + 0.20x_2 + 0.25x_3 + 0.06x_4$ |

| | | | |
|---|---|---|---|
| (1) | $L_3^1$: | IF $x_1$ = SMALL | THEN $y_3^1$ = 5.15 + 0.30$x_1$ − 0.12$x_2$ +0 0.47 $x_3$ − 0.49$x_4$ |
| | $L_3^2$: | IF $x_1$ = BIG | |
| | | $x_4$ = SMALL | THEN $y_3^2$ = 7.75 + 0.32$x_1$ − 0.42$x_2$ − 0.26$x_3$ + 0.05$x_4$ |
| | $L_3^3$: | IF $x_1$ = BIG | |
| | | $x_4$ = BIG | THEN $y_3^3$ = 2.39 + 3.96$x_1$ − 0.06$x_2$ + 0.38$x_3$ − 3.61$x_4$ |
| (2) | $L_3^1$: | IF $x_1$ = BIG | THEN $y_3^1$ = 0.21 + 0.21$x_1$ − 0.16$x_2$ + 0.53$x_3$ + 0.88$x_4$ |
| | $L_3^2$: | IF $x_1$ = SMALL | |
| | | $x_4$ = SMALL | THEN $y_3^2$ = 0.14 + 1.015$x_1$ − 0.36$x_2$ + 0.35$x_3$ + 0.59$x_4$ |
| | $L_3^3$: | IF $x_1$ = SMALL | |
| | | $x_4$ = BIG | THEN $y_3^3$ = 0.14 + 1.15$x_1$ − 0.36$x_2$ + 0.35$x_3$ + 0.59$x_4$ |
| (3) | $L_3^1$: | IF $x_1$ = BIG | THEN $y_3^1$ = 0.19 + 0.43$x_1$ + 0.13$x_2$ + 0.49$x_3$ + 0.82$x_4$ |
| | $L_3^2$: | IF $x_1$ = MEDIUM | THEN $y_3^2$ = 0.21 + 0.36$x_1$ − 0.32$x_2$ + 0.53$x_3$ + 0.89$x_4$ |
| | $L_3^3$: | IF $x_2$ = SMALL | THEN $y_3^3$ = 0.18 + 1.29$x_1$ − 0.41$x_2$ + 0.46$x_3$ + 0.77$x_4$ |

For obtaining the precondition parameters of the structure (1), the genetic algorithm is applied as in STEP 2. First, the temperature control range of −10~20° C. in the refrigeration compartment is fractionized by 0.1° C. to provide 300 strings and a plurality of string data corresponding to the strings are then randomly made. Here, six of the string data are with "1" corresponding to p1, p3, p2, p4, p5 and p6 of the strings, and the remaining string data are filled with "0". Also, each maximum correlation coefficient with respect to the data is calculated. As a result, upper 10% data having higher correlation is reproduced and lower 10% data having lower correlation is selected. Also, middle data are crossbred with the upper 10% data to produce new data. Then, maximum correlation coefficients with respect to the newly produced data are obtained and the above processes are then repeated.

The maximum correlation coefficients of the repeatedly produced data are continuously compared until data having larger correlation coefficient than the previous coefficient is not obtained. Then, the string data having the largest correlation coefficient is to be the precondition parameters as the final p1, p3, p2, p4, p5 and p6. When the precondition parameters are set, the UC values are calculated according to the set parameters, wherein the obtained UC values are for the structure (1). By the above process, the UC values of the structures (1), (2) and (3), that is, $UC_{(3-1)}$, $UC_{(3-2)}$ and $UC_{(3-3)}$, are obtained and a structure having the least UC value is then selected. Then, the fuzzy division for providing four rules is performed based on the selected structure. Here, when all values of $UC_{(3-1)}$, $UC_{(3-2)}$ and $UC_{(3-3)}$ are better (less) than the value of $UC_{(2-1)}$, the four-division is performed. However, all three UC values are worse (greater) than the value of $UC_{(2-1)}$, the four-division is interrupted and a fuzzy rule having $UC_{(2-1)}$ is taken as a final rule.

In the present system, the amplitude of UC value is as follows.

$$UC_{(3-1)}(1.029) < UC_{(2-1)}(1.14) < UC_{(3-2)}(2.88) < UC_{(3-3)}(3.08) \quad (2\text{-}9)$$

Thus, a new 4-division structure is made based on the structure (1) of STAGE 3.

STAGE 4:

In this stage, the precondition structure of the model of STAGE 3 is further fractionized and models are set in accordance with four plant rules. If a structure having the UC value which is less than $UC_{(2-1)}$ remains in STAGE 3, the structure should be regarded as a start 3-division structure on the 4-division. However, in order to reduce searching frequencies, the 4-division is performed based on the structure (1) of STAGE 3 having the least UC value. The 4-division structure is made into five as shown in FIG. 24.

Each UC value of the above structures is calculated. Here, the genetic algorithm is used as STAGES 2 and 3 for calculating the UC values. Assuming the UC values of the structures (1), (2), (3), (4) and (5) as $UC_{(4-1)}$, $UC_{(4-2)}$, $UC_{(4-3)}$, $UC_{(4-4)}$ and $UC_{(4-5)}$, respectively, the magnitude of the UC values is as follows in the present system.

$$UC_{(4-3)}(0.94) < UC_{(3-1)}(1.029) < UC_{(4-2)}(1.35) < UC_{(4-1)}(1.36) < UC_{(4-4)}(1.41) < UC_{(4-5)}(1.43) \quad (2\text{-}10)$$

Thus, fuzzy 5-division of STAGE 5 is performed based on the structure of $UC_{(4-3)}$. However, according to the present system, all UC values calculated through 5-division are worst than $UC_{(4-3)}$.

Ultimately, the precondition structure (3) of fuzzy 4-division is applied for the GA-FUZZY for setting the cool air discharging direction according to the temperature distribution of the refrigeration compartment.

Lastly, the setting of the precondition structure and parameters, and of the conclusion structure and parameters, according to the finally adopted GA-FUZZY, can be summarized as follows (This is fuzzy division structure (3) of STAGE 4).

| | | | |
|---|---|---|---|
| (1) | $L_4^1$: | IF $x_1$(R1) = SMALL | |
| | | $x_4$(R2) = SMALL | THEN $y_4^1$(P1) = 5.4 + 0.42$x_1$(R1) − 0.27$x_2$(Thd 1) + 0.45$x_3$(T$_2$) − 0.52$x_4$(R2) |
| | $L_4^2$: | IF $x_1$(R1) = SMALL | |
| | | $x_4$(R2) = BIG | THEN $y_4^2$(P2) = 2.7 − 0.2$x_1$(R1) + 0.27$x_2$(Thd 1) + 0.33$x_3$(Thd 2) + 0.03$x_4$(R2) |
| | $L_4^3$: | IF $x_1$(R1) = BIG | |
| | | $x_4$(R2) = SMALL | THEN $y_4^3$(P3) = 7.7 + 0.29$x_1$(R1) − 0.32$x_2$(Thd 1) − 0.29$x_3$(T$_2$) + 0.22$x_4$(R2) |
| | $L_4^4$: | IF $x_1$(R1) = BIG | |
| | | $x_4$(R2) = BIG | THEN $y_4^4$(P4) = 1.4 + 3.7$x_1$(R1) − 0.36$x_2$(Thd 1) + 0.19$x_3$(T$_2$) − 2.65$x_4$(R2) |

First, the precondition parameters should be calculated for obtaining $W_1$ and $W_2$.

The precondition parameters are as shown in FIG. 25 and calculated using the genetic algorithm of STAGES 2 and 3.

However, a rule where p1=p3(=1.33), p2=p4(=3.49), p5=p7(=1.9) and p6=p8(=4.39) is adopted in the present system, and p1, p2, p3, p4, p5, p6, p7 and p8 obtained using the genetic algorithm are as follows.

Using the above values, $W_1$ and $W_2$ are calculated by the following formula (2-11).

$$W_1 = \min[1, \max\{0, (3.49-x_1)/1.33\}]$$

$$W_2 = \min[1, \max\{0, (4.39-x_4)/1.9\}] \quad (2\text{-}11)$$

i.e. $W_1 = \min[1, \max\{0, (3.49-R1)/1.33\}]$ $W_2 = \min[1, \max\{0, (4.39-R2)/1.9\}] \quad (2\text{-}11^*)$ A final cool air discharging direction is determined using $w_1$ and $w_2$, and $y_4^1(P1)$, $y_4^2(P2)$, $y_4^3(P3)$ and $y_4^4(P4)$ according to the following formula.

$$\text{OPT.POS.} = W_1 W_2 y_1 + W_1(1-W_2)y_2 + (1-W_1)W_2 y_3 + (1-W_1)(1-W_2)y_4$$

i.e. $\text{OPT.POS.} = W_1 W_2 P1 + W_1(1-W_1)P2 + (1-W_1)W_2 P3 + (1-W_1)(1-W_2)P4.$ Effects of the refrigerator temperature controlling apparatus and method adopting GA-fuzzy inference will now be described with reference to FIGS. 12 through 15.

FIG. 12 comparatively shows temperature descending curves according to cooling time in a simple rotation method of a conventional cool air discharging adjustment blade, and according to the cooling time in a refrigerator of the present invention, obtained by controlling the cool air discharging adjustment blade with the GA-fuzzy inference during discharging the cool air.

Here, curves A through D indicate temperatures when the refrigeration compartment is cooled by simply rotating cool air discharging adjustment blade, in which the curve A is the minimum temperature curve of the upper shelf, the curve B is the maximum temperature curve of the upper shelf, the curve C is the minimum temperature curve of the lower shelf, and the curve D is the maximum temperature curve of the lower shelf. Curves A' through D' indicate temperatures when the refrigeration compartment is cooled by controlling the position of cool air discharging adjustment blade using GA-fuzzy function inference, in which the curves A' and B' are temperature curves of the upper shelf, the curves C' and D' are temperature curves of the lower shelf.

As described above, when the refrigeration compartment is cooled by controlling the position of cool air discharging adjustment blade using GA-fuzzy function inference, the difference between the maximum and minimum temperature over time is nearly emptied. Also, the difference between temperatures of upper and lower shelves is considerably reduced.

FIG. 13 is a perspective schematic illustrating the points on each shelf for measuring temperature distribution in the refrigerator. FIG. 14 is a graph indicating temperature distribution at each measured points shown in FIG. 13 in the conventional refrigerator adopting the fuzzy inference. FIG. 15 is a graph indicating temperature distribution at each measured points shown in FIG. 13 in the refrigerator being provided with the temperature controlling apparatus adopting the GA-fuzzy inference.

Here, the measurement was performed in a constant temperature and moisture chamber under the conditions of 30° C. temperature and 75%. humidity. As shown in FIG. 14, the temperature deviation ΔT of refrigeration compartment by the convention cooling method is 2.5° C. However, as shown in FIG. 15, the temperature deviation ΔT of refrigeration compartment by the cooling method according to the present invention is 0.9° C., which is far smaller than that by the conventional method.

As described above, in the refrigerator temperature controlling apparatus and method adopting GA-fuzzy inference according to the present invention, supposing that the height of the refrigeration compartment is H, temperature sensors are installed on the left wall at a point 3H/4 from the bottom and on the right wall at a point 1H/3 from the bottom and the cool air discharging direction is controlled while comparing the temperature distribution obtained by learning with data by inferring the temperature using the GA-fuzzy function. Therefore, the cooling becomes rapid and the temperature distribution becomes uniform throughout the refrigeration compartment depending on the temperature difference of refrigerated foodstuffs. Also, the incoming external temperature due to door opening is compensated for.

What is claimed is:

1. A refrigerator comprising:

a main body including a freezer compartment and a refrigeration compartment, each being partitioned;

an evaporator for generating and supplying cool air to said freezer and refrigeration compartments;

a housing formed at one side of said refrigeration compartment and having a guiding said cool air generated from said evaporator to said refrigeration compartment and a cool air passage for guiding downward said cool air passing through guide passage;

a plurality of discharging apertures formed vertically of said housing and for guiding said cool air flowing along said cool air passage so as to be discharged being dispersed throughout said refrigeration compartment; and wherein said plurality of discharging apertures are situated at the center portion of said housing and arranged vertically to correspond to each partitioned area of said refrigeration compartment, and said cool air passage comprises first and second passage portions arranged both sides of said discharging apertures, a first linking path for linking said first passage portion and said discharging apertures and a second linking path for linking said second passage portion and said discharging apertures.

2. A refrigerator as claimed in claim 1, wherein each of said discharging aperture comprises a first discharging portion directly connected to said first linking path and a second discharging portion directly connected to said second linking path, and said first and second discharging portions are interconnected, and are reciprocally stepped such that said first discharging portion is inclined toward said first linking path, and said second discharging portion is inclined toward said second linking path.

3. A refrigerator as claimed in claim 2, wherein the upper side of inlets of said first and second linking paths are rounded, and the lower side is formed by flanges to be extended more outwardly than said upper side thereof.

4. A refrigerator as claimed in claim 3, wherein a flange being at the lower portion is extended more outwardly than that being at the upper portion.

5. A refrigerator comprising:

a housing installed in the rear wall of said refrigeration compartment;

a cool air passage installed at one side of said housing for guiding the cool air;

a plurality of discharging apertures interconnected with said cool air passage;

at least one plate member each installed at said cool air discharging apertures so as to be rotatable centering around a shaft; and a dispersion guiding blade vertically constructed on said plate member for dispersing the cool air.

6. A refrigerator as claimed in claim 5, wherein said cool air passage is installed within said housing and is divided to have a first passage portion and a second passage portion.

7. A refrigerator having a cool air dispersing apparatus installed in the rear wall of a refrigeration compartment for unifying the temperature distribution of said refrigeration compartment, comprising:

a housing;

a guide passage installed at one edge of said housing for guiding the cool air;

first and second passage portions installed within said housing, divided from said cool air passage and nearly being parallel with each other;

a plurality of discharging apertures installed in a predetermined position between said first passage portion and said second passage portion and each interconnected with said first and second passage portions;

cool air discharging adjustment blades each installed at said cool air discharging apertures so as to be rotatable centering around a shaft; and a grill opposed to said cool air discharging adjustment blades for protecting said cool air discharging adjustment blade so that the cool air discharged from said first and second passage portions is circulated throughout said refrigeration compartment during the rotation of said cool air discharging adjustment blade.

8. A refrigerator comprising:

a main body including a freezer compartment and a refrigeration compartment, each being partitioned;

an evaporator for generating and supplying cool air to said freezer and refrigeration compartments;

a housing formed at one side of said refrigeration compartment and having a guide passage for guiding said cool air generated from said evaporator to said refrigeration compartment and a cool air passage for guiding downward said cool air passing through said guide passage;

a plurality of discharging apertures formed vertically of said housing and for guiding said cool air flowing along said cool air passage so as to be discharged being dispersed throughout said refrigeration compartment;

a cool air discharging adjustment blade rotatably installed at said housing for controlling said discharging direction of said cool air which is discharged through said discharging apertures;

a driving motor rotating said cool air discharging adjustment blade; and wherein said cool air discharging adjustment blade comprises a distributing plate having an upper plate and a lower plate spaced apart from each other by a predetermined distance, and a middle plate; and a dispersion guiding blade vertically connecting said upper plate and said middle plate and a second dispersion guiding blade for vertically connecting said middle plate and said lower plate.

9. A refrigerator as claimed in claim 8, wherein said first and second dispersion guiding blades have a concave portion and a convex portion each successively being rounded.

10. A refrigerator as claimed in claim 9, wherein said concave portions of said first and second dispersion guiding blades or said convex portions thereof are opposite to each other, respectively.

11. A refrigerator as claimed in claim 8, wherein said cool air discharging adjustment blade includes a cool air guiding portion having said distributing plate and dispersion guiding blade, said cool air guiding portion includes an upper cool air guiding portion, a middle cool air guiding portion, and a lower cool air guiding portion, each corresponding to the upper, middle and lower portions of said refrigeration compartment, and integrally connected by a supporting member.

12. A refrigerator as claimed in claim 11, wherein said dispersion guiding blade of said upper cool air guiding portion and that of said middle cool air guiding portion are disposed to be almost perpendicular to each other, and said dispersion guiding blade of said upper cool air guiding to portion and that of said lower cool air guiding portion are disposed to form an angle of about 45°.

13. A refrigerator as claimed in claim 12, wherein assuming the height of said refrigeration compartment is H, said upper cool air guiding portion is positioned at 3/4H of the height thereof, said middle cool air guiding portion is positioned at 1/2H of the height thereof, and said lower cool air guiding portion is positioned at 1/3H of the height thereof.

14. A refrigerator as claimed in claim 12, wherein said cool air discharging adjustment blade includes an upper cool air discharging adjustment blade and a lower cool air discharging adjustment blade, which is coupled in pairs, said upper and middle cool air guiding portions being disposed in said cool air discharging adjustment blade, and said lower cool air guiding portion being disposed in said cool air discharging adjustment blade.

15. A refrigerator as claimed in claim 8, further comprising:

a first temperature sensor installed in the upper end of one side wall of said refrigeration compartment;

a second temperature sensor installed in the lower end of the other side wall of said refrigeration compartment;

a position detecting switch turned on/off in accordance with the rotation position of said cool air discharging adjustment blade; and a controller connected with said first and second temperature sensors and said position detecting switch in a circuit manner for determining the rotation position of said cool air discharging adjustment blade for intensive cooling.

16. A refrigerator as claimed in claim 15, wherein said position detecting switch is installed in said housing of the upper portion of said cool air discharging adjustment blade, and there is provided an operating protrusion for switching on/off said position detecting switch by being rotated with said cool air discharging adjustment blade in the upper portion thereof.

17. A refrigerator as claimed in claim 16, wherein said operating protrusion is formed such that the portion in contact with said position detecting switch is rounded.

18. A refrigerator as claimed in claim 8, wherein said driving motor is installed in said housing of the upper portion of said cool air discharging adjustment blade, and is installed in a motor case.

19. A refrigerator as claimed in claim 18, wherein an internal refrigerator lamp is installed in said housing disposed adjacent to said driving motor.

20. A refrigerator comprising:
- a main body including a freezer compartment and a refrigeration compartment, each being partitioned;
- an evaporator for generating and supplying cool air to said freezer and refrigeration compartments;
- a housing formed at one side of said refrigeration compartment and having a guide passage for guiding said cool air passing through said evaporator to said refrigeration compartment;
- a cool air passage formed at both sides of said housing so as to be connected with said guide passage and having a first passage portion and a second passage portion each for guiding a flow of the cool air passing through said guide passage;
- a plurality of discharging apertures disposed vertically between said first and second passage portions for guiding the cool air flowing along said cool air passage to be discharged to said refrigeration compartment;
- a cool air discharging adjustment blade rotatably installed in front of said housing for dispersing or concentrating the cool air discharged through said discharging apertures; and
- a driving motor for rotating said cool air discharging adjustment blade.

21. A refrigerator as claimed in claim 20, wherein said cool air passage further includes a first linking path for linking said first passage portion with said discharging apertures and a second linking path for linking said second passage portion with said discharging apertures, said respective discharging apertures having a first discharging portion directly linked with said first linking path and a second discharging portion directly linked with said second linking path, said first and second discharging portions being interconnected and being reciprocally stepped such that said first discharging portion is inclined toward said first linking path and said second discharging portion is inclined toward said second linking path, respectively.

22. A refrigerator as claimed in claim 21, wherein the upper side of inlets of said first and second linking paths are rounded, and the lower side thereof is formed by flanges so as to be extended more outwardly than the upper side thereof.

23. A refrigerator as claimed in claim 22, wherein the lower flanges are extended more outwardly than the upper ones.

24. A refrigerator as claimed in claim 21, wherein said cool air discharging adjustment blade comprises:
- a distributing plate having a middle plate positioned in the boundary surface of said first and second discharging portions, a upper plate and a lower plate spaced apart up and down from each other by a distance corresponding to the heights of said first and second discharging portions; and
- a dispersion guiding blade portion having a first dispersion guiding blade vertically connecting said upper plate and said middle plate and a second dispersion guiding blade for vertically connecting said middle plate and said lower plate.

25. A refrigerator as claimed in claim 24, wherein said first and second dispersion guiding blades have a concave portion and a convex portion each successively being rounded.

26. A refrigerator as claimed in claim 25, wherein the concave portions of said first and dispersion guiding blades or the convex portions thereof are opposite to each other, respectively.

27. A refrigerator as claimed in claim 24, wherein said distributing plate has an upper cool air guiding portion, a middle cool air guiding portion, and a lower cool air guiding portion, each corresponding to the upper, middle and lower portions of said refrigeration compartment, and integrally connected by a supporting member.

28. A refrigerator as claimed in claim 27, wherein said dispersion guiding blade of said upper cool air guiding portion and that of said middle cool air guiding portion are disposed to be almost perpendicular to each other, and said dispersion guiding blade of said upper cool air guiding portion and that of said lower cool air guiding portion are disposed to form an angle of about 45°.

29. A refrigerator as claimed in claim 28, wherein assuming that the height of said refrigeration compartment is H, said upper cool air guiding portion is positioned at a point 3H/4 of the height thereof, said middle cool air guiding portion is positioned at a point 1H/2 of the height thereof, and said lower cool air guiding portion is positioned at a point 1H/3 of the height thereof.

30. A refrigerator as claimed in claim 20, further comprising:
- a first temperature sensor installed in the upper end of one side wall of said refrigeration compartment;
- a second temperature sensor installed in the lower end of the other side wall of said refrigeration compartment;
- a position detecting switch turned on/off in accordance with the rotation position of said cool air discharging adjustment blade; and
- a controller electrically connected with said first and second temperature sensors and said position detecting switch for determining the rotation position of said cool air discharging adjustment blade for performing intensive cooling.

31. A refrigerator as claimed in claim 30, wherein said position detecting switch is installed in said housing of the MINI upper portion of said cool air discharging adjustment blade, and there is provided an operating protrusion for switching on/off said position detecting switch by being rotated with said cool air discharging adjustment blade in the upper portion thereof.

32. A refrigerator as claimed in claim 31, wherein said operating protrusion is formed such that the portion in contact with said position detecting switch is rounded.

33. A refrigerator as claimed in claim 20, wherein said driving motor is installed in said housing of the upper portion of said cool air discharging adjustment blade, being installed in a motor case, and an internal refrigerator lamp is installed adjacent to said driving motor.

34. A refrigerator as claimed in claim 20, wherein a concave groove is formed in the rear surface of said refrigeration compartment so that said housing is installed and the front surface of said housing is coplanar with the rear surface of said refrigeration compartment.

35. A refrigerator as claimed in claim 34, wherein a seal plate is provided between the rear surface of said housing and said concave groove.

36. A refrigerator as claimed in claim 20, wherein a grill of a matrix shape is provided in the front of said housing to cover said cool air discharging adjustment blade.

37. A refrigerator comprising:
- a housing installed in the rear wall of said refrigeration compartment;
- a cool air passage installed at one side of said housing for guiding the cool air;
- a plurality of discharging apertures interconnected with said cool air passage;

cool air discharging adjustment blades each installed at said cool air discharging apertures so as to be rotatable centering around a shaft; and a driving motor installed at said housing being in the upper portion of said cool air discharging adjustment blades for rotating said cool air discharging adjustment blades, said driving motor being integrally formed in a motor case.

38. A refrigerator as claimed in claim 37, wherein there is provided a position detecting switch interlocked with an operating protrusion positioned in the upper end of said cool air discharging adjustment blades in the lower portion of said driving motor.

39. A refrigerator as claimed in claim 37, wherein an internal refrigerator lamp is installed adjacent to said driving motor.

40. A refrigerator temperature controlling method using GA-fuzzy inference comprising the steps of:

determining whether there is an initial input;

inferring the temperatures of respective predetermined positions of said refrigeration compartment from temperature information input from at least two refrigeration compartment temperature detecting means by a first GA-fuzzy function, if there is an initial input;

determining the optimal position of a cool air discharging adjustment blade for determining the cool air discharging direction by a second GA-fuzzy function using the temperature inferred for the respective positions of said refrigeration compartment;

moving the position of said cool air discharging adjustment blade for determining the cool air discharging direction in accordance with said determined optimal position;

determining whether a predetermined time has lapsed after said initial inputting step;

reinferring the temperature of the predetermined position by the first GA-fuzzy function using the inferred temperatures of said respective predetermined positions of said refrigeration compartment as the temperature pattern data for said cool air discharging direction learned by reference, if a predetermined time has lapsed;

determining the position of said cool air discharging adjustment blade by said second GA-fuzzy function inferred using the reinferred temperatures of said respective predetermined positions and the currently input temperature of said refrigeration compartment temperature detecting means;

determining whether said determined position of said cool air discharging adjustment blade is optimal; and moving said cool air discharging adjustment blade to the optimal position by driving a swing motor, if it is determined that the position is not optimal.

41. A refrigerator temperature controlling method using GA-fuzzy inference as claimed in claim 40, wherein, assuming that the temperatures of said respective predetermined positions are R1 and R2, the inferred temperatures of said respective predetermined positions are T1 and T2, and the weighed value of the rule calculated in the stage is W, the first GA-fuzzy function is expressed as:

$W$=MIN [1, MAX {0, (1.4−$R1$)/1.14}]

$T1$=$W$(−1.536+0.451$R1$+0.771$R2$)+(1−$W$)(0.141+1.055$R1$−0.041$R2$)

$T2$=−0,648−0.045$R1$+1.106$R2$ where MIN represents a function selecting a minimum factor among the factors within the parentheses, and MAX represents a function selecting a maximum factor among the factors within the parentheses.

42. A refrigerator temperature controlling method using GA-fuzzy inference as claimed in claim 40, wherein, assuming that the temperatures of said respective predetermined positions are R1 and R2, the inferred temperatures of said respective predetermined positions are T1 and T2, the weighed value of the n-th rule calculated in the stage is Wn (n is number of the rule and a positive integer), and said respective predetermined positions of said cool air discharging adjustment blade is represented by Pn, the second GA-fuzzy function is expressed as:

$W_1$=MIN [1, MAX {0, (3.49−$R1$)/1.33}]

$W_2$=MIN [1, MAX {0, (4.49−$R2$)/1.9}]

Opt. pos.=$W_1 W_2 P1 + W_1(1-W_2)P2 + (1-W_1)W_2 P3 + (1-W_1)(1-W_2)P4$ $P1$=5.4+0.452$R1$−0.27$T1$+0.45$T2$−0.52$R2$ $P2$=2.7−0.2$R1$+0.27$T1$+0.33$T2$+0.03$R2$ $P3$=7.7+0.29$R1$−0.32$T1$−0.29$T2$+0.22$R2$ $P4$=1.4+3.7$R1$−0.36$T1$+0.19$T2$−2.65$R2$ where MIN represents a function selecting a minimum factor among the factors within the parentheses, and MAX represents a function selecting a maximum factor among the factors within the parentheses.

43. A refrigerator temperature controlling apparatus adopting GA-fuzzy inference, comprising:

compressor controlling means;

damper opening controlling means;

cool air discharging direction controlling means for controlling the rotation or swing of a cool air discharging adjustment blade of a circular plate member to determine the cool air discharging direction;

cool air discharging adjustment blade position detecting means for setting the cool air discharging direction using the information applied from said cool air discharging direction controlling means;

at least two refrigeration compartment temperature detecting means disposed in a predetermined distance;

freezer compartment temperature detecting means;

external temperature detecting means;

temperature variation calculating means for respectively calculating the temperature variations of said respective refrigeration compartment temperature detecting means;

temperature-varied data storing means detected by said respective refrigeration compartment temperature detecting means depending on said cool air direction; and controlling means for receiving predetermined information from said refrigeration compartment temperature detecting means, external temperature detecting means, temperature variation calculating means, temperature-varied data storing means and cool air discharging adjustment blade position detecting means to control the internal temperature of said refrigerator by GA-fuzzy inference for inferring the controlled amount of said compressor controlling means, damper opening controlling means and cool air discharging direction controlling means.

44. A refrigerator temperature controlling apparatus adopting GA-fuzzy inference, as claimed in claim 43, comprising:

inferring means for inferring the temperature value of another predetermined portion of said refrigeration compartment from at least two temperature values detected by said refrigeration compartment temperature detecting means using GA-fuzzy inference, said inferring means including a microprocessor for receiving the temperature value inferred from said inferring means and predetermined information from said refrigeration compartment temperature detecting means, external temperature detecting means, temperature variation calculating means, and temperature-varied data storing means, and performing a GA-fuzzy controlling routine for inferring the controlled amount of said compressor controlling means and damper opening controlling means using GA-fuzzy inference, an operating routine for receiving and operating the information inferred from said GA-fuzzy controlling routine and said cool air discharging adjustment blade position information, and a load controlling routine for receiving the output information of said operating routine and the output information of said cool air discharging adjustment blade position detecting means to control the controlled amount of said compressor controlling means, damper opening controlling means and cool air discharging direction controlling means.

45. A refrigerator temperature controlling apparatus adopting GA-fuzzy inference, as claimed in claim 44, wherein said GA-fuzzy controlling routine includes fuzzy model discriminating means operated by a fuzzy membership function for receiving and determining data learned by reference, storing the ambiguous temperature state of the refrigerated foodstuff accommodated from said refrigeration compartment temperature detecting means and that of the refrigerated foodstuff inferred previously, and GA for inferring the internal refrigeration compartment temperature state which is changeable at times from the temperature of said refrigeration compartment in a predetermined time using an objective function having correlation between an experimental value and an inferred value to supply the inferred information to said fuzzy model discriminating means.

46. A refrigerator temperature controlling apparatus adopting GA-fuzzy inference, as claimed in claim 45, wherein said GA-fuzzy inference infers the internal refrigeration compartment temperature which is changeable at times by the process of obtaining an answer set of conditional determination and execution rules by the genetic algorithm using the Takagi-Sugeno-Kang method, written in the following conditional statement $L_n^1$;

IF $x_1$ is $A_1^i$, $x_2$ is $A_2^i$, . . . , $x_m$ is $A_m^i$,

THEN $y_n^i = C_0^i + C_1^i X_1 + C_2^i X_2 + C_3^i X_3 + C_4^i X_4$ where $x_1$ through $x_m$ are various conditional variables such as the detected temperatures (R1 and R2) of the refrigeration compartment, inferred temperature (T1 and T2), the external temperature or the foodstuff temperature, $A_1$ through $A_m$ are membership values, $y_n^i$ which is an objective function is the linear equation corresponding to the consequent, $C_0$ through $C_m$ are parameters of conclusion parts, and i, m and n are positive integers.

47. A refrigerator temperature controlling apparatus adopting GA-fuzzy inference, as claimed in claim 44, wherein said in said operating routine, the output information of said GA-fuzzy controlling routine and the output information of said cool air discharging adjustment blade position detecting means are operated to obtained the controlled amount of said cool air discharging direction controlling means and supplying the same to said load controlling routine.

48. A refrigerator temperature controlling method by controlling the cool air discharging direction by which the cool air generated from a refrigeration compartment is supplied to said refrigerator using a cool air discharging adjustment blade which is rotatable in terms of a shaft, said method comprising the steps of:

detecting temperature values of respective predetermined positions of said refrigeration compartment in a predetermined time period by at least two temperature detecting means disposed with a predetermined interval through GA-fuzzy inference; and comparing the temperature values detected in said detecting step to set cool air discharging direction so that cool air is discharged to the portion having the highest temperature value.

* * * * *